US009141717B2

(12) United States Patent
Schneider

(10) Patent No.: US 9,141,717 B2
(45) Date of Patent: Sep. 22, 2015

(54) METHODS, SYSTEMS, PRODUCTS, AND DEVICES FOR PROCESSING DNS FRIENDLY IDENTIFIERS

(75) Inventor: Eric Schneider, University Heights, OH (US)

(73) Assignee: ESDR Network Solutions LLC, Wilmington, DE (US)

( * ) Notice: Subject to any disclaimer, the term of this patent is extended or adjusted under 35 U.S.C. 154(b) by 2251 days.

(21) Appl. No.: 10/248,068

(22) Filed: Dec. 13, 2002

(65) Prior Publication Data

US 2008/0016233 A1  Jan. 17, 2008

Related U.S. Application Data

(63) Continuation-in-part of application No. 09/683,481, filed on Jan. 5, 2002, now abandoned, and a continuation-in-part of application No. 09/682,351, filed on Aug. 23, 2001, now abandoned, and a (Continued)

(51) Int. Cl.
*G06F 15/16* (2006.01)
*G06F 17/30* (2006.01)
*H04L 29/12* (2006.01)

(52) U.S. Cl.
CPC .... *G06F 17/30887* (2013.01); *H04L 29/12066* (2013.01); *H04L 61/1511* (2013.01); *H04L 61/301* (2013.01); *H04L 61/3015* (2013.01); *H04L 29/12594* (2013.01); *H04L 61/30* (2013.01)

(58) Field of Classification Search
CPC .................................................. H04L 61/301
USPC .......... 709/220, 228, 223, 245, 217, 219, 221
See application file for complete search history.

(56) References Cited

U.S. PATENT DOCUMENTS

| 4,155,042 A | 5/1979 | Permut et al. |
| 4,190,800 A | 2/1980 | Kelly, Jr. et al. |
| 4,196,310 A | 4/1980 | Forman et al. |

(Continued)

FOREIGN PATENT DOCUMENTS

| JP | 54136617 | 10/1979 |
| JP | 11085492 | 3/1999 |

(Continued)

OTHER PUBLICATIONS

Hollenbeck et al., "Domain Name System Wildcards in Top-Level Domain Zones", VeriSign Naming and Directory Services, VeriSign, Inc., pp. 1-11, Sep. 9, 2003.

(Continued)

*Primary Examiner* — Adnan Mirza
(74) *Attorney, Agent, or Firm* — Fitch, Even, Tabin & Flannery LLP

(57) ABSTRACT

When a request having a keyword is received, a domain name having the keyword can be generated and a network resource corresponding to the domain name can be requested wherein the network resource is adapted to extract the keyword from the domain name. In turn, when a request having a first domain name is received, a second domain name having the first domain name can be generated and a network resource corresponding to the second domain name can be requested wherein the network resource is adapted to extract the first domain name from the second domain name.

34 Claims, 32 Drawing Sheets

Related U.S. Application Data continuation-in-part of application No. 09/682,133, filed on Jul. 25, 2001, now Pat. No. 7,194,552, and a continuation-in-part of application No. 09/653,100, filed on Aug. 31, 2000, now Pat. No. 6,760,746, and a continuation-in-part of application No. 09/650,827, filed on Aug. 30, 2000, now Pat. No. 6,901,436, and a continuation-in-part of application No. 09/598,134, filed on Jun. 21, 2000, now Pat. No. 6,895,430, and a continuation-in-part of application No. 09/532,500, filed on Mar. 21, 2000, now Pat. No. 7,136,932.

(60) Provisional application No. 60/175,825, filed on Jan. 13, 2000, provisional application No. 60/160,125, filed on Oct. 18, 1999, provisional application No. 60/157,075, filed on Oct. 1, 1999, provisional application No. 60/125,531, filed on Mar. 22, 1999, provisional application No. 60/130,136, filed on Apr. 20, 1999, provisional application No. 60/135,751, filed on May 25, 1999, provisional application No. 60/143,859, filed on Jul. 15, 1999.

(56) References Cited

U.S. PATENT DOCUMENTS

| | | | |
|---|---|---|---|
| 4,390,876 | A | 6/1983 | Bjorklund et al. |
| 4,486,853 | A | 12/1984 | Parsons |
| 4,754,326 | A | 6/1988 | Kram et al. |
| 4,811,382 | A | 3/1989 | Sleevi |
| 4,823,265 | A | 4/1989 | Nelson |
| 4,903,206 | A | 2/1990 | Itoh et al. |
| 4,956,771 | A | 9/1990 | Nuestaedter |
| 4,956,875 | A | 9/1990 | Bernard et al. |
| 5,109,486 | A | 4/1992 | Seymour |
| 5,155,837 | A | 10/1992 | Liu et al. |
| 5,155,847 | A | 10/1992 | Kirouac et al. |
| 5,175,681 | A | 12/1992 | Iwai et al. |
| 5,231,570 | A | 7/1993 | Lee |
| 5,249,230 | A | 9/1993 | Mihm, Jr. |
| 5,249,275 | A | 9/1993 | Srivastava |
| 5,319,699 | A | 6/1994 | Kerihuel et al. |
| 5,321,740 | A | 6/1994 | Gregorek et al. |
| 5,386,369 | A | 1/1995 | Christiano |
| 5,402,490 | A | 3/1995 | Mihm, Jr. |
| 5,404,231 | A | 4/1995 | Bloomfield |
| 5,404,505 | A | 4/1995 | Levinson |
| 5,418,951 | A | 5/1995 | Damashek |
| 5,437,031 | A | 7/1995 | Kitami |
| 5,444,823 | A | 8/1995 | Nguyen |
| 5,446,891 | A | 8/1995 | Kaplan et al. |
| 5,454,105 | A | 9/1995 | Hatakeyama et al. |
| 5,500,561 | A | 3/1996 | Wilhelm |
| 5,534,734 | A | 7/1996 | Pugh et al. |
| 5,535,257 | A | 7/1996 | Goldberg et al. |
| 5,544,036 | A | 8/1996 | Brown, Jr. et al. |
| 5,548,726 | A | 8/1996 | Pettus |
| 5,572,438 | A | 11/1996 | Ehlers et al. |
| 5,576,700 | A | 11/1996 | Davis et al. |
| 5,592,620 | A | 1/1997 | Chen et al. |
| 5,598,464 | A | 1/1997 | Hess et al. |
| 5,600,778 | A | 2/1997 | Swanson et al. |
| 5,603,034 | A | 2/1997 | Swanson |
| 5,623,679 | A | 4/1997 | Rivette et al. |
| 5,623,681 | A | 4/1997 | Rivette et al. |
| 5,625,818 | A | 4/1997 | Zarmer et al. |
| 5,634,016 | A | 5/1997 | Steadham, Jr. et al. |
| 5,634,048 | A | 5/1997 | Ryu et al. |
| 5,640,561 | A | 6/1997 | Satoh et al. |
| 5,644,625 | A | 7/1997 | Solot |
| 5,649,186 | A | 7/1997 | Ferguson |
| 5,664,170 | A | 9/1997 | Taylor |
| 5,673,252 | A | 9/1997 | Johnson et al. |
| 5,684,710 | A | 11/1997 | Ehlers et al. |
| 5,692,132 | A | 11/1997 | Hogan |
| 5,693,205 | A | 12/1997 | Santure et al. |
| 5,696,695 | A | 12/1997 | Ehlers et al. |
| 5,699,428 | A | 12/1997 | McDonnal et al. |
| 5,701,399 | A | 12/1997 | Lee et al. |
| 5,708,709 | A | 1/1998 | Rose |
| 5,721,897 | A | 2/1998 | Rubinstein |
| 5,742,818 | A | 4/1998 | Shoroff et al. |
| 5,745,360 | A | 4/1998 | Leone et al. |
| 5,761,083 | A | 6/1998 | Brown, Jr. et al. |
| 5,761,689 | A | 6/1998 | Rayson et al. |
| 5,764,906 | A | 6/1998 | Edelstein et al. |
| 5,777,989 | A | 7/1998 | McGarvey |
| 5,778,367 | A | 7/1998 | Wesinger, Jr. et al. |
| 5,790,790 | A | 8/1998 | Smith et al. |
| 5,802,524 | A | 9/1998 | Flowers et al. |
| 5,812,776 | A | 9/1998 | Gifford |
| 5,813,007 | A | 9/1998 | Nielsen |
| 5,815,830 | A | 9/1998 | Anthony |
| 5,835,087 | A | 11/1998 | Herz et al. |
| 5,841,850 | A | 11/1998 | Fan |
| 5,842,203 | A | 11/1998 | D'Elena et al. |
| 5,848,396 | A | 12/1998 | Gerace |
| 5,857,201 | A | 1/1999 | Wright, Jr. et al. |
| 5,870,546 | A | 2/1999 | Kirsch |
| 5,881,131 | A | 3/1999 | Farris et al. |
| 5,890,172 | A | 3/1999 | Borman et al. |
| 5,892,919 | A | 4/1999 | Nielsen |
| 5,892,920 | A | 4/1999 | Arvidsson et al. |
| 5,895,454 | A | 4/1999 | Harrington |
| 5,898,836 | A | 4/1999 | Freivald et al. |
| 5,907,680 | A | 5/1999 | Nielsen |
| 5,908,467 | A | 6/1999 | Barrett et al. |
| 5,913,215 | A | 6/1999 | Rubinstein et al. |
| 5,926,116 | A | 7/1999 | Kitano et al. |
| 5,933,604 | A | 8/1999 | Inakoshi |
| 5,937,037 | A | 8/1999 | Kamel et al. |
| 5,937,162 | A | 8/1999 | Funk et al. |
| 5,940,847 | A | 8/1999 | Fein et al. |
| 5,944,787 | A | 8/1999 | Zoken |
| 5,949,419 | A | 9/1999 | Domine et al. |
| 5,953,400 | A | 9/1999 | Rosenthal et al. |
| 5,953,721 | A | 9/1999 | Doi et al. |
| 5,963,205 | A | 10/1999 | Sotomayor |
| 5,963,915 | A | 10/1999 | Kirsch |
| 5,970,469 | A | 10/1999 | Scroggie et al. |
| 5,970,680 | A | 10/1999 | Powers |
| 5,974,453 | A * | 10/1999 | Andersen et al. ............. 709/220 |
| 5,978,806 | A | 11/1999 | Lund |
| 5,978,817 | A | 11/1999 | Giannandrea et al. |
| 5,978,828 | A | 11/1999 | Greer et al. |
| 5,978,842 | A | 11/1999 | Noble et al. |
| 5,982,863 | A | 11/1999 | Smiley et al. |
| 5,987,464 | A | 11/1999 | Schneider |
| 5,987,508 | A | 11/1999 | Agraharam et al. |
| 5,991,368 | A | 11/1999 | Quatse et al. |
| 5,991,751 | A | 11/1999 | Rivette et al. |
| 5,995,594 | A | 11/1999 | Shaffer et al. |
| 5,999,907 | A | 12/1999 | Donner |
| 5,999,912 | A | 12/1999 | Wodarz et al. |
| 6,003,061 | A | 12/1999 | Jones et al. |
| 6,003,077 | A | 12/1999 | Bawden et al. |
| 6,003,082 | A | 12/1999 | Gampper et al. |
| 6,006,264 | A | 12/1999 | Colby et al. |
| 6,006,265 | A | 12/1999 | Rangan et al. |
| 6,009,150 | A | 12/1999 | Kamel |
| 6,009,459 | A | 12/1999 | Belfiore et al. |
| 6,012,066 | A | 1/2000 | Discount et al. |
| 6,014,660 | A | 1/2000 | Lim et al. |
| 6,018,619 | A | 1/2000 | Allard et al. |
| 6,018,768 | A | 1/2000 | Ullman et al. |
| 6,021,433 | A | 2/2000 | Payne et al. |
| 6,023,724 | A | 2/2000 | Bhatia et al. |
| 6,029,195 | A | 2/2000 | Herz |
| 6,032,150 | A | 2/2000 | Nguyen |
| 6,038,601 | A | 3/2000 | Lambert et al. |
| 6,041,324 | A | 3/2000 | Earl et al. |
| 6,057,834 | A | 5/2000 | Pickover |
| 6,058,250 | A | 5/2000 | Harwood et al. |

(56) References Cited

U.S. PATENT DOCUMENTS

| | | |
|---|---|---|
| 6,058,355 A | 5/2000 | Ahmed et al. |
| 6,061,700 A | 5/2000 | Brobst et al. |
| 6,061,734 A | 5/2000 | London |
| 6,061,738 A | 5/2000 | Osaku et al. |
| 6,065,046 A | 5/2000 | Feinberg |
| 6,065,054 A | 5/2000 | Dutcher et al. |
| 6,085,242 A | 7/2000 | Chandra |
| 6,091,956 A | 7/2000 | Hollenberg |
| 6,092,100 A | 7/2000 | Berstis et al. |
| 6,094,665 A | 7/2000 | Lyons et al. |
| 6,097,108 A | 8/2000 | Tweed |
| 6,098,099 A | 8/2000 | Ellesson et al. |
| 6,104,582 A | 8/2000 | Cannon et al. |
| 6,104,990 A | 8/2000 | Chaney et al. |
| 6,105,098 A | 8/2000 | Ninose et al. |
| 6,119,153 A | 9/2000 | Dujari et al. |
| 6,119,234 A | 9/2000 | Aziz et al. |
| 6,122,520 A | 9/2000 | Want et al. |
| 6,122,627 A | 9/2000 | Carey et al. |
| 6,125,361 A | 9/2000 | Chakrabarti et al. |
| 6,128,623 A | 10/2000 | Mattis et al. |
| 6,134,588 A | 10/2000 | Guenthner et al. |
| 6,137,873 A | 10/2000 | Gilles |
| 6,141,408 A | 10/2000 | Garfinkle |
| 6,141,653 A | 10/2000 | Conklin et al. |
| 6,144,957 A | 11/2000 | Cohen et al. |
| 6,148,289 A | 11/2000 | Virdy |
| 6,148,342 A | 11/2000 | Ho |
| 6,151,622 A | 11/2000 | Fraenkel et al. |
| 6,151,624 A * | 11/2000 | Teare et al. .................... 709/217 |
| 6,154,600 A | 11/2000 | Newman et al. |
| 6,154,725 A | 11/2000 | Donner |
| 6,154,767 A | 11/2000 | Altschuler et al. |
| 6,154,771 A | 11/2000 | Rangan et al. |
| 6,154,777 A * | 11/2000 | Ebrahim .................... 709/227 |
| 6,157,292 A | 12/2000 | Piercy et al. |
| 6,161,145 A | 12/2000 | Bainbridge et al. |
| 6,167,389 A | 12/2000 | Davis et al. |
| 6,167,449 A | 12/2000 | Arnold et al. |
| 6,169,476 B1 | 1/2001 | Flanagan |
| 6,173,406 B1 | 1/2001 | Wang et al. |
| 6,181,787 B1 | 1/2001 | Malik |
| 6,181,985 B1 | 1/2001 | O'Donnell et al. |
| 6,182,142 B1 | 1/2001 | Win et al. |
| 6,182,148 B1 | 1/2001 | Tout |
| 6,182,227 B1 | 1/2001 | Blair et al. |
| 6,185,619 B1 | 2/2001 | Joffe et al. |
| 6,189,030 B1 | 2/2001 | Kirsch et al. |
| 6,195,691 B1 | 2/2001 | Brown |
| 6,199,076 B1 | 3/2001 | Logan et al. |
| 6,202,087 B1 | 3/2001 | Gadish |
| 6,205,139 B1 | 3/2001 | Voit |
| 6,205,475 B1 | 3/2001 | Pitts |
| 6,209,048 B1 | 3/2001 | Wolff |
| 6,212,565 B1 | 4/2001 | Gupta |
| 6,219,696 B1 | 4/2001 | Wynblatt et al. |
| 6,219,709 B1 | 4/2001 | Byford |
| 6,229,532 B1 | 5/2001 | Fujii |
| 6,230,168 B1 | 5/2001 | Unger et al. |
| 6,240,360 B1 | 5/2001 | Phelan |
| 6,240,555 B1 | 5/2001 | Shoff et al. |
| 6,247,056 B1 | 6/2001 | Chou et al. |
| 6,249,817 B1 | 6/2001 | Nakabayashi et al. |
| 6,256,671 B1 | 7/2001 | Strentzsch et al. |
| 6,256,739 B1 | 7/2001 | Skopp et al. |
| 6,259,771 B1 | 7/2001 | Kredo et al. |
| 6,259,972 B1 | 7/2001 | Sumic et al. |
| 6,269,361 B1 | 7/2001 | Davis et al. |
| 6,282,511 B1 | 8/2001 | Mayer |
| 6,292,172 B1 | 9/2001 | Makhlouf |
| 6,292,709 B1 | 9/2001 | Uhl et al. |
| 6,292,800 B1 | 9/2001 | Eldreth |
| 6,297,819 B1 | 10/2001 | Furst |
| 6,298,327 B1 | 10/2001 | Hunter et al. |
| 6,298,341 B1 | 10/2001 | Mann et al. |
| 6,298,352 B1 | 10/2001 | Kannan et al. |
| 6,304,753 B1 | 10/2001 | Hartmaier |
| 6,311,214 B1 | 10/2001 | Rhoads |
| 6,314,469 B1 * | 11/2001 | Tan et al. .................... 709/245 |
| 6,321,222 B1 | 11/2001 | Soderstrom et al. |
| 6,321,242 B1 | 11/2001 | Fogg et al. |
| 6,324,538 B1 | 11/2001 | Wesinger, Jr. et al. |
| 6,324,585 B1 | 11/2001 | Zhang et al. |
| 6,324,650 B1 | 11/2001 | Ogilvie |
| 6,332,141 B2 | 12/2001 | Gonzalez et al. |
| 6,332,158 B1 | 12/2001 | Risley et al. |
| 6,336,114 B1 | 1/2002 | Garrison |
| 6,338,082 B1 | 1/2002 | Schneider |
| 6,339,767 B1 | 1/2002 | Rivette et al. |
| 6,339,786 B1 | 1/2002 | Ueda et al. |
| 6,356,422 B1 | 3/2002 | Bilac et al. |
| 6,356,898 B2 | 3/2002 | Cohen et al. |
| 6,360,256 B1 | 3/2002 | Lim |
| 6,363,433 B1 | 3/2002 | Nakajima |
| 6,366,298 B1 | 4/2002 | Haitsuka et al. |
| 6,366,906 B1 | 4/2002 | Hoffman |
| 6,374,241 B1 | 4/2002 | Lamburt et al. |
| 6,381,627 B1 | 4/2002 | Kwan et al. |
| 6,381,651 B1 | 4/2002 | Nishio et al. |
| 6,385,620 B1 | 5/2002 | Kurzius et al. |
| 6,389,462 B1 | 5/2002 | Cohen et al. |
| 6,393,117 B1 | 5/2002 | Trell |
| 6,401,118 B1 | 6/2002 | Thomas |
| 6,405,243 B1 | 6/2002 | Nielsen |
| 6,412,014 B1 | 6/2002 | Ryan |
| 6,421,675 B1 | 7/2002 | Ryan et al. |
| 6,425,003 B1 | 7/2002 | Herzog et al. |
| 6,427,164 B1 | 7/2002 | Reilly |
| 6,430,623 B1 | 8/2002 | Alkhatib |
| 6,434,547 B1 | 8/2002 | Mishelevich et al. |
| 6,438,583 B1 | 8/2002 | McDowell et al. |
| 6,442,549 B1 | 8/2002 | Schneider |
| 6,442,602 B1 | 8/2002 | Choudhry |
| 6,449,657 B2 | 9/2002 | Stanbach, Jr. et al. |
| 6,452,609 B1 | 9/2002 | Katinsky et al. |
| 6,496,981 B1 | 12/2002 | Wistendahl et al. |
| 6,502,131 B1 | 12/2002 | Vaid et al. |
| 6,502,132 B1 | 12/2002 | Kumano et al. |
| 6,505,201 B1 | 1/2003 | Haitsuka et al. |
| 6,509,833 B2 | 1/2003 | Tate |
| 6,510,461 B1 | 1/2003 | Nielsen |
| 6,513,060 B1 | 1/2003 | Nixon et al. |
| 6,519,589 B2 | 2/2003 | Mann et al. |
| 6,526,402 B2 | 2/2003 | Ling |
| 6,532,366 B1 | 3/2003 | Chung et al. |
| 6,549,892 B1 | 4/2003 | Sansone |
| 6,556,992 B1 | 4/2003 | Barney et al. |
| 6,560,634 B1 | 5/2003 | Broadhurst |
| 6,574,737 B1 * | 6/2003 | Kingsford et al. .............. 726/25 |
| 6,578,078 B1 | 6/2003 | Smith et al. |
| 6,591,291 B1 | 7/2003 | Gabber et al. |
| 6,594,697 B1 | 7/2003 | Praitis et al. |
| 6,603,844 B1 | 8/2003 | Chavez, Jr. et al. |
| 6,604,132 B1 | 8/2003 | Hitt |
| 6,604,241 B1 | 8/2003 | Haeri et al. |
| 6,605,120 B1 | 8/2003 | Fields et al. |
| 6,605,121 B1 | 8/2003 | Roderick |
| 6,606,659 B1 | 8/2003 | Hegli et al. |
| 6,608,891 B1 | 8/2003 | Pelletier et al. |
| 6,611,803 B1 | 8/2003 | Furuyama et al. |
| 6,615,237 B1 | 9/2003 | Kyne et al. |
| 6,615,247 B1 | 9/2003 | Murphy |
| 6,615,348 B1 | 9/2003 | Gibbs |
| 6,618,697 B1 | 9/2003 | Kantrowitz et al. |
| 6,618,726 B1 | 9/2003 | Colbath et al. |
| 6,628,314 B1 | 9/2003 | Hoyle |
| 6,636,854 B2 | 10/2003 | Dutta et al. |
| 6,636,961 B1 | 10/2003 | Braun et al. |
| 6,637,032 B1 | 10/2003 | Feinleib |
| 6,650,877 B1 | 11/2003 | Tarbouriech et al. |
| 6,654,741 B1 | 11/2003 | Cohen et al. |
| 6,654,746 B1 | 11/2003 | Wong et al. |
| 6,654,779 B1 | 11/2003 | Tsuei |
| 6,658,573 B1 | 12/2003 | Bischof et al. |

(56) References Cited

U.S. PATENT DOCUMENTS

| | | |
|---|---|---|
| 6,665,620 B1 | 12/2003 | Burns et al. |
| 6,668,278 B1 | 12/2003 | Yen et al. |
| 6,671,585 B2 | 12/2003 | Lof et al. |
| 6,671,714 B1 | 12/2003 | Weyer et al. |
| 6,671,738 B1 | 12/2003 | Rajchel et al. |
| 6,674,993 B1 | 1/2004 | Tarbouriech |
| 6,678,717 B1 | 1/2004 | Schneider |
| 6,691,105 B1 | 2/2004 | Virdy |
| 6,711,585 B1 | 3/2004 | Copperman et al. |
| 6,718,321 B2 | 4/2004 | Birrell et al. |
| 6,728,712 B1 | 4/2004 | Kelley et al. |
| 6,728,767 B1 | 4/2004 | Day et al. |
| 6,735,585 B1 | 5/2004 | Black et al. |
| 6,745,178 B1 | 6/2004 | Emens et al. |
| 6,745,367 B1 | 6/2004 | Bates et al. |
| 6,748,375 B1 | 6/2004 | Wong et al. |
| 6,751,562 B1 | 6/2004 | Blackett et al. |
| 6,751,606 B1 | 6/2004 | Fries et al. |
| 6,760,746 B1 | 7/2004 | Schneider |
| 6,760,770 B1 | 7/2004 | Kageyama |
| 6,766,369 B1 | 7/2004 | Haitsuka et al. |
| 6,779,178 B1 | 8/2004 | Lloyd et al. |
| 6,799,201 B1 | 9/2004 | Lee et al. |
| 6,826,617 B1 | 11/2004 | Ansell et al. |
| 6,829,653 B1 | 12/2004 | Tout |
| 6,836,805 B1 | 12/2004 | Cook |
| 6,850,940 B2 | 2/2005 | Wesinger et al. |
| 6,880,007 B1 | 4/2005 | Gardos et al. |
| 6,892,226 B1 | 5/2005 | Tso et al. |
| 6,895,402 B1 | 5/2005 | Emens et al. |
| 6,895,430 B1 | 5/2005 | Schneider |
| 6,901,436 B1 | 5/2005 | Schneider |
| 6,931,451 B1 | 8/2005 | Logan et al. |
| 6,944,658 B1 | 9/2005 | Schneider |
| 6,959,339 B1 | 10/2005 | Wu et al. |
| 6,961,700 B2 | 11/2005 | Mitchell et al. |
| 6,963,928 B1 | 11/2005 | Bagley et al. |
| 6,973,505 B1 | 12/2005 | Schneider |
| 6,981,023 B1 | 12/2005 | Hamilton et al. |
| 6,990,678 B2 | 1/2006 | Zigmond |
| 7,000,028 B1 | 2/2006 | Broadhurst et al. |
| 7,003,442 B1 | 2/2006 | Tsuda |
| 7,003,719 B1 | 2/2006 | Rosenoff et al. |
| 7,010,568 B1 | 3/2006 | Schneider et al. |
| 7,013,298 B1 | 3/2006 | De La Huerga |
| 7,039,697 B2 | 5/2006 | Bayles |
| 7,039,708 B1 | 5/2006 | Knobl et al. |
| 7,069,323 B2 | 6/2006 | Gardos et al. |
| 7,080,158 B1 | 7/2006 | Squire |
| 7,089,194 B1 | 8/2006 | Berstis et al. |
| 7,120,236 B1 | 10/2006 | Schneider |
| 7,136,725 B1 | 11/2006 | Paciorek et al. |
| 7,136,932 B1 | 11/2006 | Schneider |
| 7,149,780 B2 | 12/2006 | Quine et al. |
| 7,188,138 B1 | 3/2007 | Schneider |
| 7,194,552 B1 | 3/2007 | Schneider |
| 7,225,249 B1 | 5/2007 | Barry et al. |
| 7,337,910 B2 | 3/2008 | Cartmell et al. |
| 7,359,987 B2 | 4/2008 | Stahura |
| 7,418,471 B2 | 8/2008 | King et al. |
| 7,472,160 B2 | 12/2008 | King et al. |
| 7,490,124 B2 | 2/2009 | King et al. |
| 7,543,026 B2 | 6/2009 | Quine et al. |
| 7,546,381 B2 | 6/2009 | Tout |
| 7,565,402 B2 | 7/2009 | Schneider |
| 7,606,858 B2 | 10/2009 | King et al. |
| 7,627,628 B2 | 12/2009 | King et al. |
| 7,725,596 B2 | 5/2010 | Garcia-Luna-Aceves et al. |
| 7,752,260 B2 | 7/2010 | King et al. |
| 8,037,168 B2 | 10/2011 | Schneider |
| 8,224,994 B1 | 7/2012 | Schneider |
| 2001/0010032 A1 | 7/2001 | Ehlers et al. |
| 2001/0021947 A1 | 9/2001 | Kim |
| 2001/0047429 A1 | 11/2001 | Seng et al. |
| 2002/0004424 A1 | 1/2002 | Nelson et al. |
| 2002/0010795 A1 | 1/2002 | Brown |
| 2002/0016174 A1 | 2/2002 | Gibson et al. |
| 2002/0023034 A1 | 2/2002 | Brown et al. |
| 2002/0059161 A1 | 5/2002 | Li |
| 2002/0065903 A1 | 5/2002 | Fellman |
| 2002/0069080 A1 | 6/2002 | Roy et al. |
| 2002/0069378 A1 | 6/2002 | McLellan et al. |
| 2002/0073233 A1 | 6/2002 | Gross et al. |
| 2002/0091703 A1 | 7/2002 | Bayles |
| 2002/0091827 A1 | 7/2002 | King et al. |
| 2002/0091836 A1 | 7/2002 | Moetteli |
| 2002/0103745 A1 | 8/2002 | Lof et al. |
| 2002/0129013 A1 | 9/2002 | Thomas |
| 2002/0156800 A1 | 10/2002 | Ong |
| 2002/0188699 A1 | 12/2002 | Ullman et al. |
| 2002/0194113 A1 | 12/2002 | Lof et al. |
| 2003/0009592 A1 | 1/2003 | Stahura |
| 2003/0014450 A1 | 1/2003 | Hoffman |
| 2003/0074672 A1 | 4/2003 | Daniels |
| 2003/0088708 A1 | 5/2003 | Lewallen |
| 2003/0098375 A1 | 5/2003 | Shiga et al. |
| 2003/0182447 A1 | 9/2003 | Schilling |
| 2003/0213316 A1 | 11/2003 | Harvey |
| 2003/0225670 A1 | 12/2003 | DeCarlo, III |
| 2004/0030759 A1 | 2/2004 | Hidary et al. |
| 2004/0044791 A1 | 3/2004 | Pouzzner |
| 2004/0088083 A1 | 5/2004 | Davis et al. |
| 2004/0107025 A1 | 6/2004 | Ransom et al. |
| 2005/0055306 A1 | 3/2005 | Miller et al. |
| 2005/0102354 A1 | 5/2005 | Hollenbeck et al. |
| 2005/0235031 A1 | 10/2005 | Schneider |
| 2006/0129696 A1 | 6/2006 | Bagley et al. |
| 2006/0190623 A1* | 8/2006 | Stahura .................. 709/245 |
| 2006/0265516 A1 | 11/2006 | Schilling |
| 2008/0005342 A1 | 1/2008 | Schneider |
| 2008/0010365 A1 | 1/2008 | Schneider |
| 2008/0016142 A1 | 1/2008 | Schneider |
| 2008/0059607 A1 | 3/2008 | Schneider |
| 2008/0235383 A1 | 9/2008 | Schneider |
| 2012/0102206 A1 | 4/2012 | Larson et al. |

FOREIGN PATENT DOCUMENTS

| | | |
|---|---|---|
| JP | 11184667 | 7/1999 |
| JP | 11242682 | 9/1999 |
| JP | 11296428 | 10/1999 |
| WO | 9909726 | 2/1999 |
| WO | 9922488 | 5/1999 |
| WO | 9939275 | 8/1999 |
| WO | 0007133 | 2/2000 |

OTHER PUBLICATIONS

Ohta, "Incremental Zone Transfer in DNS", RFC 1995, pp. 1-7, Aug. 1996.

Goodin, D., CNET News.com: NSI confirms database revisions, Jan. 21, 1999, pp. 1-2.

Berners, Lee T.; "RFC 1630: Universal Resource Identifiers in WWW—A Unifying Syntax for the Expression of Names and Addresses of Objects on the Network as used in the World Wide Web", IETF, pp. 1-23, 6-94; http:--www.faqs.org-rfcs-rfc1630.html.

Mockapetris P., "RFC 1035: Domain Names—Implementation and Specification", IETF, pp. 1-43, Nov. 1987, http:--www.faqs.org-rfcs-rfc1035.html.

Harrenstien, et al.; "RFC 954: Nicname—Whois", IETF, pp. 1-4, 10-85, http:--www.faqs.org-rfcs-rfc954.html.

Mockapetris, Request for Comment (RFC) 1034, Domain Names—Concepts and Facilities, Section 4.3.3, IETF, Nov. 1987, pp. 1-55.

Request for Comment (RFC) 1480, The US Domain; Cooper & Postel, Jun. 1993, pp. 1-47.

Request for Comment (RFC) 2276, Architecture Principles of Uniform Resource Name Resolution, Sollins, Jan. 1998; pp. 1-24.

Samson, M., PGMedia, Inc. d-b-a Name.Space TM, v. Network Solutions, Inc., et al., Mar. 1999, pp. 1-2.

Liberto, S.M., Domain Name Conflicts: Hey! That's My.Com!, WWWiz Magazine, Mar. 1998, pp. 1-3.

(56) References Cited

OTHER PUBLICATIONS

Cabell, D., Learning Cyberlaw in Cyberspace, Name Conflicts, Berkman Center for Internet & Society, Harvard Law Schol, Aug. 1999, pp. 1-21.
Goodin, D., CNET News.com: NSI domain slowdown persists, Jan. 1999, pp. 1-4.
Schneider, Eric; Claims from Pending U.S. Appl. No. 11/687,672.
Schneider, Eric; Claims from Pending U.S. Appl. No. 10/711,834.
Schneider, Eric; Claims from Pending U.S. Appl. No. 11/952,105.
Schneider, Eric; Claims from Pending U.S. Appl. No. 12/044,804.
Schneider, Eric; Claims from Pending U.S. Appl. No. 12/109,608.
Northrup, T., Windows IT Library: Domain Name Services, Jul. 1998, pp. 1-41.
Berners-Lee et al., Network Working Group, Uniform Resource Identifiers (URI): General Syntax, Xerox Corporation, http:--www.ietf.org-rfc-rfc2396.txt Aug. 1998.
Press Release, "OINGO Pioneers New Domain Name Variation Technology", May 17, 2000; http:--www.namingsolutions.com-ns_new_pr_51700.hmtl.
Statement of the policy oversign committee, The Economic Structure of Internet Generic Top-Level Domain Name Registries Analysis and Recommendations, Jul. 23, 1998.
Crowe, R., the Telephone Exchange Name Project, Web Site (1998), from http:--ourwebhome.com-TENP-TENproject.html.
NTIA-DOC, Improvement of Technical Management of Internet Names and Addresses, Federal Register V63 N34, Feb. 2, 1998, from http:--www.ntia.doc.gov-ntiahome-domainname-022098fedreg.httm.
NTIA-DOC, RFC on the enhancement of the .us Domain Space, Aug. 4, 1998, from http:--www.ntia.doc.gov-ntiahome-domainname-usrfc-dotusrfc.htm.
Wired News Report, The Postal Proposal, Wired News, May 8, 1999 from http:--www.wired.com-news-technology-0,1282.131-30,00.html.
Wired News Report, Depp Space Web?, Wired News, Jul. 22, 1999 from http:--www.wired.com-news-technology-0,1282,139-09,00.html.
Oakes, C., Internet Keywords Patent Spat, Wired News, Jul. 22, 1999 from http:--www.wired.com-news-technology-0,1282,13892.00html.
Perez, Juan Carlos, Mozilla Launches Firefox 1.0, PCWORLD.com, Nov. 9, 2004 <http:--www.pcworld.com-news-article-0,aid,118537,00.asp>.
Advanced Control Systems, Inc.; Load Management; Advanced Control Systems, Inc.; Jun. 20, 2001 (Aug. 1999); USA; p. 1, paragraph; p. 2, paragraphs 1, 2, 3; p. 3, paragraphs 1 & 2; p. 4, paragraphs 1 & 2.
American City Business Journal, Inc.; Blackout early warnings mandated; Apr. 3, 2001; USA; paragraphs 1, 2, 5, 6.
Bradley, J.; ISO Blackout Notice Plan Follow-Up; Silicon Valley Manufacturers Group & California Independent System Operator (CAISO); May 8, 2001; p. 1, paragraphs 1, 2, 3, 4; p. 2, paragraphs 1, 3, 4.
California, State of; Energy Action Plan; May 20, 2003; USA; p. 5, Section 1; pp. 7 & 8 Section V.
Oesterreichishe Gesellshaft Fur Unwelt Und Technik; iea-experts group on r&d priority setting and evaluation liberalisation of the electricity market; http:--www.oegut.at; Mar. 18, 2002; Austria (in English); pp. 4 (Sections 3 & 4), 7 Section 3), 8 (Controllable "Dispatchable" Loads; Section 2), 9 (Distributed Energy Resources).
O'Neil, E.; Cumulative Totals of No-Touch, Restricted Maintenance Operations, Alert, Warning, Emergency and Power Watch Notices Issued from 1998 to Present; California Independent System Operator (CAISO); May 29, 2003; USA; p. 4, Table; p. 5, Table; p. 6, Table; p. 7, Table; p. 8, Table; p. 9, Table; p. 10, Table; p. 11, Table; p. 11, Table; p. 12, Table; p. 14, Table.
Perez, Pena, R.; Utility Could Have Halted '03 Blackout, Panel Says; New York Times; http:--wwww.nytimes.com-2004-0406-national-06BLAC.html; Apr. 6, 2004; USA; paragraphs 1, 2, 3, 4, 9.

Purdum, T.; Statewide Blackouts Ordered as Heat Strains California Grid; New York Times; May 8, 2001; USA; paragraphs 3, 4, 5, 8, 9.
United States of America, Federal Energy Regulation Commission; National Transmission Grid Study, Consolidated List of Recommendations; FERC; May 6, 2002, USA; pp. 2-76 & 3-77 Section 4, 5-79 Section 5.
Weiss, J.; EPRI's Enterprise Infrastructure EPRI's Enterprise Infrastructure Security (EIS) Program Security (EIS) Program; Jul. 7, 2000; USA; pp. 2 through 24.
Weller, G.H.; A Case Study Review of Technical and Technology Issues for Transition of a Utility Load Management Program to Provide System Reliability Resources in Restructured Electricity Markets; LBNL-52408; Ernest Orlando Lawrence Berkeley National Laboratory; http:--certs.lbl.gov-; Jul. 2001; USA; pp. 1 & 2, Section 1; pp. 3 & 4, Section 2; pp. 6-13, Sections 3.1-3.1.8; pp. 16-17, Section 3.3, Table 3.1; pp. 18-40, Section 4; pp. 41-42, Section 5; Appendix A.
Werst, K.L., Why Rotating Outages?; California Independent System Operator (CAISO); Aug. 17, 2001; USA; paragraphs 1, 2, 3, 5, 6, 7.
Donaghy, Melanie, "Wines & Vines," Sep. 1997, vol. 78, No. 9, p. 39(6).
Fax-Phone Switch for Multi-Ring Telephone Lines; Derwent Abstract; Jul. 1992.
"What does your phone number spell?" Internet print-out of www.phonespell.com; Wayback Machine.
"What Words are Hiding in Your Phone Number?" Internet print-out of www.dialabc.com; Wayback Machine.
Courter, Gini; Microsoft Office 2000 Professional Edition, 1999, Sybex, pp. 92-96, 254-257.
www.phonetic.com; Internet print-out; Wayback Machine.
Singhal, Vigyan and Smith, Alan Jay, "Analysis of locking behavior in three real database systems," 1997, The VLDB Journal, vol. 6, pp. 40-52.
Web Page of Network Solutions.
Oakes, Chris, "Net Sol, ICANN Reach Accord," Wired News, from wired.com-news-politics-0,1283,31557,00.html, Sep. 29, 1999, pp. 1-3.
CAISO Summer 2001 Assessment; California Independent System Operator (CAISO); Mar. 22, 2001; USA; p. 29, paragraphs 1 & 2, pg. 30, paragraphs 1, 2, Figure III-E.
California Independent System Operator Load Program Participants; California Independent System Operator (CAISO); Apr. 8, 2002; pp. 1, 2, 3.
California Independent System Operator Participant's whom have entered into an Interruptible Service Contract or similar agreement; California Independent System Operator (CAISO); Dec. 10, 2002; p. 1.
Desmond, J.; Customer Centric Alert and Response Program Overview; California Independent System Operator (CAISO); May 24, 2001; USA; pp. 2, 3, 4, 5, 6, 12, 13, 17, 18.
Goldman, C.A.; Kintner-Meyer, M.; Heffner, G.; Do "Enabling Technologies" Affect Customer Performance in Price-Responsive Load Programs?; LBNL-50328; Ernest Orlando Lawrence Berkeley National Laboratory; http:--eetd.lbl.gov-EA-EMP-; Aug. 2002; p. 3, paragraph 2; p. 4, paragraph 2; p. 6, paragraph 3; p. 7, paragraphs 1 & 2, Table 2; p. 8, paragraphs 1, 2, 3, Table 3; p. 9, paragraphs 1, 2, 3, Table 4; p. 10, paragraphs 1, 2, 3; p. 11, paragraph 1, Table 5; p. 12, paragraphs 1 & 2, Figure 2; p. 15, paragraphs 2, 3, 4; p. 16, paragraph 2.
Graves, K.; CAISO Feb. 2001 Winter Assessment and Summer 2001 Post-season Summary; California Independent System Operator (CAISO); Oct. 8, 2001; USA; pp. 17 & 18, Section IV.
Gross, G.; FCC moves ahead with powerline broadband rules; IDG News Service; Feb. 13, 2004; USA; paragraphs 1, 2, 6, 9.
Helman, C., For years electric companies have dreamed of making their wires the high-speed data pipe to your PC. One tech company may yet make the dream possible.; Forbes.com; Jan. 20, 2003; USA; paragraphs 1, 2, 3, 4, 5.
Implementation Plan and Required Information for the Partipating Load Program (PLP); California Independent System Operator (CAISO); Aug. 8, 2002; USA; p. 1, paragraphs 2 & 3; p. 2, paragraphs 1 & 2, Table 1.

(56) References Cited

OTHER PUBLICATIONS

Jonker, R et al, "Enabling Distributed Generation and Demand Response with Enterprise Energy-Management Systems" Darnell.com Power Pulse.; May 17, 2001; USA; p. 1, paragraphs 1 & 2; p. 2, paragarphs 1, 2, 3, 4, 5, 6, 7, 8; p. 5, paragraphs 2, 3, 4, 5, 6; p. 7, paragraphs 4, 6, 7, 8, 9; p. 8, paragraphs 2, 3, 4; p. 9; p. 10.

Labaton, S., F.C.C. Begins Rewriting Rules on Delivery of the Internet; Associated Press; Feb. 13, 2004; USA; paragarphs 1, 2, 6, 7.

Motegi, N., Piette, MA.; Web-based Energy Information Systems for Large Commercial Buildings; Ernest Orlando Lawrence Berkely National Laboratory; May 2002; USA; p. 3, paragraphs 1, 2, 4, Figure 1; p. 4, paragraphs 1, 2, 3, 4; p. 7, paragraphs 2, 3, 4, Table 1; 10, paragraph 2; p. 11, paragraph 1, Table 5.

Network Solutions and Leading Launch Premier Domain Registration Service Program, Mar. 1997.

Network Solutions and VeriSign Launch Combined Internet Name and Certification Registration, Internet World. Mar. 10, 1997.

Network Solutions, Inc., Online Team up to Server Internet Needs of Small Business Owners, Jan. 1998, pp. 1-2.

Notification Plan (2); Board of Governors, California Independent System Operator (CAISO); May 21, 2001.

Schmid, E., McCorkle, S., O'Neil, E.; ISO Electric Emergency Notification: Memorandum; California Independent System Operator (CAISO); May 17, 2001; USA; p. 1, paragraphs 1 & 4; p. 2, paragraphs 1, 2, 3; p. 3; p. 4, paragraph 4 & 5; p. 5; p. 6, paragraph 1, p. 7; p. 8.

Southern Telecom and Main.net Announce Successful Demonstration of Broadband over Power Lines; Southern Telecom; Dec. 2003; p. 1.

The Development of Electric System Emergencies and the Emergency Response Communication Network: White Paper; California Independent System Operator (CAISO); Jun. 20, 2001; USA; p. 2, paragraphs 1 & 4; p. 3, paragraph 1 & Section II; pp. 6, 7, 8, 9; p. 10, Section III, paragraphs 1, 2, 3; p. 11, paragraphs 2 & 3; p. 12, paragraph 1; p. 13, paragraph 4, p. 14.

Vixie et al., Dynamic Updates in the Domain Name System (DNS Update), RFC 2136, Apr. 1997.

\* cited by examiner

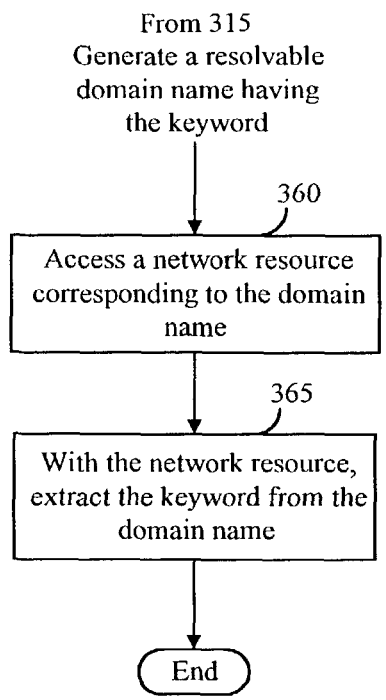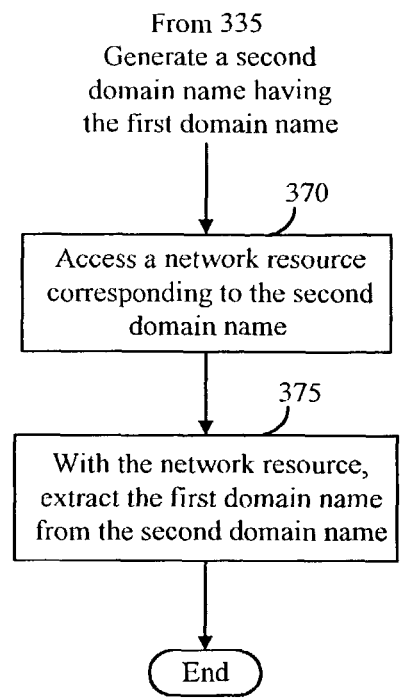
*Fig. 3c*  *Fig. 3d*

Results for "Float Factory"
1 - 4 next >>

Check to see if Float Factory is or can be trademarked
Register Float Factory to improve search engine ranking  } 845
Advertise your service with the phrase Float Factory

840
Float Factory Ltd West Invercargill New Zealand - Home
... Floats manufactured by the Float Factory Ltd are built to last a long time and experience has shown that they retain a high resale value. ...
www.yellowpages.co.nz/pages/22121725/dp45723.html - 20k - Cached - Similar pages Welcome to the Float Factory!
floatfactory.com/ - 1k - Cached - Similar pages Beachcombing and Japanese Glass Float Books
... holds for beachcombing. He even visited a glass float factory while in Japan and photographed how they were manufactured. The book ...
home.attbi.com/~4miller/books/books.html - 14k - Cached - Similar pages Kaveh Glass Industry Group
... Over 400 personnel's are working in this factory. A short view of FLOAT Factory. Clear float glass (price list). Bronze float glass (price list). BACK.
www.kavehglass.com/factories/Floatglass/float.htm - 9k - Cached - Similar pages

*Fig. 8b*

URL/IP Search Engine Submittal Form

URL [http://mylogo.net/brand/tm.htm]  (FDNs relating to URL) 882

Name [                              ]  (Detailed Contact Info)

E-mail [                            ]

---

Enter Mark [My Trademark]   (Provide Logo)

Registration # [                    ]

Serial # [                          ]

◉ State    [Ohio]
○ Country  [    ]
○ Federal                    884

(Add Trademarks) (Add Copyrights) (Add Patents)

◉ I, the URL submitter, declare that I am also the owner of the
   trademark as identified above
                                886

○ I, the URL submitter, declare that I am authorized by the owner of
   the trademark listed above to use the trademark 888
Publish Digital Certificate or PGP Public Key

[                              ] (Browse) (Submit)

```
$TTL 86400

@    IN  SOA  NS0.NEWDOTNET.NET. hostmaster.new.net. (
                    2002040301; serial number
                    1800  ; refresh
                    900   ; retry
                    604800      ; expire
                    86400; minimum TTL
)

COM.              NS    COM.ZONECACHE.COM.        1180
NET.              NS    NET.ZONECACHE.COM.
GTLD.             NS    GTLD.ZONECACHE.COM.
CCTLD.            NS    CCTLD.ZONECACHE.COM.
.     518400     IN    NS    NS1.NEWDOTNET.NET.
.     518400     IN    NS    NS2.NEWDOTNET.NET.
AGENT.   172800   IN    NS    TLD1.NEWDOTNET.NET.
AGENT.   172800   IN    NS    TLD2.NEWDOTNET.NET.

COM.ZONECACHE.COM.              A     3.141.59.26
NET.ZONECACHE.COM.              A     3.14.159.26
GTLD.ZONECACHE.COM.             A     2.71.82.81
CCTLD.ZONECACHE.COM.            A     2.7.182.18
NS1.NEWDOTNET.NET.    518400    IN    A    206.132.100.43
NS2.NEWDOTNET.NET.    518400    IN    A    64.211.63.138
TLD1.NEWDOTNET.NET.   172800    IN    A    209.27.251.201
TLD2.NEWDOTNET.NET.   172800    IN    A    64.211.63.138

*.  172800 IN NS TLDA.ARPA.              1175
TLDA.ARPA. 172800 IN A 123.45.67.89

;TLDA.ARPA is used as a Primary Virtual Zero Level Domain and is in
;operative association with a network resource adapted to determine how
;to process the detected identifier having a top level domain alias
```

1170 (label for SOA block)

*Fig. 11b*

```
$TTL 172800

@    IN SOA  NET.ZONECACHE.COM. hostmaster.zonecache.com. (
                2002040301; serial number
                1800  ; refresh
                900   ; retry
                604800      ; expire
                86400; minimum TTL
)

GLOBALMAILING.NET.           NS NS.DANDY.NET.
GLOBALMAILING.NET.           NS NS.WJSE.COM.
DIFFERANCE-ENGINE.NET.       NS NAPLES.NETWIDE.NET.
DIFFERANCE-ENGINE.NET.       NS ROME.NETWIDE.NET.
YOUTHPIECE.NET.              NS NS1.AOSOFT.COM.
YOUTHPIECE.NET.              NS NS2.AOSOFT.COM.
SITEMAP.NET.       NS     SITEMAP.NET.ZONECACHE.COM.

; Add wildcard to redirect to a market driven registration/search site such as
; REQUESTPORTAL.COM
; use 2 lines to point to a DN and glue record for IP address

*.NET.                   NS REQUESTPORTAL.COM.
REQUESTPORTAL.COM.    A   123.45.67.89
```

*Fig. 11c*

```
# "mkdir stubs" in the BIND config directory before using num-stubs.conf
# Append the following line to /etc/named.conf
# include "num-stubs.conf";
# Reload the BIND configuration with the command "ndc reload".

zone "1212" {
  type stub;
  file "stubs/0000";
  masters {
    3.141.59.26;
    31.4.159.26;
  };
};

zone "44106" {
  type stub;
  file "stubs/44106";
  masters {
    1.41.42.13;
    14.142.13.56;
  };
};
```

*Fig. 13c*

```
$TTL 172800

@    IN  SOA  555.1212.ZONECACHE.COM. hostmaster.zonecache.com. (
                    2002040301; serial number
                    1800  ; refresh
                    900   ; retry
                    604800      ; expire
                    86400; minimum TTL
)

216.555.1212.            NS  216.555.1212.ZONECACHE.COM.
212.555.1212.            NS  212.555.1212.ZONECACHE.COM.
415.555.1212.            NS  415.555.1212.ZONECACHE.COM.
561.555.1212.            NS  2.1.2.1.1.6.5.1.e164.arpa ; Add wildcard to redirect to a switchboard driven areacode directory service
; such as AREACODEPORTAL.COM
; use 2 lines to point to a DN and glue record for IP address

*.555.1212.              NS AREACODEPORTAL.COM.
AREACODEPORTAL.COM.  A  123.45.67.89
```

*Fig. 13d*

METHODS, SYSTEMS, PRODUCTS, AND DEVICES FOR PROCESSING DNS FRIENDLY IDENTIFIERS

CROSS REFERENCE TO RELATED APPLICATIONS

This application claims the benefit of the following patent applications, which are hereby incorporated by reference; the application for patent is based on a disclosure filed on Jul. 17, 1998, as Disclosure Document No. 442,796 and portions of a disclosure filed on Jul. 11, 2001, as Disclosure Document No. 496,673 under the Document Disclosure Program and is a continuation in part of U.S. patent application Ser. No. 09/683,481 filed Jan. 5, 2002, by Schneider, now abandoned, and is a continuation in part of U.S. patent application Ser. No. 09/682,351 filed Aug. 23, 2001, by Schneider, now abandoned, and is a continuation in part of U.S. patent application Ser. No. 09/682,133 filed Jul. 25, 2001, by Schneider, now U.S. Pat. No. 7,194,552, and is a continuation in part of U.S. patent application Ser. No. 09/653,100 filed Aug. 31, 2000, by Schneider, now U.S. Pat. No. 6,760,746, and is a continuation in part of U.S. patent application Ser. No. 09/650,827 filed Aug. 30, 2000, by Schneider, now U.S. Pat. No. 6,901,436, and is a continuation in part of U.S. patent application Ser. No. 09/598,134 filed Jun. 21, 2000, by Schneider, now U.S. Pat. No. 6,895,430, and is a continuation in part of U.S. patent application Ser. No. 09/532,500 filed Mar. 21, 2000, by Schneider, now U.S. Pat. No. 7,136,932, which claims the benefit of U.S. Provisional Application Ser. No. 60/175,825 filed Jan. 13, 2000, by Schneider, U.S. Provisional Application Ser. No. 60/160,125 filed Oct. 18, 1999, by Schneider, U.S. Provisional Application Ser. No. 60/157,075 filed Oct. 1, 1999, by Schneider, U.S. Provisional Application Ser. No. 60/130,136 filed Apr. 20, 1999, by Schneider, U.S. Provisional Application Ser. No. 60/125,531 filed Mar. 22, 1999, by Schneider, U.S. Provisional Application Ser. No. 60/143,859 filed Jul. 15, 1999, and U.S. Provisional Application Ser. No. 60/135,751 filed May 25, 1999.

BACKGROUND OF INVENTION

1. Field of the Invention

This invention generally relates to identifier resolution and processing, and more specifically relates to methods, systems, products, and devices for processing domain name system friendly identifiers.

2. Description of the Related Art

A resource identifier such as a Uniform Resource Identifier (URI) is a compact string of characters for identifying an abstract or physical resource. URIs are the generic set of all names and addresses that refer to objects on the Internet. A URI can be further classified as a locator, a name, or both. A Uniform Resource Name (URN) refers to the subset of URI that are required to remain globally unique and persistent even when the resource ceases to exist or becomes unavailable. A Uniform Resource Locator (URL) refers to the subset of URI that identify resources via a representation of their primary access mechanism (e.g., their network "location"), rather than identifying the resource by name or by some other attribute(s) of that resource.

A URL is the address of a file accessible on the Internet. The URL contains the name of the protocol required to access the resource, a domain name or IP address that identifies a specific computer on the Internet, and a hierarchical description of a file location on the computer. In addition, the last (optional) part of the URL may be a "query string" preceded by "?" or a "fragment identifier" preceded by "#". The fragment identifier indicates a particular position within the specified file. For example the URL "http://www.example.com:80/index.html#appendix", where "http" is the scheme or protocol, "www.example.com" is the host server name or Fully Qualified Domain Name (FQDN), "80" is the port connection for the HTTP server request, "index.html" is the filename located on the server, and "appendix" is the identifier to display a specific portion of the HTML file called "index". The URL "http://www.example.com" also retrieves an HTML file called "index" on the HTTP server called "example.com". By default, when either a port or filename is omitted upon accessing a HTTP server via a URL, the client browser interprets the request by connecting via port 80, and retrieving the HTML file called "index".

Because an Internet address is a relatively long string of numbers (e.g., 31.41.59.26) that is difficult to remember, Internet users rely on domain names, memorable and sometimes catchy words corresponding to these numbers, in order to use e-mail and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and can contain subdomains. Domains and subdomains are grouped into zones to allow for distributed administration of the name space.

The DNS provides a mechanism so backup databases can be identified in case the first one becomes unavailable. DNS databases are updated automatically so that information on one name server does not remain out-of-date for long. A client of the DNS is called a resolver; resolvers are typically located in the application layer of the networking software of each Transmission Control Protocol/Internet Protocol (TCP/IP) capable machine. Users typically do not interact directly with the resolver. Application programs that use the DNS, such as mailers, mail servers, Web clients, Web servers, Web caches, IRC clients, FTP clients, distributed file systems, distributed databases, and almost all other applications on TCP/IP rely on the resolver library.

Resolvers query the DNS by directing queries at name servers, which contain parts of the distributed database that is accessed by using the DNS protocols to translate domain names into IP addresses needed for transmission of information across the network. The function of translating a domain name into an IP address is known as name resolution. Name resolution is performed by a distributed system of name servers having resolvers to fulfill the resource request of the client by the successive hierarchical querying of the resource records from zone files. Domain name resolution is explained in P. Mockapetris, "Informational RFC (Request for Comment) 1035: Domain Names—Implementation and Specification", Internet Engineering Task Force (IETF), November 1987, "http://www.faqs.org/rfcs/rfc1035.html". DNS friendly identifiers such as RFC 1035 compliant domain names are restricted to a limited 7 bit ASCII character set: A to Z, a to z, 0 to 9, and hyphen.

The Berkeley Internet Name Domain (BIND) implements an Internet name server for the UNIX operating system. The BIND includes a name server and a resolver library. BIND is fully integrated into UNIX network programs for use in storing and retrieving host names and addresses by calling a routine from the resolver library called gethostbyname( ) which returns the IP address corresponding to a given Internet host name. Error return status from gethostbyname( ) is indicated by return of a NULL pointer.

At the core of Netscape client products lies the Netscape Network Library (NETLIB). A necessity of any network based client browser application is to send and receive data over a connection. This is accomplished in NETLIB by making a call to NET_GetURL( ). In order to resolve host names, NETLIB uses a standard DNS lookup mechanism. NET_FindAddress( ) makes the gethostbyname( ) call to lookup the IP address for the specified host from a DNS database stored on a DNS server, and is called from NET_BeginConnect( ). If a numeric IP address is passed into NET_FindAddress( ), it is passed directly into the gethostbyname( ) call which returns a success when an IP address is passed in. NET_FindAddress( ) is actually called repeatedly until it returns success or failure. Similarly, Microsoft Internet Explorer (MSIE) browser include objects such as WebBrowser Object and InternetExplorer Object, which contains events, methods, and properties. One event, called the Navigate Event navigates to a resource identified by a URL.

A domain name includes two parts: a host and a domain. Technically, the letters to the right of the "dot" (e.g., tida.com) are referred to as Top Level Domains (TLDs), while hosts, computers with assigned IP addresses that are listed in specific TLD registries are known as second-level domains (SLDs). For the domain name "tida.com", ".com" is the TLD, and "tida" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "my.tida.com", are subsidiary to TLDs in the hierarchy of the Internet's DNS.

There are two types of top-level domains, generic and country code. Generic top-level domains (gTLDs) were created to allocate resources to the growing community of institutional networks, while country code top-level domains (ccTLDs) were created for use by each individual country, as deemed necessary. More than 240 national, or country-code TLDs (e.g., United States (.us), Japan (.jp), Germany (.de), etc.) are administered by their corresponding governments, or by private entities with the appropriate national government's acquiescence. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

Incorporated and headquartered in California, the Internet Corporation for Assigned Names and Numbers (ICANN) is the non-profit corporation that was formed to take over responsibility for the IP address space allocation, protocol parameter assignment, domain name system management, and root server system management functions now performed under U.S. Government contract by Internet Assigned Numbers Authority (IANA) and other entities. The IANA, also headquartered in California, is the overall authority for day-to-day administration of the DNS. IANA staff carry out administrative responsibilities for the assignment of IP Addresses, Autonomous System Numbers, TLDs, and other unique parameters of the DNS and its protocols.

With respect to domain name management, the term "registry" refers to an entity responsible for managing allocation of domain names within a particular name space, such as a TLD. The registry stores information about registered domain names and associated name servers. The term "registrar" refers to any one of several entities with authority to add names to the registry for a name space. Entities that wish to register a domain name do so through a "registrar". The term "registrant" refers to the entity registering the domain name. In some name spaces, the registry and registrar functions can be operated by the same entity, so as to combine the concepts and functions of the registrar and registry. The combined registry-registrar model is implemented in many ccTLDs and a few gTLDs.

VeriSign Global Registry Services (GRS) is the leading provider of domain name registry services and DNS support to the Internet and is responsible for the infrastructure that propagates this information throughout the Internet and responds to billions of DNS look-ups daily. Though there is a significant percentage of daily DNS look-ups that can not be resolved (e.g., can not find an IP address), there has never been any attempt by the registry or any other party to monetize from such unresolvable DNS requests.

The arbitrarily limited number of gTLDs has created a severe shortage of desirable domain names in the ".com" registry, leading to substantial pent-up demand for alternate domain name resources. Experimental registry systems offering name registration services in an alternate set of exclusive domains such as ".space" or ".love" developed as early as January 1996. Although visible to only a fraction of Internet users, alternate DNS systems such as the Name.Space, AlterNIC, and eDNS registries have contributed to the community's dialogue on the evolution of DNS administration. Competition argues that TLDs have become an issue of free speech and should not be restricted to the current limited set of gTLDs and ccTLDs.

Customers registering second-level domains in alternate TLDs cannot be reached by other Internet users because these domains, which are not listed in the root zone file, cannot be resolved by other Internet DNS name servers. Only if competitors individually negotiated with each of the scores of thousands of name server operators on the global Internet, something that is a physical and financial impossibility, for inclusion of alternate TLDs would there be any possibility that its domain names could be universally resolvable. As a result, competition has been unable to offer a commercially viable registration service in its TLDs, and has been unable to effectively compete in the domain name market. In March 2001, by partnering with several large ISPs to modify their nameservers, New.Net, Inc. opened their doors to serve as the most effective demonstration of how alternate TLDs are attempting to succeed in a fragmented market driven system.

The following excerpt is provided in, "Informational RFC (Request for Comment) 2826: IAB Technical Comment on the Unique DNS Root", Internet Architecture Board, May 2000, "http://www.faqs.org/rfcs/rfc2826.html". To remain a global network, the Internet requires the existence of a globally unique public name space. The DNS name space is a hierarchical name space derived from a single, globally unique root. This is a technical constraint inherent in the design of the DNS. Therefore it is not technically feasible for there to be more than one root in the public DNS. That one root must be supported by a set of coordinated root servers administered by a unique naming authority. Under agreements among ICANN, the U.S. Government, and NSI, ICANN (through IANA, now absorbed into ICANN), sends documentation for needed changes to the root zone file to the U.S. Department of Commerce, which directs Network Solutions to implement them by editing the authoritative root zone file.

A supplemental memo to RFC 2826 is provided in Simon Higgs, "Informational Internet Draft: Root Zone Definitions", Higgs Communications, May 2001, "http://www.ietf.org/internet-drafts/draft-higgs-root-defs-01.txt". Within this memo, definitions are applied in an attempt to make other roots such as alternate or enhanced roots inclusive as part of a single, globally unique root implying that the single root comprises a plurality of root components distributed across many zone files. In another draft provided in Simon Higgs, "Informational Internet Draft: alternate Roots and the Virtual Inclusive Root", May 29, 2001, "http://www.ietf.org/internet-drafts/draft-higgs-virtual-root-00.txt", proposes a solution to the problem of duplicate colliding top level domains by identifying the virtual inclusive root (VIR), in compliance with the IAB's RFC 2826. Though the VIR is the sum of the consensus between all root zones on the public Internet, the VIR cannot support conflicting TLDs.

There is a particular increase in articles and publications emphasizing the importance of name space and the perceived shortage of ".com" names. References have been made that NASA is seeking authorization for ".mars" as an extension of terrestrial geography. Speaking on the opening day of the annual Internet Society (ISOC) conference in Geneva on Jul. 22, 1998, Vint Cerf, a founding President of ISOC, said the domain name debate should also encompass ".earth" or ".mars" because that's where real-time science data is going to travel from in the not-too-distant future. He said, "The idea is to take the interplanetary Internet design and make it a part of the infrastructure of the Mars mission."

The main use of a web browser location field is for resolving URLs to locate and access resources. Entering a URL in the location field of a web browser serves as a means to access a network resource corresponding to that URL. Because the location field is essential for accessing resources, the design of such location fields have rivaled much competition and innovation between existing web browser products from companies such as Netscape and Microsoft. Improvements to better track and organize sites of URLs that users have visited such as Bookmark folders, URL history, and the personal toolbar are all examples of functionality designed to help users navigate. Other improvements include spell checking and an autocomplete feature from the URL history as text is entered into the location field.

A more recent feature called Smart Browsing is integrated into Netscape Navigator that uses Internet Keywords so users can streamline the use of URLs and get fast access to web sites using the browser's location field. Any single or multiword strings typed into the browser's location field that does not include a "." are sent via HTTP to a server at "netscape.com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query. The "." versus " " is a key factor in determining what services are used. Depending on context, the detection of only a "." delimiter implies a domain name for name resolution services whereas the detection of only a delimiter implies a search request for directory services and the like.

The autosearch feature of Microsoft Internet Explorer (MSIE) is another example of an improvement to the location field of a web browser. The details of the autosearch feature is disclosed in U.S. Pat. No. 6,009,459 issued on Dec. 28, 1999 by Belfiore, et al., entitled, "Intelligent automatic searching for resources in a distributed environment." The '459 patent specifies a mechanism for a computer system to automatically and intelligently determine what a user intended when the user entered text within the location field of a web browser. Often users improperly enter URLs or enter search terms in a user interface element that requires URLs. If the user enters text that is not a URL, the system may first try to construct a valid URL from the user-entered text. If a valid URL cannot be constructed, the browser then automatically formats a search engine query using the user-entered text and forwards the query to an Internet search engine.

In addition, the '459 patent specifies a template registry that categorizes the specific suitability of a plurality of search engines to locate web sites related to a determined meaning of the specified text. The template is an entry in the registry that includes replaceable characters that may be replaced with the processed text. An example template registry entry that causes the Yahoo! search engine to be called is "http://msie.yahoo.com/autosearch?/os". The %s is filled in with information regarding the search terms.

Because MSIE browser is more than an application and has become a de-facto infrastructure component, all attempts to compete with the Autosearch feature of MSIE browser include modifying a template in the operating system registry to redirect autosearch results usually to another search page. MSIE also includes an AutoScan feature. The AutoScan and AutoSearch features are dependent on each other in Internet Explorer 5 and can not be disabled from each other. Autosearch is tried first, and if there are no Autosearch results then Autoscan is tried. The Autoscan serves only as a navigation tool and has never been adapted/configured to perform other request types. There are no known applications capable of detecting the activation of the autosearch and in response either force the autosearch to terminate and invoke an autoscan request or perform a request that completely overrides the autosearch request.

The autosearch is typically configured to access various search engines. Unlike traditional search engines that list search results based on relevance, such as by website content, metatags and links to other sites, pay-for-placement search engines list results based on fees paid by listed sites. The legal debate over the use of trademarks as search terms in pay-for-placement search engines is related to the metatag debate of the 1990s. A series of cases in the late 1990s and 2000 addressed the issue of whether the use of others' trademarks in a site's metatags constitutes trademark infringement. While no definitive rule emerged from these rulings, in a leading case, the Seventh Circuit found that use of others' trademarks as metatags indicates an intent to confuse consumers. Like trademark metatags, trademark search terms on pay-for-placement search engines may confuse users who do not realize they are being led to a competitor's site. There are currently no known systems that allow for the contemporaneous access to trademark information while processing a search engine request having one or more keywords. Additionally, there are no known methods for ordering search results based on trademark related metric that factors in URLs relating to intellectual property and/or trademark/servicemark/brand/ information.

The autosearch is typically configured to access various search engines. Unlike traditional search engines that list search results based on relevance, such as by website content, metatags and links to other sites, pay-for-placement search engines list results based on fees paid by listed sites. The legal debate over the use of trademarks as search terms in pay-for-placement search engines is related to the metatag debate of the 1990s. A series of cases in the late 1990s and 2000 addressed the issue of whether the use of others' trademarks in a site's metatags constitutes trademark infringement. While no definitive rule emerged from these rulings, in a leading case, the Seventh Circuit found that use of others' trademarks as metatags indicates an intent to confuse consumers. Like trademark metatags, trademark search terms on pay-for-placement search engines may confuse users who do not realize they are being led to a competitor's site. There are currently no known systems that allow for the contemporaneous access to trademark information while processing a search engine request having one or more keywords. Additionally, there are no known methods for ordering search results based on trademark related metric that factors in URLs relating to intellectual property and/or trademark/service-mark/brand/ information.

U.S. patent application Ser. No. 09/525,350 filed Mar. 15, 2000, by Schneider, entitled "Method, product, and apparatus for requesting a network resource" teaches how a registration request may be processed (particularly from an autosearch) in response to determining that a network resource can not be located from an input identifier having a valid domain. U.S. patent application Ser. No. 09/532,500 filed Mar. 21, 2000, by Schneider, entitled "Fictitious domain name method, product, and apparatus", teaches how a valid URI may be constructed, resolved, and accessed (particularly from an autosearch) in response to determining that an input identifier includes a non-compliant RFC1035 domain name (e.g., domain name is fictitious). Both applications teach how input having only "." delimiters can be processed from an autosearch by performing a network resource request and/or registration request in response to a failed DNS resolution request.

In addition, U.S. Provisional Application Ser. No. 60/157, 075 filed Oct. 1, 1999, by Schneider, entitled "Method and apparatus for integrating resource location and registration services of valid and fictitious domain names" and U.S. patent application Ser. No. 09/653,100 filed Aug. 31, 2000, by Schneider, entitled "Method, product, and apparatus for processing a data request", teach how such resolution and registration methods of valid and fictitious identifiers including multilingual domain names can be integrated into a unified product, apparatus, and system. In effect, the autosearch feature has never been used for further processing of any kind in response to determining that a DNS friendly identifier is unresolvable.

Aside from processing search requests and keyword resolution requests instead of or before processing a DNS resolution request, there has been no known public disclosure of how the autosearch can be used to process request types in response to a failed DNS resolution request until a VeriSign press release, "VeriSign Announces Breakthrough in Web Navigation For Tens of Millions of Users Worldwide", Jun. 20, 2001, "http://corporate.verisign.com/news/2001/pr-20010620.html", which announces that "Internet users can now reach Web site destinations by typing domain names with characters used in their own languages into their Microsoft Internet Explorer 5.0 or higher browser software." Using technology from RealNames Corporation, Microsoft modified a search function of MSIE to enable the International Domain Names to work without the use of special plug-ins or client software. This was followed by an Internet draft provided in Yves Arrouye, "IDN Resolution in Windows Internet Explorer 5.0 and Above", Jul. 3, 2001, "http://www.ietf.org/internet-drafts/draft-arrouye-idn-ie5-resolution-00.txt", describes how internationalized domain names (IDNs) are being resolved in MSIE. The document focuses on the different steps that are taken after a user enters an IDN in the address bar of IE, up to when the relevant Web page is displayed in the user's browser. Though all input identifiers having only a "." delimiter have only recently been configured to pass from the autosearch to a RealNames keyword resolver, the only further processing currently implemented is limited to that of IDN resolution only with the display of an error message for all other input.

RealNames Keywords were activated in the MSIE browser pursuant to a distribution agreement with Microsoft, which Microsoft chose not to renew. On Jun. 28, 2002 the RealNames service had terminated, where keywords no longer resolve in the MSIE browser. Keyword navigation has always remained dependent upon a client web browser or to a client web browser add-on or plug-in product. Other techniques of keyword navigation that do not require browser modification remain unexplored.

The domain name system uses the domain "in-addr.arpa" to convert Internet addresses back to domain names. In a way, "in-addr.arpa" forms the root of a separate hierarchy. This hierarchy has been made part of the main domain name hierarchy just for implementation convenience. While syntactically, "in-addr.arpa" is a second level domain (SLD), functionally it is a zero level domain (ZLD) in the same way as the highest level "." is a ZLD. Another example of how a ZLD may be used is explained in, P. Falstrom, "Informational RFC (Request for Comment) 2916: E.164 number and DNS", Cisco Systems Inc., September 2000, "http://www.faqs.org/rfcs/rfc2916.html" by showing how DNS can be used for identifying available services connected to a single E.164 phone number. Through transformation of E.164 numbers (ENUM) into DNS names and the use of existing DNS services like delegation through NS records, and use of NAPTR records in DNS, available services for a specific domain name can be discovered in a decentralized way with distributed management of the different levels in the lookup process. The domain "e164.arpa", which serves as a ZLD is being populated in order to provide the infrastructure in DNS for storage of E.164 numbers.

For example, the E.164 number "+1-216-555-1212" can be translated into the "2.1.2.1.5.5.5.6.1.2.1.e164.arpa" domain having a zone that includes NAPTR resource records to help determine which resource to access in response to the ENUM request, however it remains the onus of industry to adapt how, where, and when this transformation takes place. Currently, there are no known tools to adapt the web browser or similar network navigation device to be ENUM enabled. Though the E.164 identifier holds great promise, the expression of the identifier is based on an international standard that may be awkward and unintuitive for quick adaptation by the public. Similar identifiers that represent ENUM may be adapted by the public more readily. There has been evidence over the years of a quicker adoption to informally express a phone number in a syntax similar to an IP address such as "216.555.1212", for example.

Identifiers may exist across multiple namespaces, all with different ownership and rules, and different naming authorities. As shown, there is a recent convergence of attempting to map identifiers across multiple namespaces to access network resources via the DNS. The most common technique for mapping such identifiers is to automatically and transparently transform the identifier in a user's applications before a DNS query is sent. This method does not make any change to the DNS nor require separate DNS name servers. Other examples are proposals which have suggested that modifications are made to the DNS servers to accommodate international domain names, for example. While the proposed solution could work, it requires major changes to the Internet as it exists today. Domain name servers around the globe, which number in the hundreds of thousands, would have to be changed or updated.

As explained in P. Mockapetris, "Informational RFC (Request for Comment) 1034: DOMAIN NAMES—CONCEPTS AND FACILITIES", Internet Engineering Task Force (IETF), November 1987, "http://www.faqs.org/rfcs/rfc1034.html", the principal activity of name servers is to answer standard queries. Both the query and its response are carried in a standard message format. A domain name identifies a node. Each node has a set of resource information, which may be empty. The set of resource information associated with a particular name is composed of separate resource records (RRs). The order of RRs in a set is not significant, and need not be preserved by name servers, resolvers, or other parts of the DNS.

RRs with owner names starting with the label "*" are called wildcard resource records. Wildcard RRs can be thought of as instructions for synthesizing RRs. When the appropriate conditions are met, the name server creates RRs with an owner name equal to the query name and content taken from the wildcard RRs. The only example of wildcard RR usage in RFC 1034 is that of e-mail aliasing. U.S. Pat. No. 6,442,602 issued on Aug. 27, 2002, by Choudhry, entitled "System and method for dynamic creation and management of virtual subdomain addresses", discloses how a wildcard RR can be used to launch a server script in response to an unrecognized/unregistered subdomain name such as "virtualsubdomain.domain.com". The script will resolve it and map it to http://www.domain.com/subdomain, or any other file on a web server which is actually registered.

Recently, ccTLD registries have used wildcard RRs to redirect a resolvable domain name back to the registration component of the registry to perform registration requests. Performing this technique in a gTLD zone file would cause conflict enabling the Registry to bypass competition among multiple registrars in this very public component of the Internet's underlying technology. As a result a wildcard RR has never been used in a gTLD zone file. Furthermore, due to the global public nature with respect to the root zone file of the single, authoritative root DNS server or any other root DNS server for that matter, a wildcard resource record never been used in a root zone file.

An emerging economy of names has created a politically controlled TLD space due to the technical constraint of the DNS having a single authoritative root. Though alternate roots have surfaced to provide alternate TLDs, such services are criticized by supporters of the single root that such implementations disrupt DNS stability and fragment the Internet. However, the same critics encourage competition under the assumption that all such competition will inevitably threaten the stability of the DNS. There has long been an unfulfilled need for processing domain names having TLDs that are not resolvable by a single authoritative public root. Though alternate root servers have been deployed to recognize alternate TLDs, there has been little incentive by industry to move in this direction for concern that using such domain names would confuse the public, fragment the Internet, etc. Now that conventional namespace solutions have been traversed and exhausted, industry is only first beginning to attempt and expand domain namespace by offering proposed solutions with identifiers having only the "." delimiter.

Similar in approach to the fictitious domain name method disclosed in U.S. patent application Ser. No. 09/532,500 filed Mar. 21, 2000, by Schneider, U.S. Published Patent Application 20020073233, published on Jun. 13, 2002 by Gross, et al., entitled, "Systems and methods of accessing network resources" discloses a system for using client-based address conversion software to intercept a requested Internet address having a non-ICANN compliant TLD. This published application corresponds to software technology deployed by New.net in March 2001 on either the network level by partner ISPs or on individual client machines, to add "new TLD extensions" to the existing DNS for the Internet community to purchase and use domain names with extensions that were previously unavailable. Requests to display Web pages with New.net domain names are resolved by appending the additional extension ".new.net" onto the address. As a result, requests are automatically routed to New.net's DNS servers to determine the correct IP address of the computer hosting the Web page. However, there is no mention in the published application nor no mechanism in New.net's deployed technology to provide the opportunity to register or check availability of a domain name of any kind in response to determining that the domain name is not resolvable or that a network resource corresponding to the domain name can not be located. Furthermore, the "new.net" portion of the domain name space (e.g., zone files) has never included the use of wildcard RRs.

U.S. patent application Ser. No. 09/682,133 filed Jul. 25, 2001, by Schneider, entitled "Method, product, and apparatus for requesting a network resource" teaches how to create a market driven registrar competition across all TLDs (e.g., ccTLDs, gTLDs, alternate TLDs, and the like) by providing domain name wildcard redirection, particularly in a gTLD zone file, and U.S. patent application Ser. No. 09/682,351 filed Aug. 23, 2001, by Schneider, entitled "Fictitious domain name method, system, product, and apparatus" discloses how to create a competitive market driven namespace provider system across all TLDAs by providing fictitious domain name wildcard redirection in a root zone file, in this case through a proposed infrastructure domain "tlda.arpa". Though these patent applications show new methods of using DNS resource records in public zone files (e.g., root zone, TLD zone), further methods have since been constructed that will be shown in this instant invention.

Due to the perceived shortage of TLDs, the struggle to add new TLDs has enabled industry to overlook solutions for extending the use of the current domain name space. Such art clearly demonstrates that there is a need for a system to foster better use of domain name space. Accordingly, in light of the above, there is a strong need in the art for a system and method for enhancing how domain name space can be more extensively used on a network such as the Internet.

SUMMARY OF INVENTION

The present invention enables fictitious domain name resolution before, during, and/or after a DNS query. The invention enables the DNS to resolve all DNS friendly identifiers. The present invention enables any namespace to be transformed into a FDN for DNS resolution processing including reiterative and/or recursive identifier transformations across multiple namespaces. The invention enables the smallest possible modification to the DNS to achieve immediate ubiquity to FDN usage on the Internet without having to change MSIE autosearch or add new client resolvers. The present invention enables the single authoritative root to process all HLDs as resolvable enabling the DNS to become all inclusive leaving alternative roots no choice but to create a system of virtually exclusive roots instead of VIRs. The invention enables a new infrastructure domain such as "tlda.arpa" to be used as a Primary Virtual Zero Level Domain (PVZLD) for brokering FDN requests across multiple namespaces to namespace providers who manage Secondary Virtual Zero Level Domains (SVZLD).

The present invention may use a wildcard resource record having an IP address corresponding to a network resource adapted to determine which domain name registration provider of a plurality of domain name registration providers can process the registration request when it is determined that a domain name is available for registration. The invention can attempt to access a network resource by generating a resolvable subdomain from the initial domain name before potentially processing a registration request. The present invention may generate many identifiers such as keywords, fictitious domain names and the like in response to initiating a registration request from a network resource that can not be accessed/located or from an unresolvable domain name.

The present invention can bypass search request activation after a failed DNS request and instead redirect a DNS friendly identifier to a request portal to perform one or more of the following requests; navigation request, registration request, WHOIS request, back-order request, prefix request, suffix request, command request, resolution request, redirection request, search request, identifier registration request, commerce request, subscription request, dialing request, messaging request, conferencing request, vendor request, service request, login request, status request, authorization request, and reference request. The present invention can include numerical TLDs to create an alternate root zone managed by participating ISPs in order to enhance domain name space with respect to numerical DNS friendly identifiers. The invention is enabled to perform mnemonic conversion techniques when translating a specific class of numerical FDNs into the "e164.arpa" domain.

The invention enables any ISP DNS server to be configured to point to a root zone alias or Virtual Zero Level Domain to enable clients to immediately and transparently use the benefits of improved DNS resolution. The present invention can use an emulated root domain or root zone alias to virtually eliminate failed DNS requests and/or access resources across a plurality of namespaces. The present invention can resolve and forward unregistered DNS friendly identifiers to network resources configured to provide additional request type services such as resolution, registration, search, discovery, directory, and information services. The invention can assist in financially sustaining Internet organizations such as ICANN, IANA, IETF, ISOC, and the like by realizing new sources of revenue.

The present invention can perform a search engine request in response a hostname or domain name resolution request. The present invention can provide access to the listing of one or more trademark registrations relating to a search engine request of a keyword. The invention enables an autosearch to process any request other than that of a search request. The invention enables automatic termination of a detected autosearch to initiate an autoscan, the autoscan adapted to access a request portal and/or perform one of a search and registration request with the first domain name or keyword. The present invention can use a browser helper object to construct a URL to override a detected autosearch and access a network resource configured to extract autosearch parameters from the newly constructed URL.

In general, in accordance with the present invention with a keyword, a computer implemented method includes generating a domain name having the keyword, and requesting a network resource corresponding to the domain name, wherein the network resource is adapted to extract the keyword from the domain name.

In accordance with an aspect of the present invention, with a first domain name, a computer implemented method includes generating a second domain name having the first domain name, and requesting a network resource corresponding to the second domain name, wherein the network resource is adapted to extract the first domain name from the second domain name.

In accordance with another aspect of the present invention, a DNS server includes a DNS query, a root zone used for attempting to resolve the DNS query, and at least one configuration parameter adapted to resolve the DNS query when it is determined that the root zone can not resolve the DNS query.

In accordance with yet another aspect of the present invention, a root zone having at least one root resource record for resolving a DNS query includes a first root resource record configured to resolve the DNS query when it is determined that the DNS query does not include a top level domain.

In accordance with another aspect of the present invention, a root zone having at least one root resource record for resolving a DNS query includes a first root resource record configured to resolve the DNS query when no other root resource record is in the root zone or when no other root resource record in the root zone is configured to resolve the DNS query.

In accordance with yet another aspect of the present invention, a method for presenting search results includes obtaining the search results wherein at least one search result includes a resource identifier corresponding to a measure of intellectual property usage, ordering the search results based on the measure of intellectual property usage, and presenting the ordered search results.

In accordance with another aspect of the present invention, a DNS server includes a DNS query having a highest level domain (HLD), a root zone having at least one root resource record, and the root resource record adapted to resolve the DNS query when it is determined that the HLD is a top level domain alias (TLDA).

In accordance with yet additional aspects of the present invention, a device or system which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF DRAWINGS

FIG. 3c is a flowchart illustrating the steps performed for extracting a keyword from a domain name in accordance with the present invention.

FIG. 3d is a flowchart illustrating the steps performed for extracting a first domain name from a second domain name in accordance with the present invention.

FIG. 8b is an illustration of modifications to the output of the search request to extend the functionality of the search results in accordance with the present invention.

FIG. 8f is a diagram depicting a URL/IP search engine submittal interface in accordance with the present invention.

FIG. 11b illustrates an exemplary virtual root zone alias in accordance with the present invention.

FIG. 11c illustrates an exemplary virtual TLD zone alias in accordance with the present invention.

FIG. 13c illustrates an exemplary list of stub zones to supplement any root zone with numerical extensions in accordance with the present invention.

FIG. 13d illustrates an exemplary numerical domain zone in accordance with the present invention.

DETAILED DESCRIPTION

Figure 1A:
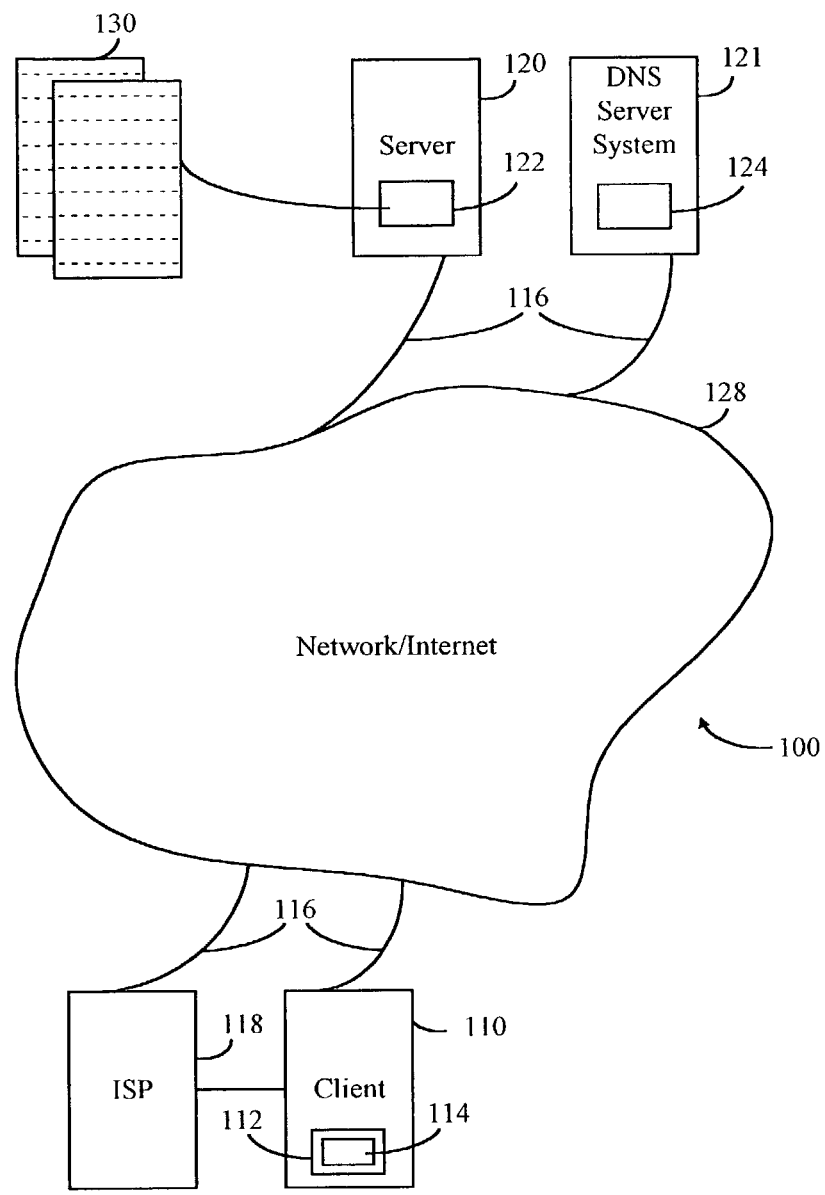
FIG. 1a is a block diagram of a distributed computer system in accordance with the present invention.

The present invention will now be described with reference to the drawings, wherein like reference numerals are used to refer to like elements throughout.

FIG. 1a illustrates an exemplary system for providing a distributed computer system 100 in accordance with one aspect of the present invention and may include client computers or any network access apparatus 110 connected to server computers 120 via a network 128. The distributed system 100 may include client computers or any network access apparatus 110 connected to server computers 120 via a network 128. The network 128 may use Internet communications protocols (IP) to allow clients 110 to communicate with servers 120. The communication device of a network access apparatus 110 may include a transceiver, a modem, a network interface card, or other interface devices to communicate with the electronic network 128. The network access apparatus 110 may be in operative association with and/or include a Global Positioning System (GPS) receiver. The modem may communicate with the electronic network 128 via a line 116 such as a telephone line, an ISDN line, a coaxial line, a cable television line, a fiber optic line, or a computer network line. Alternatively, the modem may wirelessly communicate with the electronic network 128. The electronic network 128 may be accessed by any client device via a direct connection, an Internet Service Provider (ISP) 118, an on-line service, a local area network service, a wide area network service, a cable television service, a wireless data service, an intranet, a virtual private network, a peer-to-peer network, a satellite service, or the like. Communication links that are used to connect the various systems depicted throughout the present invention may be of various types including hardwire links, optical links, satellite or other wireless communications links, wave propagation links, or any other mechanisms for communication of information.

Client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an internet television, a set top box, a web-enabled telephone, an internet appliance, a portable wireless device, a television receiver, a game player, a video recorder, and/or an audio component, for example.

Each client 110 typically includes one or more processors 140, memories 144, and input/output devices 148. An input device may be any suitable device for the user to give input to client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they could be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 128 may include hundreds of thousands of individual networks of computers. One aspect of the present invention includes a specific type of server system called a DNS server system 121 which stores in memory a DNS database 124 having DNS records (resource records) that translate domain names into IP addresses and vice versa. The DNS server system 121 is connected 116 to a network 128.

The DNS is a distributed database (of mappings) 124 implemented in a hierarchy of DNS servers (name servers) 121 and an application-layer protocol that allows hosts and name servers to communicate in order to provide the translation service. Name servers 121 are usually UNIX machines running BIND software. In order to deal with an issue of scale of the Internet, the DNS uses a large number of name servers 121, organized in a hierarchical fashion and distributed around the world. No single name server 121 has all of the mappings 124 for all of the hosts in the Internet. Instead, the mappings 124 are distributed across many name servers 121.

Although the client computers 110 are shown separate from the server computers 120, it should be understood that a single computer may perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced with Intranets and more generally in distributed environments in which a client computer requests resources from a server computer.

During operation of the distributed system 100, users of the clients 110 may desire to access information records 122 stored by the servers 120 while utilizing, for example, the Web. The records of information 122 can be in the form of Web pages 130. The pages 130 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 130. The browser programs 112 enable users to enter addresses of specific Web pages 130 to be retrieved. Typically, the address of a Web page is specified as a Uniform Resource Identifier (URI) or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

A client of the DNS is called a resolver 114. Resolvers 114 are typically located in the application layer of the networking software of each TCP/IP capable machine. Users typically do not interact directly with the resolver 114. Resolvers 114 query the DNS by directing queries at name servers, which contain parts of the distributed database that is accessed by using the DNS protocols to translate domain names into IP addresses needed for transmission of information across the network. DNS is commonly employed by other application-layer protocols—including HTTP, SMTP and FTP—to translate user-supplied domain names to IP addresses. When a browser program 112 (e.g., an HTTP client), running on a user's machine, requests a URL having a resolvable domain name, in order for the user's machine to be able to send an HTTP request message to a server 120, the user's machine must obtain the IP address of the domain name. The user machine then runs the resolver 114 (DNS client) on the client-side of the DNS application. The browser 112 extracts the domain name from the URL and passes the domain name to the resolver 114 on the client-side of the DNS application. As part of a DNS query message, the DNS client 114 sends the domain name to a DNS server system 121 connected to the Internet. The DNS client 114 eventually receives a reply, which includes the IP address for the domain name. The browser then opens a TCP connection 116 to the HTTP server process 120 located at the IP address.

Figure 1B:
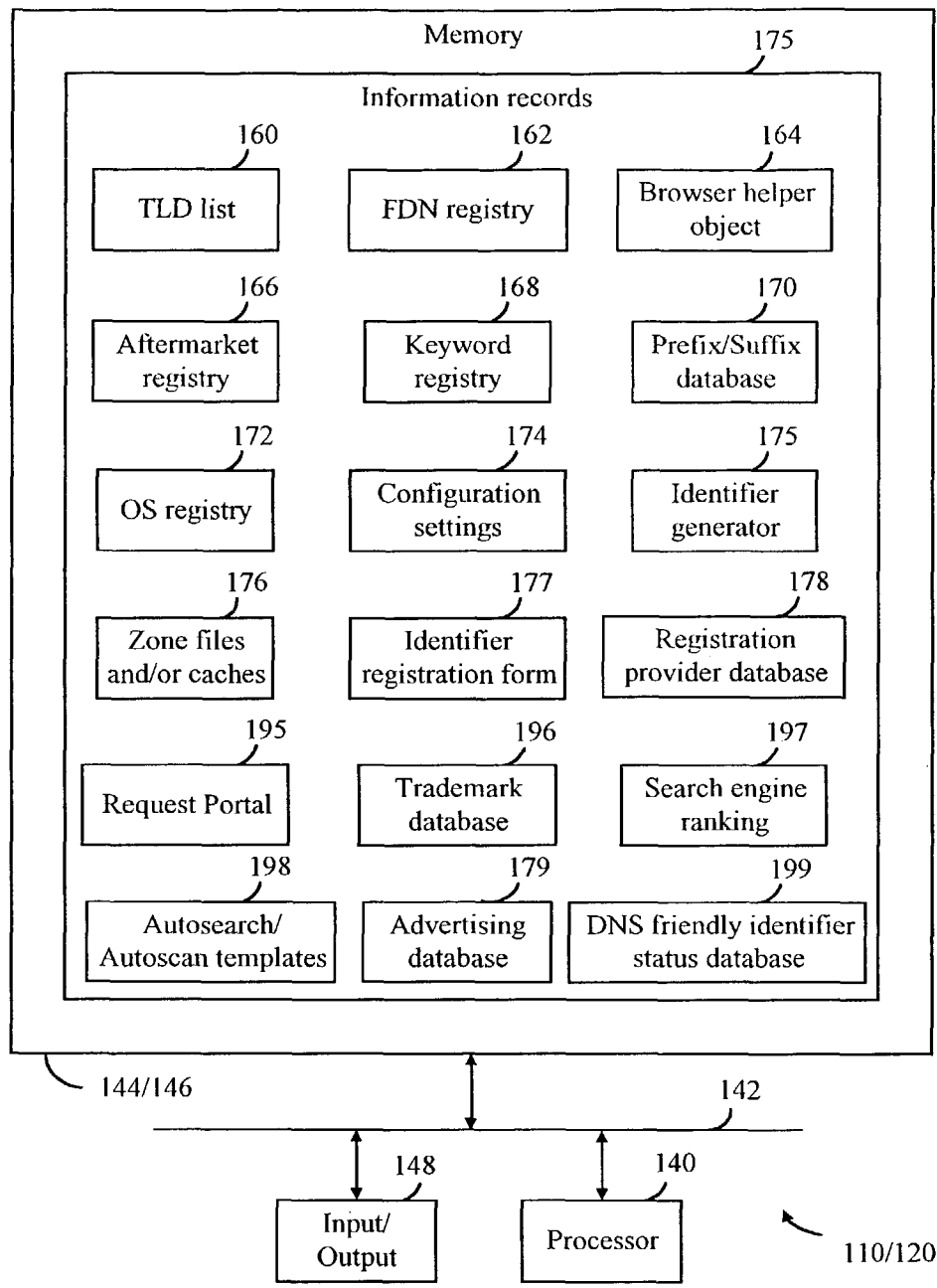
FIG. 1b is a block diagram illustrating exemplary information records stored in memory in accordance with the present invention.

FIG. 1b illustrates a block diagram of a computing device in accordance with the present invention. A computing device having a storage device such as memory 144 and/or storage medium 146 is in operative association with a processor 140 and input/output devices 148 via at least one data bus 142. Such a computing device can operate in a self-contained or standalone capacity or in any combination as a client 110 and/or server 120 computing system and/or network access device of client/subscriber system 110 or server/provider system 120. Stored in memory 144 may be programs/scripts, and information records 122 having any combination of exemplary content such as lists, files, and databases. Such records may include for example: TLD list 160, FDN registry 162

(including NDNs), browser helper object 164, aftermarket registry 166 (e.g., auction registry, back-order registry, etc.), keyword registry 168, prefix/suffix database 170, operating system registry 172, configuration setting information 174, identifier generator 175, zone files/zone file caches 176, identifier registration form 177, registration provider database 178, advertising database, request portal 195 (including services and vendors), trademark database 196, search engine ranking database 197, autosearch/autoscan templates 198, and DNS friendly identifier status database 199. These information records 122 are further introduced and may be discussed in more detail throughout the disclosure of this invention.

Figure 1C:
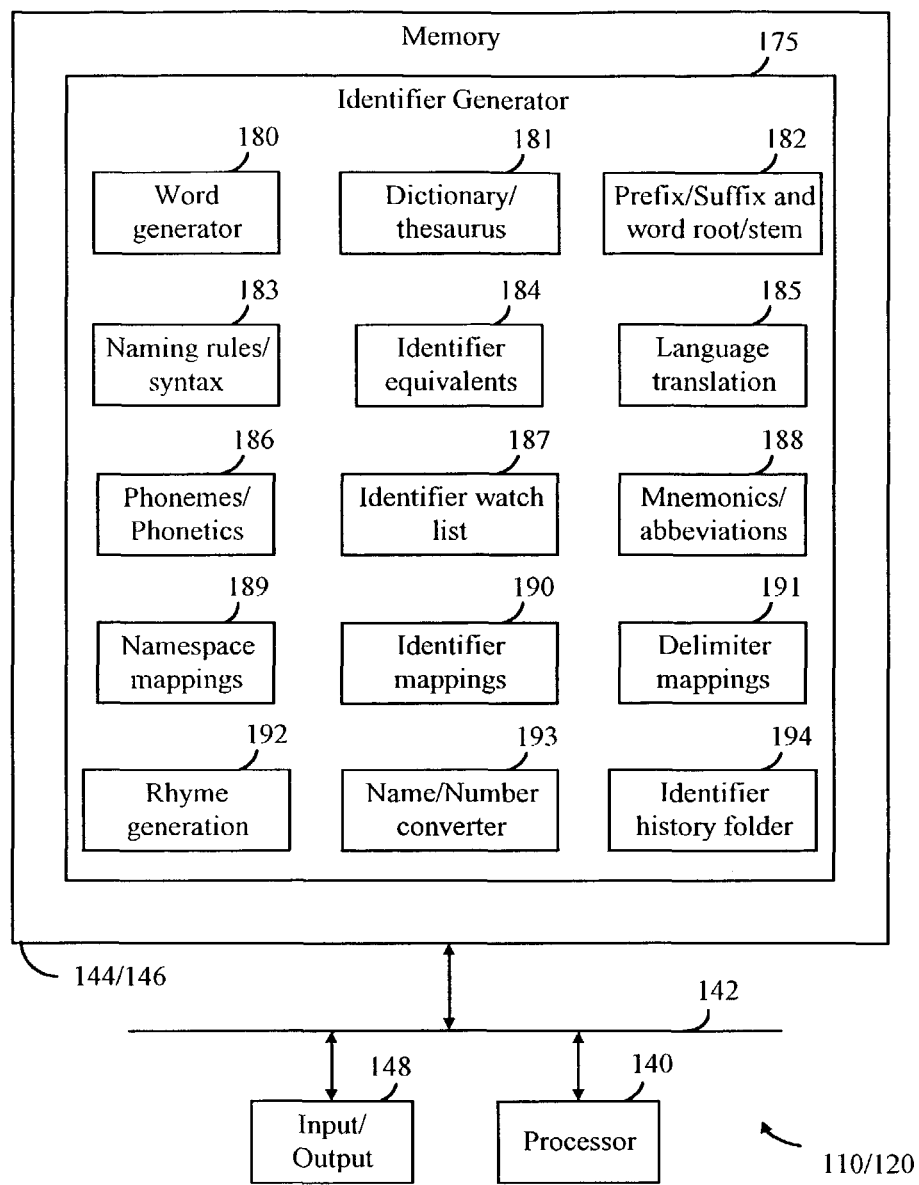
FIG. 1c is a block diagram illustrating identifier generator components and other exemplary information records stored in memory in accordance with the present invention.

FIG. 1c is a block diagram illustrating identifier generator components and other exemplary information records stored in memory in accordance with the present invention. A computing device having a storage device such as memory 144 and/or storage medium 146 is in operative association with a processor 140 and input/output devices 148 via at least one data bus 142. Such a computing device can operate in a self-contained or standalone capacity or in any combination as a client 110 and/or server 120 computing system and/or network access device of client/subscriber system 110 or server/provider system 120. Stored in memory 144 may be programs/scripts, and information records 122 having any combination of exemplary content such as lists, files, and databases. Such records may include for example: word generation methods 180, dictionary/thesaurus 181, prefix/suffix and word root/stem 182, set of heuristic naming rules/namespace syntax 183, identifier equivalents 184, language translation 185, phonetics/phonemes (e.g., misspelling) 186, identifier watch list 187 (e.g., list of desirable descriptors, personal identifier portfolio, competitor identifier portfolio), mnemonics/abbreviations 188, namespace mappings 189, identifier mapping 190, delimiter mapping 191, rhyme generation 192, name/number conversion 193, and identifier history 194. These identifier generator components 175 may be further introduced and discussed in more detail throughout the disclosure of the present invention.

Figure 2:
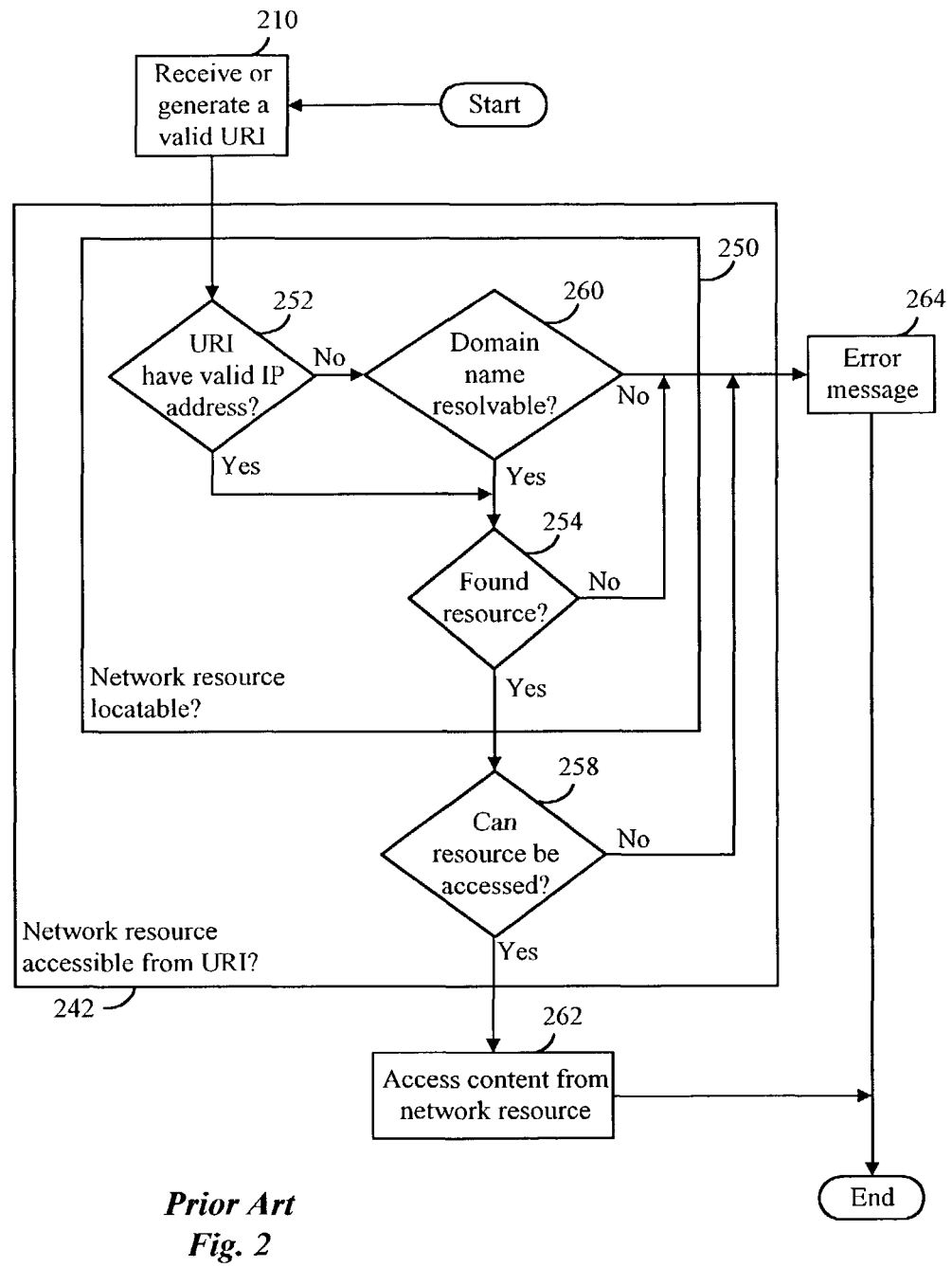
FIG. 2 is a top-level flowchart illustrating the steps performed by a prior art system for accessing a network resource.

FIG. 2 is a top-level flowchart illustrating the steps performed by a prior art system for accessing a network resource. A device such as a network access apparatus 110, servlet, applet, stand-alone executable program, or user interface element such as a text box object, command line, speech to text interface, location field of a web browser, may receive input such as text or voice representative of a received/generated resource identifier in step 210. It can be determined in step 250 whether a network resource can be located from the received/generated valid URI. When the URI is determined in step 252 to not include a valid IP address, and instead includes a domain name, it is then determined in step 260 whether the domain name is resolvable.

When the domain name is determined resolvable (step 260) or when the URI includes a valid IP address (step 252) it is further determined in step 254 whether a network resource such as a web page or web server can be located or found from the URI. When the network resource can be located (step 250) it can then be determined in step 258 whether the network resource can be accessed. When content, for example, can be accessed from the web server (network resource) then the network resource is accessible from URI (step 242) and results, if any, may then be provided in step 262. When the domain name is determined not resolvable (step 260) or when the resource can not be found (step 254) or when the resource can not be accessed (step 258) then an error message can be presented in step 264.

Figure 3A:
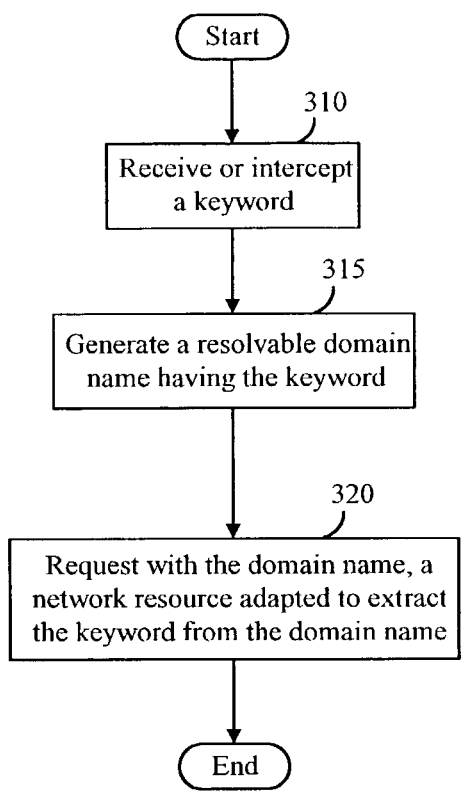
FIG. 3a illustrates the steps performed for navigating to a network resource from a keyword in accordance with the present invention.

FIG. 3a is a flowchart illustrating the steps performed for navigating to a network resource from a keyword in accordance with the present invention. A device such as a network access apparatus 110, servlet, applet, stand-alone executable program, or user interface element such as a text box object, command line, speech to text interface, location field of a web browser 112, may receive or intercept and parse input such as text or voice in step 310. When a keyword or hostname, in particular is received or intercepted, a resolvable domain name having the keyword can be generated in step 315. A network resource can then be requested in step 320 from the generated domain name. The network resource can be adapted to extract the keyword from the domain name for further processing.

For example, a browser having a search function receives a keyword as input. Typically, the keyword/hostname is forwarded to the search function after a failed DNS request. By generating an identifier that is a domain name having the keyword, the domain name can act as a carrier/envelope to the keyword. A DNS server (which can act as a proxy server and managed by an ISP, for example) can be adapted to resolve all such generated identifiers for the purpose of requesting (e.g., registering, searching, or resolving) at least a IP portion of the identifier. The DNS server can return an IP address of a network resource that is adapted to extract the keyword from the domain name identifier. In this way, the activation of a search request after a failed DNS request can be avoided entirely, enabling a browser to use keywords as a network navigation tool, search tool, and registration tool.

Figure 3B:
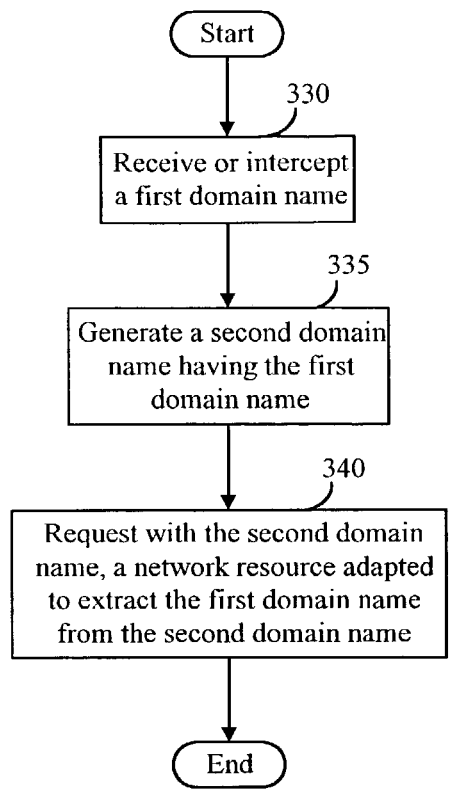
FIG. 3b is a flowchart illustrating the steps performed for navigating to a network resource from a domain name in accordance with the present invention.

FIG. 3b is a flowchart illustrating the steps performed for navigating to a network resource from a domain name in accordance with the present invention. A device such as a network access apparatus 110, servlet, applet, stand-alone executable program, or user interface element such as a text box object, command line, speech to text interface, location field of a web browser 112, may receive or intercept and parse input such as text or voice in step 330. When a first domain name, in particular is received or intercepted, a resolvable second domain name having the first domain name can be generated in step 335. A network resource can then be requested in step 340 from the second domain name. The network resource is adapted to extract the first domain name from the second domain name for further processing.

For example, a browser having a search function receives a first domain name as input. Typically, the first domain name is forwarded to the search function after a failed DNS request. By generating an identifier that is a second domain name having the first domain name, the second domain name can act as a carrier/envelope to the first domain name. A DNS server (which can act as a proxy server and managed by an ISP, for example) can be adapted to resolve all such generated identifiers for the purpose of requesting (e.g., registering, searching, or resolving, etc.) at least a portion of the identifier. The DNS server can return an IP address of a network resource that is adapted to extract the first domain name from the second domain name. In this way, the activation of a search request after a failed DNS request can be avoided entirely, enabling a browser to be use domain names as both a navigation tool, search tool, and registration tool.

FIG. 3c is a flowchart illustrating the steps performed for extracting a keyword from a domain name in accordance with the present invention. When the domain name having the keyword is generated (step 315), a network resource corresponding to the domain name can be accessed in step 360. The keyword can then be extracted in step 365 by the network resource when accessed. For instance, environment variables from header field of a HTTP request can be parsed to extract the keyword. The activation of a search request (similar to FIG. 3a) can be avoided entirely, enabling a browser to use keywords as a network navigation tool, search tool, and registration tool.

FIG. 3d is a flowchart illustrating the steps performed for extracting a first domain name from a second domain name in accordance with the present invention. When the second domain name having the first domain name is generated (step 335), a network resource corresponding to the second domain name can be accessed in step 370. The first domain name can then be extracted in step 375 by the network resource when accessed. For instance, environment variables from header field of a HTTP request can be parsed to extract the keyword. The activation of a search request (similar to FIG. 3b) can be avoided entirely, enabling a browser to use keywords as a network navigation tool, search tool, and registration tool.

Figure 4A:
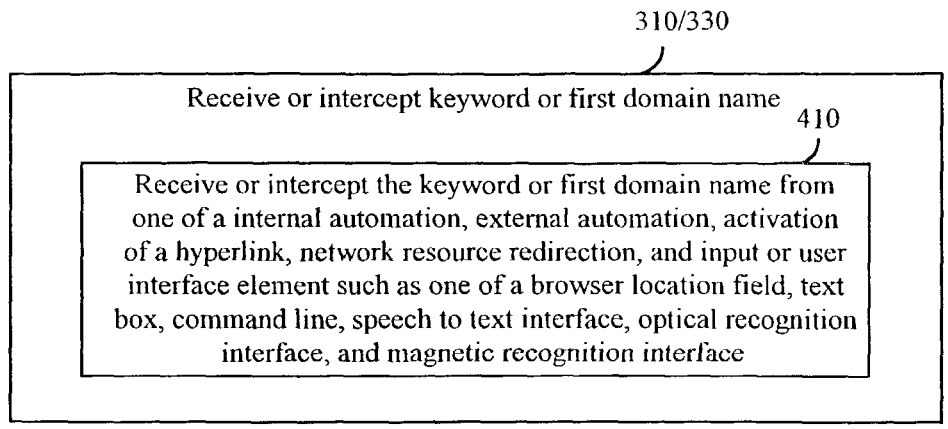
FIG. 4a is a flowchart illustrating the steps performed for receiving or intercepting a keyword or first domain name in accordance with the present invention.

FIG. 4a is a flowchart illustrating the steps performed for receiving or intercepting a keyword or first domain name in accordance with the present invention. When a keyword or first domain name is received or intercepted (step 310 or step 330), the keyword or first domain name can be received or intercepted in step 410 from one of a internal automation, external automation, activation of a hyperlink, network resource redirection, and input or user interface element such as one of a browser location field, text box, command line, speech to text interface, optical recognition interface, and magnetic recognition interface.

Figure 4B:
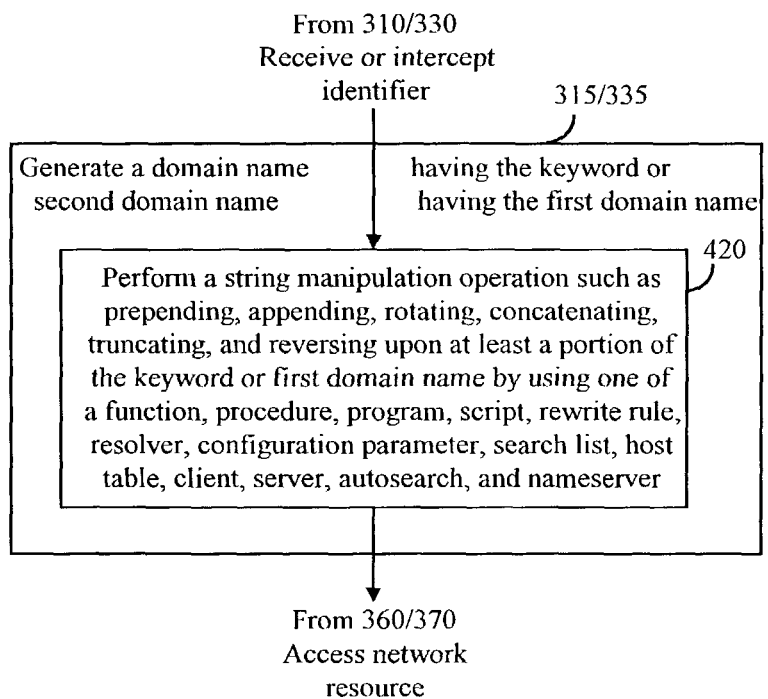
FIG. 4b is a flowchart illustrating the steps performed for generating a resolvable domain name in accordance with the present invention.

FIG. 4b is a flowchart illustrating the steps performed for generating a resolvable domain name in accordance with the present invention. When an identifier is received or intercepted (step 310 or step 330), a string manipulation operation can be performed in step 420 order to generate (step 315 or step 335) a resolvable domain name having the keyword or second domain name having the first domain name. A string manipulation operation such as prepending, appending, rotating, concatenating, truncating, and reversing upon at least a portion of the generated domain name and the keyword or a second domain name from the first domain name can also performed by using one of a function, procedure, program, script, rewrite rule, resolver, configuration parameter, search list, host table, client, server, autosearch, and nameserver. Upon completion of the string manipulation operation, the network resource can be accessed (step 360 or step 370).

Figure 4C:
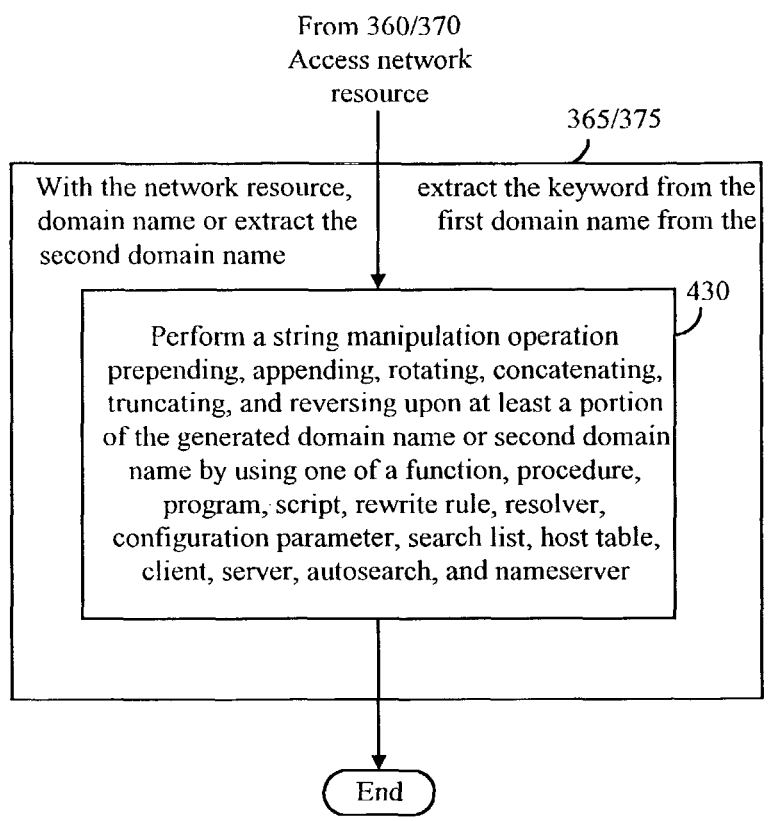
FIG. 4c is a flowchart illustrating the steps performed for extracting a keyword or domain name from an identifier in accordance with the present invention.

FIG. 4c is a flowchart illustrating the steps performed for extracting a keyword or domain name from an identifier in accordance with the present invention. When a network adapted to extract keywords and domain names from a requesting identifier is accessed (step 360 or step 370), a string manipulation operation can be performed in step 430 in order to extract (step 365 or step 375) a domain name or keyword. A string manipulation operation such as prepending, appending, rotating, concatenating, truncating, and reversing upon at least a portion of the generated domain name or second domain name from can also be performed by using one of a function, procedure, program, script, rewrite rule, resolver, configuration parameter, search list, host table, client, server, autosearch, and nameserver.

For instance, a browser receives the keyword "example" and the domain name "example.keywordrouter.org" is generated by a string manipulation operation such as that of an append function. This domain name can be generated on the client side (e.g., from a DLL, TCP/IP stack, configuration file, or operating system registry) or on any server (e.g., ISP server, DNS server, proxy server, etc.). A resource record in the "keywordrouter.org" zone file can be used to access a network resource specifically adapted to perform a string manipulation operation such as a truncation operation to extract the keyword "example" and either automatically perform or provide a user with the opportunity to perform any non-DNS type request one of a navigation request, search request, directory request, discovery request, and registration request depending upon configuration parameters.

Figure 5A:
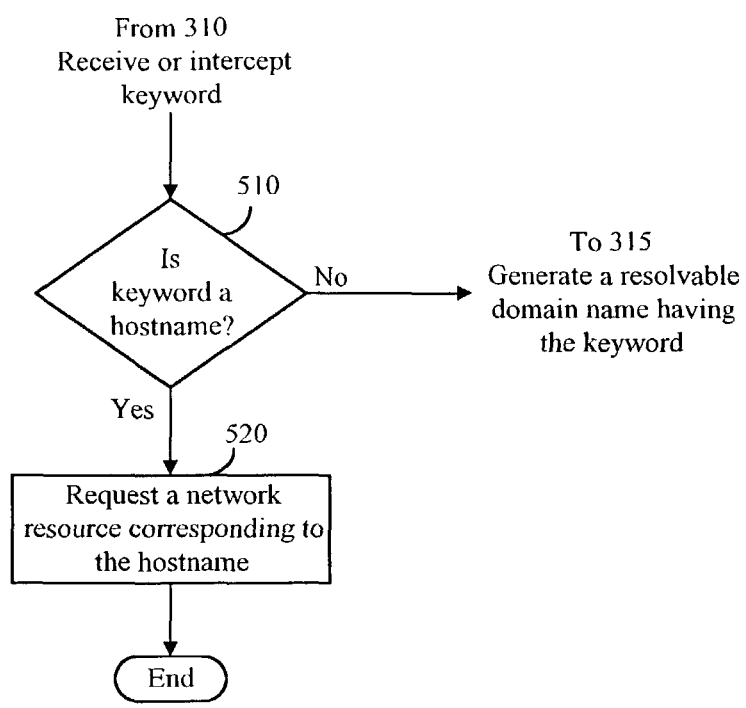
FIG. 5a is a flowchart illustrating the steps performed for processing a hostname as a keyword in accordance with the present invention.

FIG. 5a is a flowchart illustrating the steps performed for processing a hostname as a keyword in accordance with the present invention. When a keyword is received or intercepted (step 310), it can be determined in step 510 whether the keyword is a hostname. If so, then a network resource corresponding to the hostname can be requested in step 520 otherwise a resolvable domain name having the keyword is generated (step 315). For example, a keyword is not intercepted on the client side but instead received and passed to a nameserver as a hostname. When a hostname can not be initially found, the client and/or nameserver can be configured to append a search domain name and retry the DNS query.

Figure 5B:
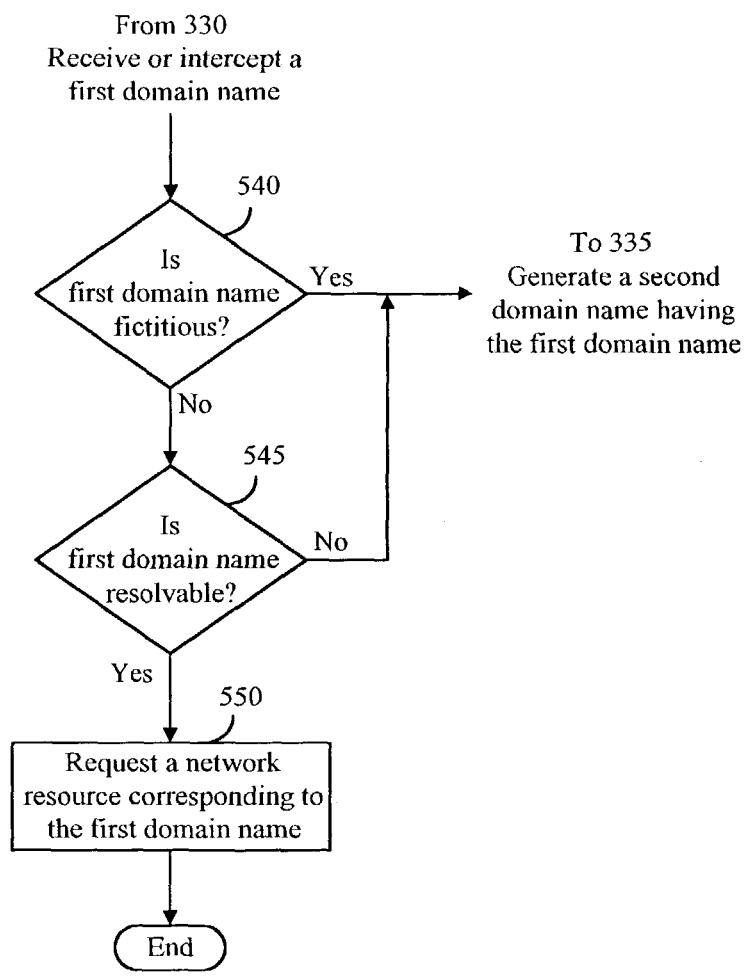
FIG. 5b is a flowchart illustrating the steps performed for processing a domain name in accordance with the present invention.

FIG. 5b is a flowchart illustrating the steps performed for processing a domain name in accordance with the present invention. When a first domain name is received or intercepted (step 330), it can be determined in step 540 whether the first domain name is fictitious. If not, then it can be determined in step 545 whether the first domain name is resolvable. If so, then a network resource corresponding to the first domain name can be requested in step 550. When the first domain name is either fictitious (step 540) or not resolvable (step 545), a resolvable second domain name having the first domain name can then be generated (step 315).

Figure 6A:
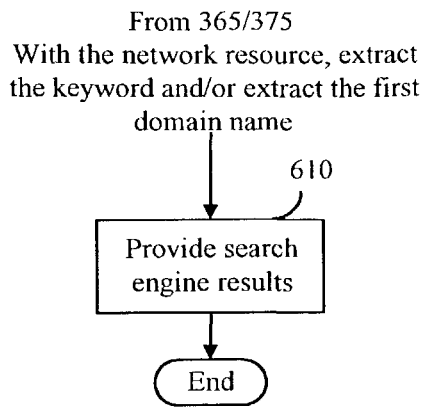
FIG. 6a is a flowchart illustrating the steps performed for providing search results in accordance with the present invention.

FIG. 6a is a flowchart illustrating the steps performed for providing search results in accordance with the present invention. When the keyword (step 365) or domain name (step 375) is extracted from the generated domain name with the network resource, search results corresponding to the keyword or domain name can then be provided in step 610.

Figure 6B:
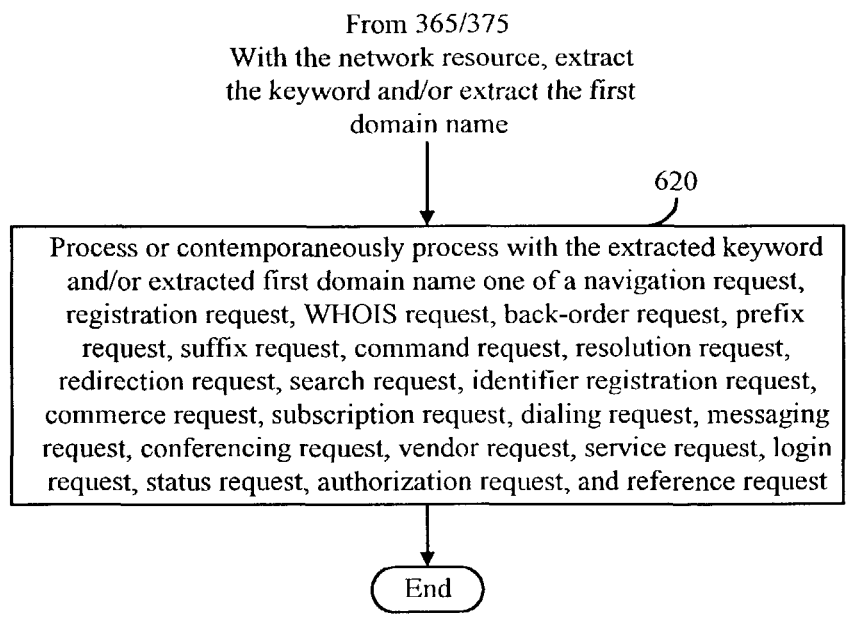
FIG. 6b is a flowchart illustrating the steps performed for contemporaneously processing many request types in accordance with the present invention.

FIG. 6b is a flowchart illustrating the steps performed for processing many request types in accordance with the present invention. When the keyword (step 365) or domain name (step 375) is extracted from the generated domain name with the network resource, the extracted keyword and/or extracted first domain name can be processed or contemporaneously be processed in step 620 with one of a navigation request, registration request, WHOIS request, back-order request, prefix request, suffix request, command request, resolution request, redirection request, search request, identifier registration request, commerce request, subscription request, dialing request, messaging request, conferencing request, vendor request, service request, login request, status request, authorization request, and reference request. Essentially the availability of any known request type can be grouped into a new type of web page called a "request portal" 195.

Figure 7A:
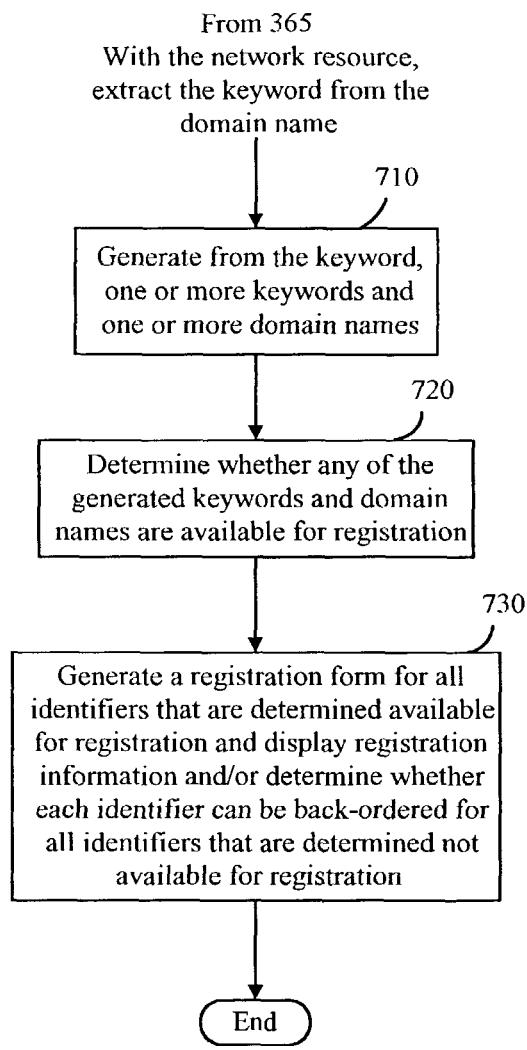
FIG. 7a is a flowchart illustrating the steps performed for determining identifier availability from a keyword in accordance with the present invention.

FIG. 7a is a flowchart illustrating the steps performed for determining resource identifier availability in accordance with the present invention. When the keyword is extracted (step 365) from the domain name with the network resource, one or more keywords and one or more domain names can be generated in step 710 from the extracted keyword. When such identifiers are generated, it can be determined in step 720 whether any of the generated keywords and domain names are available for registration. If so, then a registration form can be generated in step 730 for all identifiers that are determined available for registration otherwise registration information can be displayed (step 730) with the option of determining whether each identifier can be back-ordered for all identifiers that are determined not available for registration.

Figure 7B:
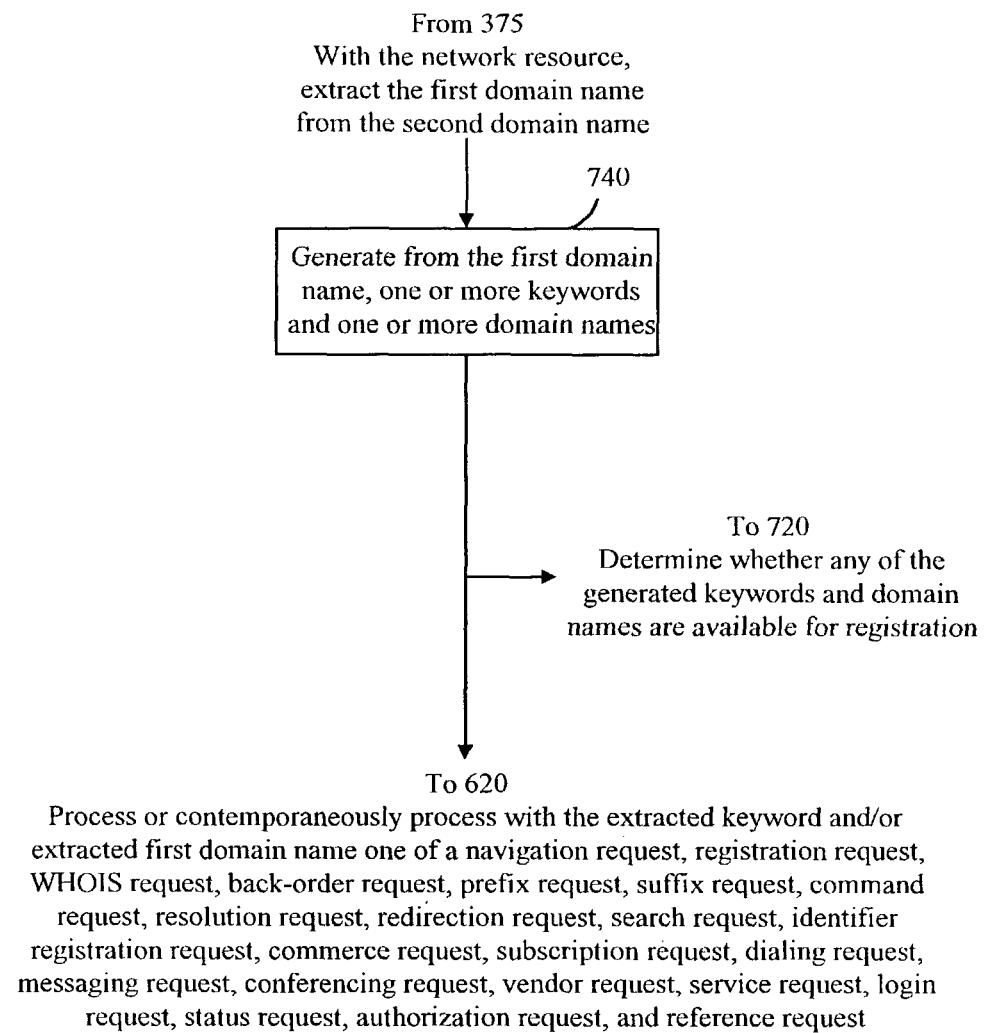
FIG. 7b is a flowchart illustrating the steps performed for determining identifier availability from a domain name in accordance with the present invention.

FIG. 7b is a flowchart illustrating the steps performed for determining identifier availability from a domain name in accordance with the present invention. When the first domain name is extracted (step 375) from the second domain name by the network resource adapted to perform the extraction, one or more keywords and/or one or more domain names can be generated in step 740 from the first domain name. When such identifiers are generated, it can be determined (step 720) whether any of the generated keywords and domain names are available for registration.

Figure 8A:
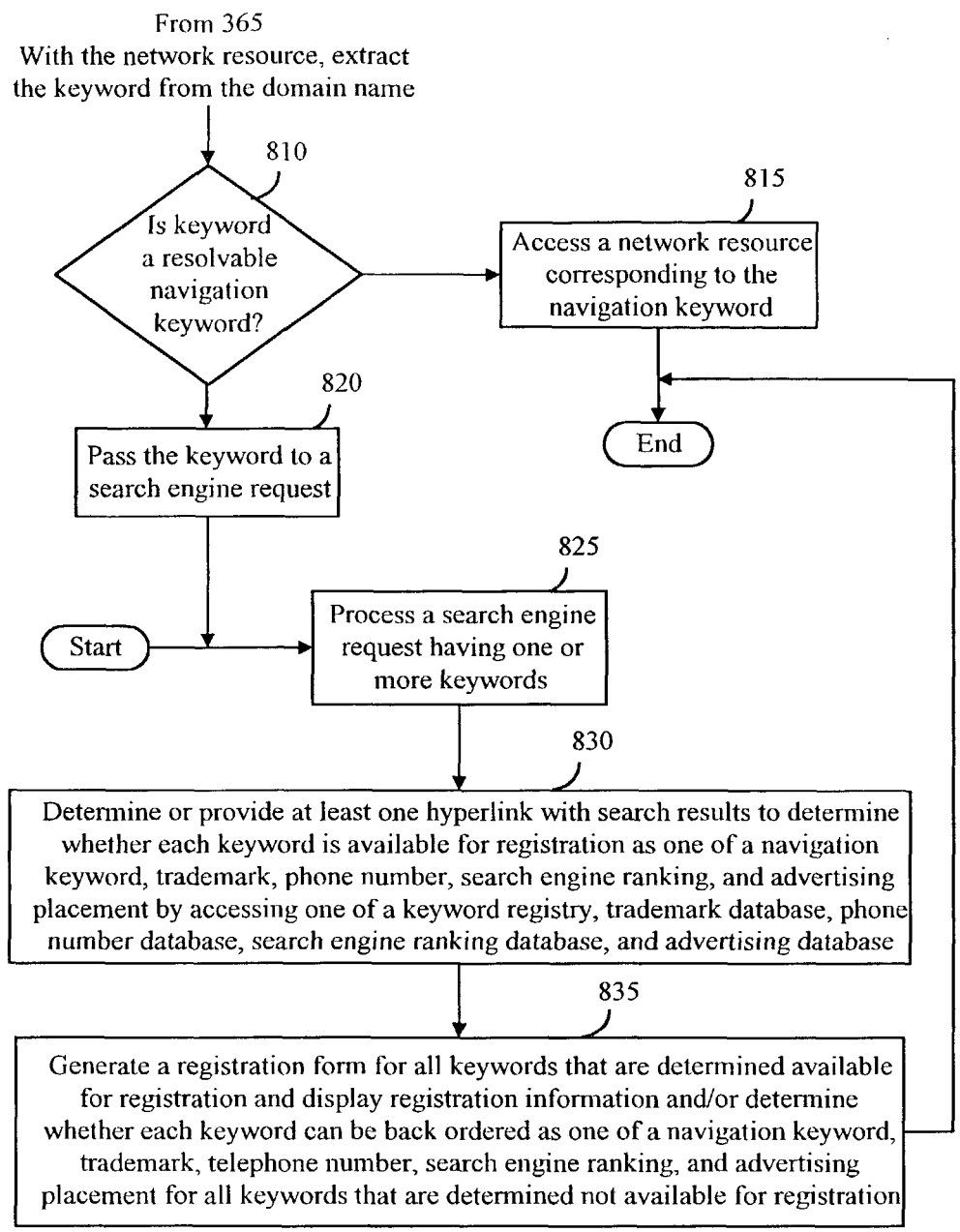
FIG. 8a is a flowchart illustrating the steps performed for determining whether a keyword is available for registration as one of a navigation keyword, trademark, telephone number, search engine ranking, and advertising placement in accordance with the present invention.

FIG. 8a is a flowchart illustrating the steps performed for determining whether a keyword is available for registration as one of a trademark, telephone number, search engine ranking, and advertising placement in accordance with the present invention. In one aspect of the present invention, when the keyword is extracted (step 365) from the domain name with the network resource it can then be determined in step 810 whether the extracted keyword is a resolvable navigation keyword. If so, then a network resource corresponding to the navigation keyword can be accessed in step 815 otherwise the keyword can be passed in step 820 as a query to a search engine request. Whenever a search engine request having one or more keywords is processed in step 825 it can be determined in step 830 either automatically or by providing at least one hyperlink with search results as to whether each keyword is available for registration as one of a navigation keyword, trademark, phone number, search engine ranking, and advertising placement by accessing one of a keyword registry, trademark database, phone number database, search engine ranking database 197, and advertising database. A registration form for all keywords that are determined available for registration can be generated in step 835 and registration information can be displayed (step 835) with the option of determining whether each keyword can be back-ordered as one of a navigation keyword, trademark, telephone number, search engine ranking, and advertising placement for all keywords that are determined not available for registration.

For example, when the keyword is obtained from the domain name, it is desirable to determine how the keyword can be processed according to settings, preferences, or configuration parameters. For instance, the keyword might not be registered in one or more contexts as shown above. A registration form can be inputted by a user or automatically populated based on a "cookie" or registration profile of the user. When a user submits such a form, variables such as contact information and the like can be formatted, exported, passed in accordance with the requirements of the appropriate registrar, registry, search engine, trademark office, and the like.

In the case of searching the keyword as a trademark, when "registration information" is provided, a listing of trademark registrations relating to the keyword can be displayed including displaying such trademark registration information contemporaneously with displaying other search results and the like. For instance, the search term or keywords "west coast travel" is obtained and a search engine request is performed, the search term can also be used to query a trademark database to find trademarks/tradenames/servicemarks that may match or are similar to the search term. Such trademark results can be included and/or accessed from any search results presented from the search engine request. An example of a URL that can be constructed to access trademark information while processing a search engine request is as follows:

"http://www.nameprotect.com/cgi-bin/freesearch/search.cgi? action=search&db=pto&ss=west+coast+travel"

FIG. 8b is an illustration of modifications to the output of the search request to extend the functionality of the search results in accordance with the present invention. For illustrative purposes, only the first four search results are shown from search input having the phrase "Float Factory". The first line of each given result may be underlined 840 indicating a hyperlink reference. The hyperlink accesses a network resource corresponding to the URI that is displayed in the last line of each given search result. In addition to such search results, additional hyperlinks 845 are included such as "Check to see if Float Factory can be trademarked", "Register Float Factory as a search engine ranking", and "Advertise your service with the phrase Float Factory", which access network resources that can determine whether the phrase/keywords can be trademarked, registered in connection with a URL to be listed in future search engine rankings or listed as part of advertisements in connection with the given keywords.

Figure 8C:
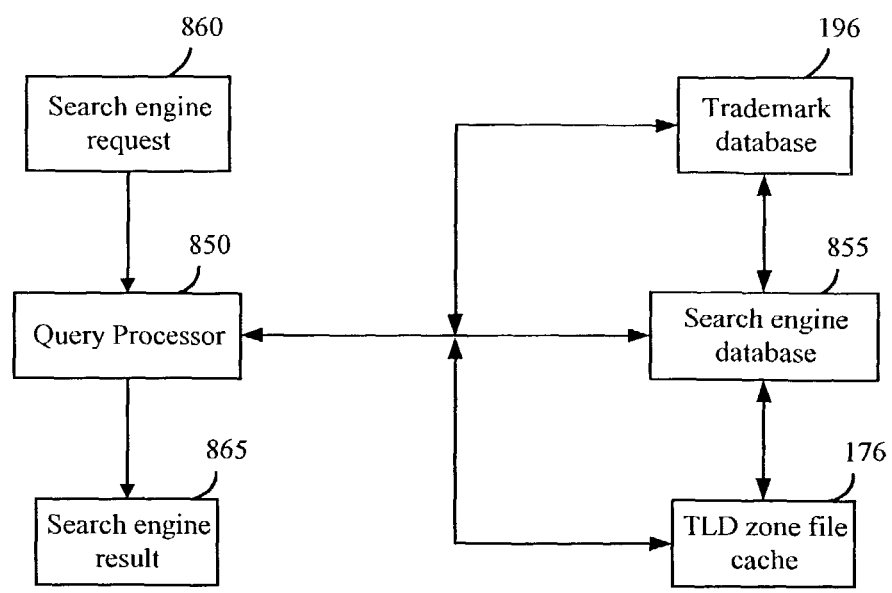
FIG. 8c is a block diagram illustrating a modified search engine request system in accordance with the present invention.

FIG. 8c is a block diagram illustrating a modified search engine request system in accordance with the present invention. A query processor 850 can be constructed to be in operative association with a search engine database 855, a trademark database 196, and one or more zone file caches 176. The query processor 850 can process a search engine request 860 and provide search engine results 865 by accessing at least one of a search engine database 855, trademark database 196, and zone file caches 176. For instance, when a one or more domain name are generated from one or more keywords or search terms that are not domain names, or when a domain name is entered as search engine input, as the query processor 850 accesses the search engine database 855, one or more zone files or data records representative of one or more zone files can be accessed to more quickly assess whether the obtained or generated domain name is available for registration, auction, or back-order, and the like. Network traffic is minimized by performing the extra step of accessing domain name related data in operative association with search engine data.

Figure 8D:
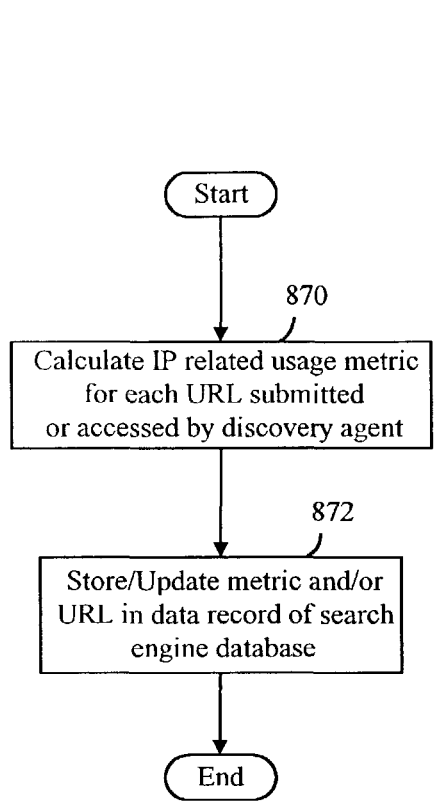
FIG. 8d is a flowchart illustrating the steps performed for determining a URL/Intellectual Property (IP) usage metric in accordance with the present invention.
Figure 8E:
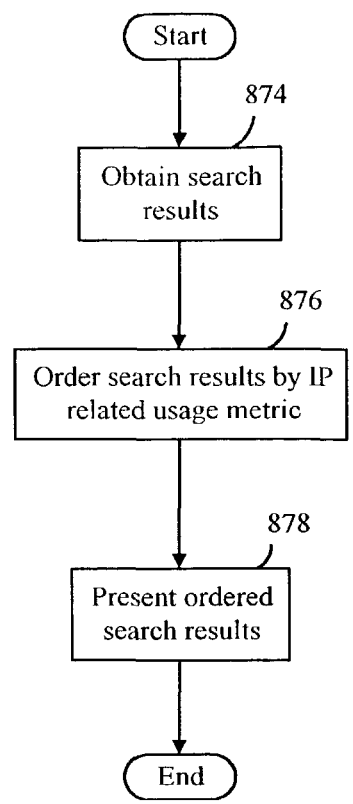
FIG. 8e is a flowchart illustrating the steps performed for sorting results by IP usage metric in accordance with the present invention.

FIG. 8d is a flowchart illustrating the steps performed for determining a URL/Intellectual Property (IP) related usage metric in accordance with the present invention. For each domain name or URL that has been submitted (e.g., search engine submittal service) or accessed by a discovery agent (e.g., spider, crawler, etc.), calculate in step 870 a corresponding IP related usage metric/value such as a trademark related metric and then store and/or update in step 872 such a metric and/or URL into a data record of a search engine database. FIG. 8e is a flowchart illustrating the steps performed for ordering results based on an IP related usage metric in accordance with the present invention. Whenever search results are obtained in step 874, the search results can be ordered in step 876 by the IP related usage metric. Such ordered search results can then be presented in step 878.

FIG. 8f is a diagram depicting a URL/Intellectual Property (IP) search engine submittal interface in accordance with the present invention. User Interface (UI) elements are depicted for providing IP information corresponding to the submittal of a URL to a search engine via the search engine submittal interface 880. In addition to providing typical known elements such as name, e-mail, and URL information, other elements such as more detailed contact information and a data element 882 for listing one or more FDNs that relate to the URL can be included. With the inclusion of FDN to URL submittals, search engines can generate additional revenue streams by making such fictitious identifiers more viable.

UI elements for associating intellectual property related information to URLs 884 can also be included. New entries for submitting patent, trademark, and copyright related information can be provided as part of the search engine submittal interface 880 that pertains to search engine rankings and URL submittals. For instance, a trademark identifier such as a country, federal, or state registration number or serial number, logo, or word mark can be provided to associate the submitter to the IP property right for the purpose of affecting the outcome of search engine rankings. A UI element can be used for binding a submitter or having a URL submitter declare 886 that the submitter is the owner of the trademark or is authorized by the owner of the trademark to use the listed trademark. Another UI element can be used for submitting 888 a digital certificate, digital signature, or PGP Public Key for the purpose of authenticating, verifying, and/or communicating with the property owner of the intellectual property right. Similar UI elements (not shown) can also be used for providing patent and copyright related information as well.

The submittal of such an intellectual property identifier can correspond to a calculated measure of IP strength. For instance, on a scale from 1 to 10, a state trademark may yield a 6 where as a federal trademark would yield a 10. The inclusion of an authentication identifier such as a digital signature may have a value of 8, etc. A composite value can be calculated as a means to measure brand strength. This value can be stored as part of the URL submittal data record. This new kind of IP related metric for measuring IP authorized usage can be used to place more importance on such a submittal and yield a higher search engine ranking for search engine results based on search terms similar to or matching the trademark or other IP rights including patents and copyrights.

Figure 9A:
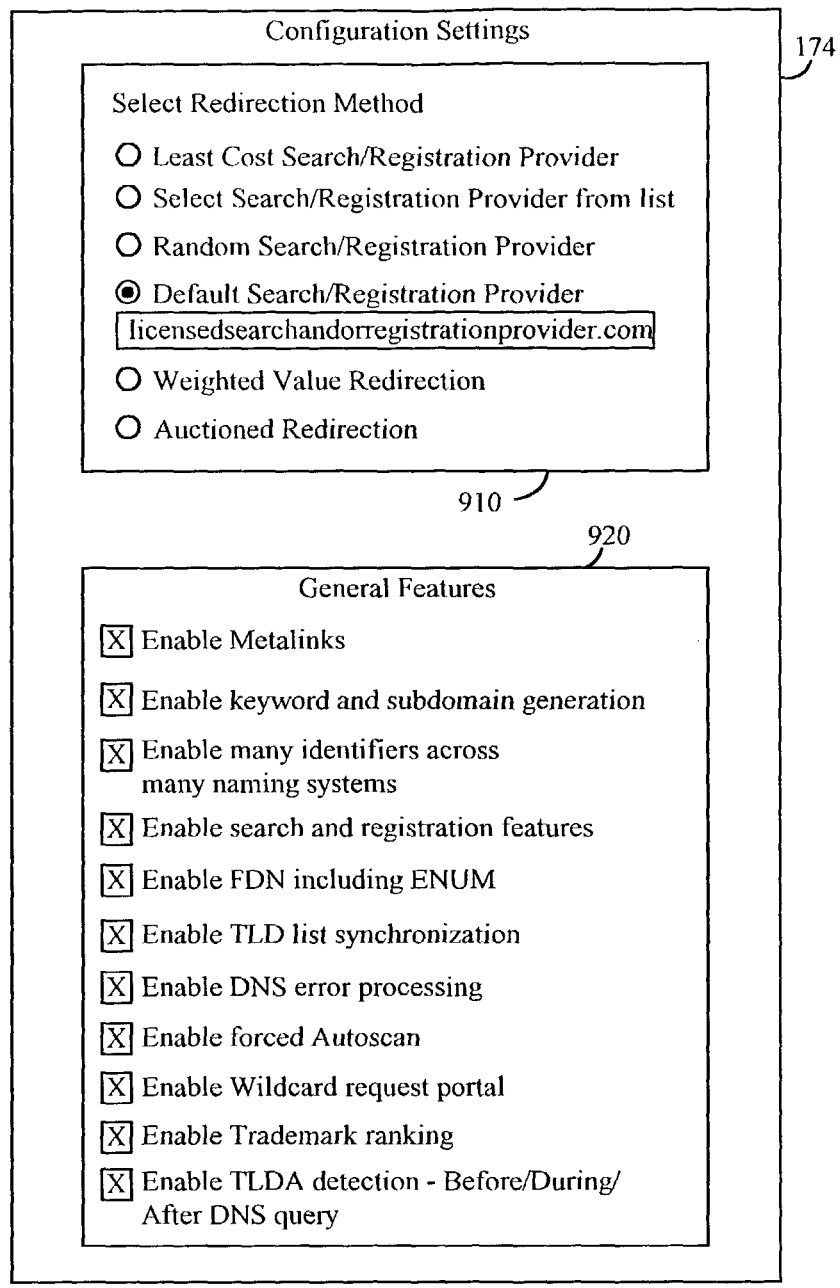
FIG. 9a is a diagram depicting a configuration settings interface in accordance with the present invention.

FIG. 9a is a diagram depicting a configuration settings interface in accordance with the present invention. Modifiable configuration settings 174, are depicted which may be accessed by the browser for selecting the user preferred URI redirection in response to determining that a network resource can not be accessed (step 242), can not be located (step 250), or that a domain name can not be resolved (step 260). Configuration settings 174 may allow choice of URI redirection 910 to either a least cost registration provider, a list of registration providers that can be selected at the time of redirection, the selection of a random registration provider, the redirection of a predetermined or default registration provider, the redirection to a provider based on a weighted value, or the redirection to a provider based on an auctioning mechanism. For instance, weighted values can be updated in real-time based on providers who bid for the appropriate market-share of "hits" or redirections. Offering such selection features can assure that the redirection to registration services are better distributed to those participating registration providers such as accredited domain name registrars using the SRS. Also included, are general features 920 such as enabling metalinks, enabling keyword and subdomain generation, and enabling multiple identifiers across multiple naming systems, enabling search and registration features, enabling FDN processing including ENUM, enabling TLD list synchronization, enabling DNS error processing, enabling forced Autoscan, enabling wildcard request portal, enabling TLDA detection either before, during, and/or after a DNS query, and enabling trademark ranking. Such features are discussed in greater detail throughout the disclosure of the present invention.

Figure 9B:
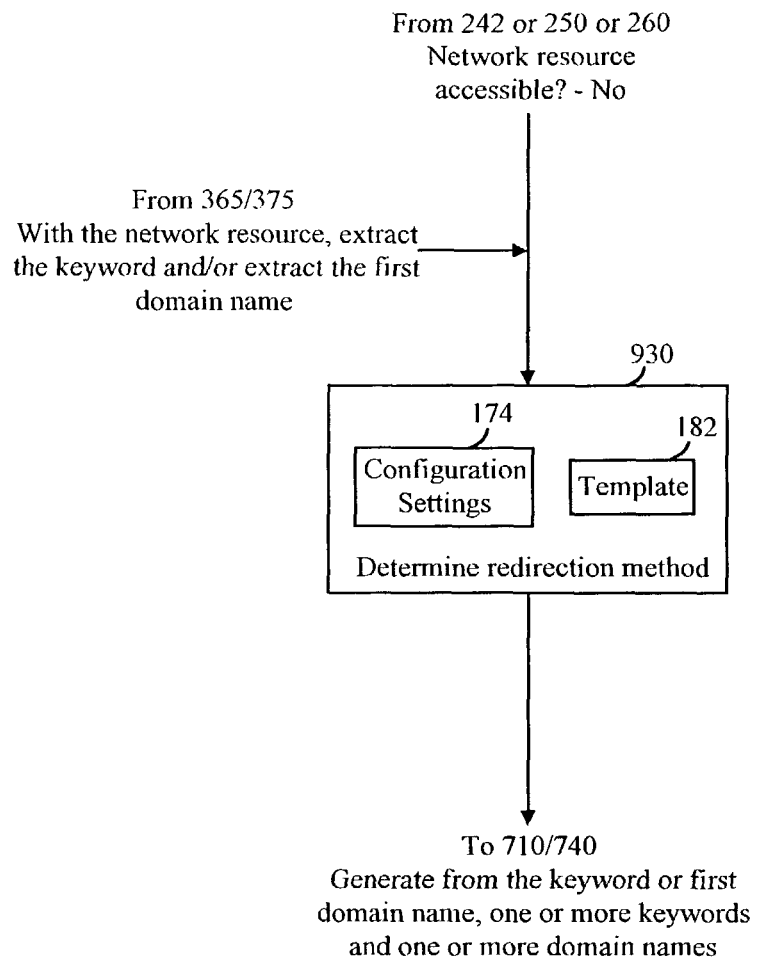
FIG. 9b is a flowchart illustrating the step performed for determining a redirection method in accordance with the present invention.

FIG. 9b is a flowchart illustrating the step performed for determining a redirection method in accordance with the present invention. When the keyword (step 365) or domain name (step 375) is extracted from the generated domain name with the network resource or when a network resource can not be accessed (step 242), can not be located (step 250), or a domain name can not be resolved (step 260), then redirection can be determined in step 930 by retrieving configuration settings 174 or accessing a template 198 from the MSIE autosearch feature. The template can be used to generate an accessible URI for redirecting the client (e.g., web browser) to a request portal 195 to process any number of requests including one of a navigation request, registration request, WHOIS request, back-order request, prefix request, suffix request, command request, resolution request, redirection request, search request, identifier registration request, commerce request, subscription request, dialing request, messaging request, conferencing request, vendor request, service request, login request, status request, authorization request, and reference request. In addition, as part of the redirection process, the extracted keyword or first domain name, can be used to generate (step 710/740) one or more keywords and/or one or more domain names for the purposes of providing added value to the user with respect to navigation, searching, registration, or to pass such generated variables/parameters to the request portal 195.

As shown in the background of the present invention, there are only a few applications in which a wildcard RR has been used. Some known uses include e-mail aliasing, domain name registration, and virtual subdomains. Further use of wildcard RRs have been shown by Schneider in previous co-pending patent applications Ser. Nos. 09/682,133 and 09/682,351 by using a TLD wildcard RR for the purpose of creating competition between registration providers and using a root zone wildcard RR for the purpose of creating a competitive market driven namespace provider system to handle fictitious domain names having top level domain aliases.

Figure 10:
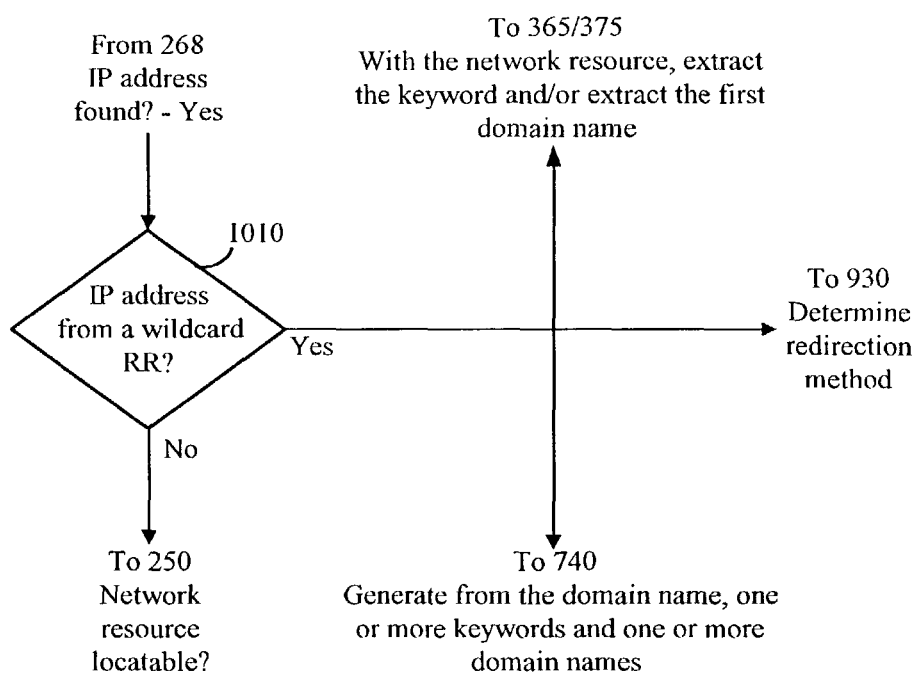
FIG. 10 is a flowchart illustrating the steps performed in response to detecting a wildcard resource record in accordance with the present invention.

FIG. 10 is a flowchart illustrating the steps performed in response to detecting a wildcard resource record in accordance with the present invention. When an IP address is found (step 268), it is determined in step 1010 whether the IP address was retrieved from a wildcard resource record. If not, it is determined in step 250 whether a network resource can be located from the IP address. When an IP address is retrieved from a wildcard resource record, the option of determining a redirection method (step 930) from a network resource corresponding to the IP address may be provided enabling a user to select a registration provider from a plurality of registration providers. Such a network resource can generate (step 740) from the input domain name, one or more keywords and one or more domain names or also be used to extract (step 365/375) a keyword and/or extract another domain name from the input domain name.

When the input domain name is a FDN having a TLDA and the wildcard RR is in a root zone file then a corresponding network resource adapted to determine which naming service/registry/namespace provider can resolve the FDN having a TLDA. This determination can be made automatically based on any combination of parameters including configuration settings, metadata, user preferences, past history, currently available resources, environment variables, cookies, and the like. If need be, the option of determining a resolution method may be provided enabling a user to select at least one namespace provider from a plurality of namespace providers.

Figure 11A:
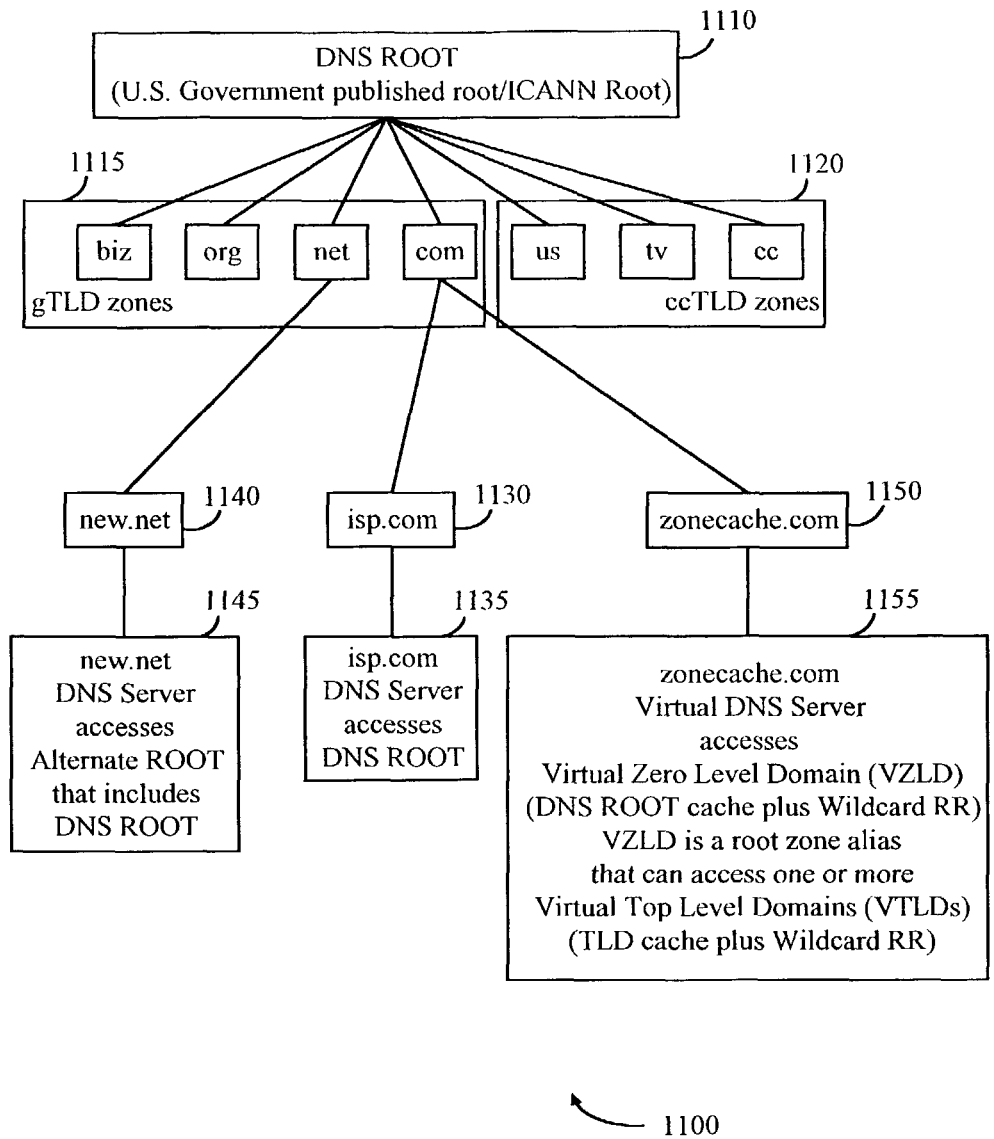
FIG. 11a is a diagram depicting Internet domain name space in accordance with the present invention.

FIG. 11a is a diagram depicting Internet domain name space in accordance with the present invention. Requests to identify an authoritative name server for a domain name are resolved by DNS in a hierarchical manner. A DNS root domain 1110 includes an ICANN root zone or U.S. Government published root zone. Below the root domain are the gTLD zones 1115 and ccTLD zones 1120 that divide the DNS hierarchy into segments. Below the top-level domains, the domain name space 1100 is further divided into subdomains representing individual organizations. In particular, one or more root name servers maintain information (e.g., resource records) about the authoritative name servers for each of the TLDs. In response to requests, those TLD name servers can then provide information about the authoritative name servers for the second-level domains—for example, an authoritative name server for the ".com" TLD will know the authoritative name servers for the second-level isp.com domain.

Nameservers found at a domain called "isp.com" 1130 (representative of any Internet Service Provider) can typically include an ISP DNS Server 1135 that can access the public DNS root. alternate naming service providers such as "new.net" domain 1140 can include an alternate DNS Server 1145 that can access an alternate DNS root (e.g., corn, net, tv, cc, kids, search, agent, travel, etc.). The alternate root usually comprises the ICANN root as well as additional alternate TLDS. Such alternate root zones have never included a resource record adapted to resolve a DNS query for an exact name that does not produce an exact match (e.g., wildcard RR). Some ISPs have partnered with such alternate naming services to provide additional user benefit.

"zonecache.com" domain 1150 can include a Virtual DNS Server 1155 that can access an emulated DNS root zone also called a Virtual Zero Level Domain (VZLD) or root zone alias. Though the VZLD can include the ICANN DNS root, such an emulated root domain does not need to include any additional alternate TLDs. The purpose of this particular VZLD is to mirror the DNS while minimizing the volume of failed DNS resolutions. Any DNS subdomain can be configured to operate as a VZLD. VZLD can also include information about the authoritative name servers for virtual top level domains (VTLDs). For instance, each TLD can have a corresponding VTLD (as will be shown in conjunction with FIG. 11*b*).

In effect a VZLD can include at least one resource record for resolving a DNS query, where a first resource record is configured to resolve the DNS query when no other resource record is in the VZLD or when no other resource record in the VZLD is configured to resolve the DNS query. For instance, the resource record can be configured to resolve the DNS query when it is determined that the DNS query does not include a top level domain, or more specifically, when it is determined that the DNS query includes a top level domain alias. The VZLD can further include a second resource record configured to forward a DNS query having a top level domain (TLD) to a corresponding VTLD zone having a VTLD resource record configured to resolve the DNS query having the VTLD when no other VTLD resource record is in the VTLD zone or when no other VTLD resource record in the VTLD zone is configured to resolve the DNS query having the VTLD. In turn, the VTLD can further include a second resource record configured to forward a DNS query having a second level domain (SLD) to a corresponding Virtual SLD (VSLD) zone having a resource record configured to resolve the DNS query having the VSLD when no other resource record is in the VSLD zone or when no other resource record in the VSLD zone is configured to resolve the DNS query having the VSLD. These resource records which link across a plurality of domains/zones can link across all domain levels (e.g., 3LD, 4LD, 5LD, etc.) in a virtual DNS.

FIG. 11*b* illustrates an exemplary virtual root zone alias in accordance with the present invention. This specific example shows how a DNS subdomain having a zone can be modified to become a root zone alias. In this case, such a subdomain is under authoritative control of "new.net", an alternate DNS provider that resolves additional TLDs not published in the public DNS root. The virtual root zone alias 1170 includes the addition of a wildcard RR 1175 for the purpose of resolving DNS friendly identifiers such as fictitious domain names having a TLDA. A network resource of a market driven namespace provider portal system can be accessed, in this case from a proposed infrastructure domain "tlda.arpa" corresponding to the wildcard RR 1175. Additional resource records 1180 can be included that are representative of TLDs that have virtual TLD zone aliases. For instance, "NET." is a TLD that will list SLD entries for the "NET." domain from a nameserver called "net.zonecache.com" (as will be shown in conjunction with FIG. 11*c*).

When the above root zone alias 1170 is queried to resolve "name.game", for example, it is determined that there is no TLD called "game". The wildcard RR is detected and passes the query value of "name.game" to a server labeled "tlda.arpa". In effect, the wildcard RR treats the query as resolvable and redirects "name.game" to "tida.arpa" for further processing such as namespace resolution, registration services, search services, directory services, and/or discovery services through a TLDA Registry or licensed Metaregistry. Namespace providers may register to participate in FDN resolution by providing API resolver parameters, delimiter mappings, namespace mappings, Namespace ID, or any other parameters that can transform FDNs having a TLDA into the sponsored namespace managed by the provider. For instance, RealNames can participate by registering their Unified Resolution and Discovery Protocol (URDP) resolver service and Microsoft can participate in registering their Universal Directory, Discovery and Integration (UDDI) system to receive and process FDNs detected during DNS resolution, for example.

There are many namespaces (e.g., multilingual names, fictitious domain names, ENUM, Credit Card Numbers, URNs, etc.) that serve as a layer to the DNS. The relationship of these different naming systems may be looked at as a hub and spokes, wherein the DNS serves as a hub with each namespace in relationship to the DNS serving as a spoke. These namespaces may now be accessed as a result of root zone wildcard redirection. The domain name "tlda.arpa" may serve as a wildcard gateway/portal (also called a primary zero level domain) to determine what type of redirector string or Secondary Virtual ZLD (SVZLD) may be used/accessed, if at all, to resolve other namespaces within the DNS. The Primary Zero Level Domain (PZLD) is in operative association with a network resource adapted to determine how to process the detected domain identifier having a top level domain alias.

FIG. 11*c* illustrates an exemplary virtual TLD zone alias in accordance with the present invention. A portion of the NET (TLD) zone file 1185 includes the addition of a wildcard RR 1190 for the purpose of redirecting domain names that would otherwise be considered unresolvable to a market driven registration provider system in this case called "registrarportal.com". For example, when the above TLD zone file is queried to resolve "isthisnameavailable.net", it is determined that there is no SLD called "isthisnameavailable", which can now be considered a second level domain alias (SLDA). The wildcard RR is detected and passes the query value of "isthisnameavailable.net" to a server labeled "registrarportal.com". In effect, the wildcard RR treats the query as resolvable and redirects "isthisnameavailable.net" to "registrarportal.com" for further processing.

The virtual TLD zone alias can be populated with every resource record from the original published TLD zone and include the wildcard RR 1190. For example, the original published NET TLD zone can be accessed and updated each day from VeriSign Registry with a signed zone file access agreement in place. Additional resource records 1195 can be included that are representative of SLDs that have virtual SLD zone aliases. For instance, "SITEMAP.NET." is a SLD that will list 3LD entries for the "SITEMAP.NET." domain from a nameserver called "sitemap.net.zonecache.com". For instance, the owner of the domain "sitemap.net" may wish to have DNS services managed by a virtual zone alias provider such as "zonecache.com". Such a zone alias provider can perform any associated 3LD registration, discovery, directory, information, and request type services as needed on behalf of the SLD holder.

Figure 12:
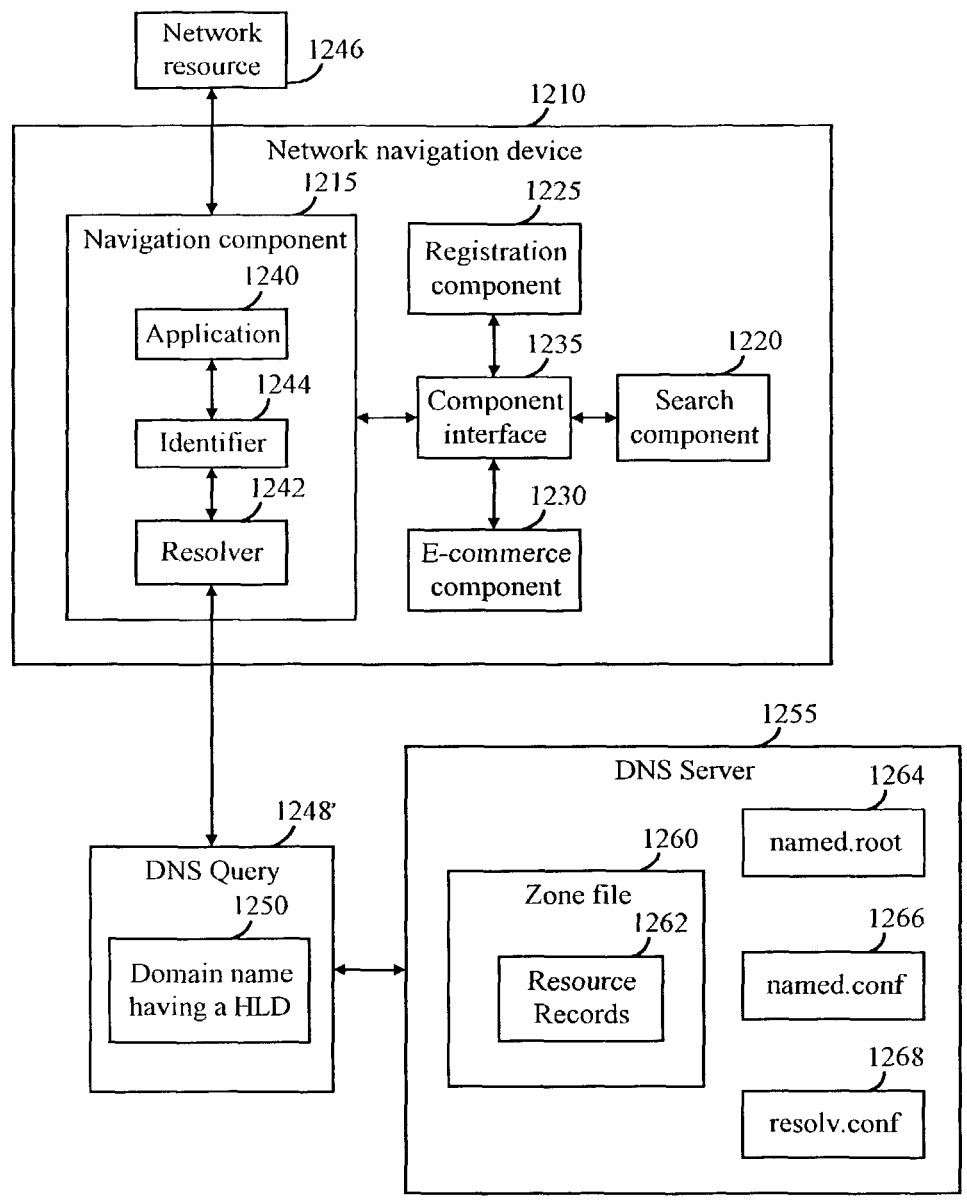
FIG. 12 illustrates a block diagram of a network navigation device in communication with a DNS server in accordance with the present invention.

FIG. 12 illustrates a block diagram of a network navigation device in communication with a DNS server in accordance with the present invention. A network navigation device 1210 includes multiple components such as a navigation component 1215, a search component 1220, a registration component 1225, a e-commerce component 1230, and a component interface 1235 in operative association with the above or any other components. Each component may include (not shown) an Application Programming Interface (API) for interfacing with any combination of other device and/or other components. The navigation component further includes sub-components such as an application 1240, a DNS resolver 1242, and a resource identifier 1244 stored in component memory. To locate and/or access a network resource 1246 from the identifier 1244, the navigation component passes the identifier 1244 from the application 1240 to the resolver 1242. The identifier includes a domain name having a highest level domain 1248. The resolver 1242 provides a DNS query 1250 with the domain name 1248.

A hierarchy of nameservers in the DNS system 121 are successfully queried until the appropriate DNS server 1255 is accessed. The DNS server 1255 includes a zone file 1260 having one or more resource records 1262. In addition, the DNS server 1255 also includes initialization and configuration files called "named.root" 1264, "named.conf" 1266, and "resolv.conf" 1268. Primary, secondary, and caching-only DNS servers, when first configured, need to know the IP addresses of root servers so that they can begin to resolve client requests about other zones. A default list of root servers is typically provided in the "named.root" file 1264. The data in the "named.conf" 1266 file specifies general configuration characteristics for the name server, defines each zone for which the name server is responsible, and provides further configuration information per zone. Data in the "resolv.conf" 1268 file specifies general configuration characteristics for the resolver including naming one or more specific name servers to query in a particular order and naming one or more specific zones to query in a particular order.

Changes can be made to these initialization and configuration files to adapt a DNS server to perform aspects of the present invention. The initial set of root name servers is specified using a hint zone. When the server starts up, it uses the root hints to find a root name server and get the most recent list of root name servers. For instance, a root zone hint file can be placed in "named.conf" 1266 to call "named.root" 1264 when needed. A wildcard resource record can be placed in "named.root" 1264 to enable resolution of DNS friendly identifiers having TLDAs. Further changes can be made to "named.root" 1264 to enable a VTLD zone to be accessed instead of a TLD zone. Instead of using a root zone hint file, "named.conf" 1266 can include a file that will slave the root zone from a zonecache.com master DNS server that manages a VZLD or root zone alias. In addition, "resolv.conf" 1268 can be configured to append "zonecache.com" when a DNS friendly identifier such as a numerical FDN (e.g., 216.555.1212) can not be resolved by the public DNS root. After a first DNS query fails, the domain name "216.555.1212.zonecache.com" can be constructed. The zone for "zonecache.com" domain can be configured as a VZLD and access a root zone alias that can resolve the "216.555.1212" identifier.

Figure 13A:
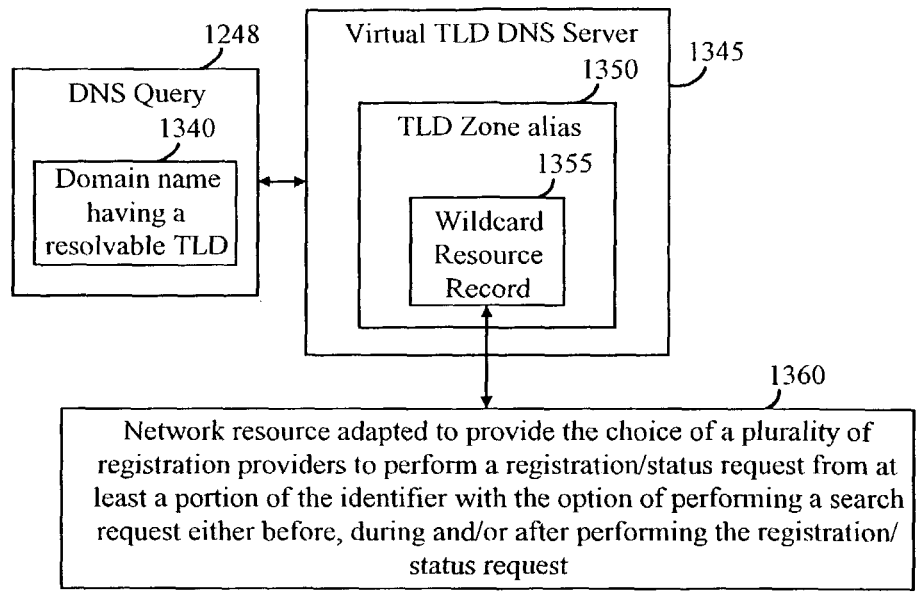
FIG. 13a illustrates a block diagram of a virtual TLD DNS server responding to a DNS query in accordance with the present invention.

FIG. 13a illustrates a block diagram of a Virtual TLD DNS server responding to a DNS query in accordance with the present invention. A DNS query 1248 includes a domain name having a resolvable TLD 1340. A hierarchy of nameservers in the DNS system 121 are successfully queried until an authoritative Virtual TLD DNS server 1345 is accessed. The DNS server 1310 includes a TLD zone alias 1350 having a wildcard resource record 1355. When it is determined that the TLD is not a SLD but is instead a SLDA, the wildcard RR 1355 can redirect all domain name having SLDAs to a network resource 1360 adapted to provide the choice from a plurality of registration providers to perform a non-search request such as one of a registration request and identifier status request (e.g., aftermarket, auction, bid, monitoring, back-order request, etc.) from at least a portion of the identifier with the option of performing a search request either before, during and/or after performing the non-search request.

Figure 13B:
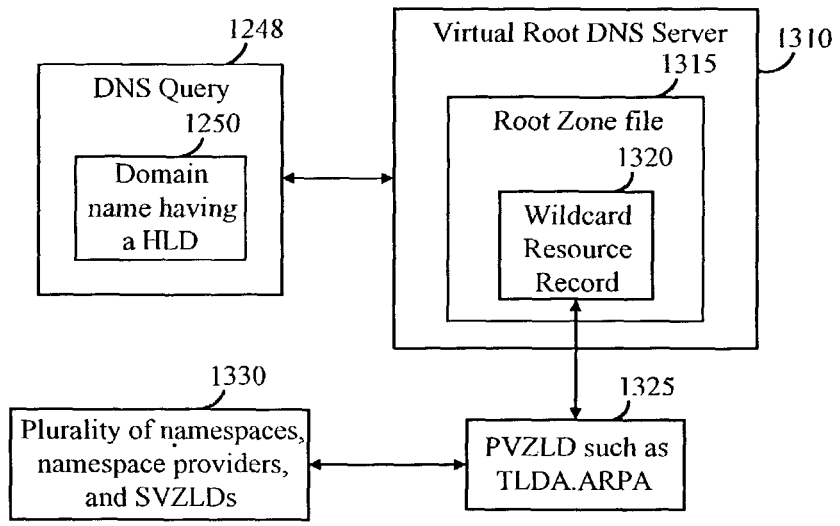
FIG. 13b illustrates a block diagram of a virtual root DNS server responding to a DNS query in accordance with the present invention.

FIG. 13b illustrates a block diagram of a Virtual Root DNS server responding to a DNS query in accordance with the present invention. A DNS query 1248 includes a domain name having a highest level domain 1250. A hierarchy of nameservers in the DNS system 121 are successfully queried until an authoritative Virtual Root DNS server 1310 is accessed. The DNS server 1310 includes a root zone alias 1315 having a wildcard resource record 1320. When it is determined that the HLD is not a TLD but instead a TLDA, the wildcard RR 1320 can redirect all domain name having TLDAs to a network resource corresponding to a Primary Virtual Zero Level Domain (PVZLD) 1325 such as the proposed infrastructure domain "tida.arpa", which manages and brokers FDN requests across a plurality of namespaces, namespace providers, and secondary virtual zero level domains (SVZLDs) 1330. The namespace provider is a naming authority to at least one SVZLD and the PVZLD is adapted to redirect to at least one SVZLD in response to the resolved DNS query including the DNS friendly identifier having the TLDA.

For example, when a DNS query includes a DNS friendly identifier such as a numerical fictitious domain name (NFDN) (e.g., 216.555.1212) and a root domain alias (DNS Root plus wildcard) is accessed, the NFDN can be resolved by translating the NFDN into an IP address. In turn, a network resource is configured to detect that the NFDN is more specifically a DNS friendly telephone number identifier and respond but translating the NFDN into the RFC 2916 compliant "2.1.2.1.5.5.5.6.1.2.1.e164.arpa".

In another example, when "http://alt.binaries" is received and the ".binaries" TLDA is detected, it can be further detected that "alt" is a top-level news category and that "http://alt.binaries" is the incorrect protocol associated with the identifier. The PVZLD can be configured to detect such an error and correct it by constructing a new URL such as "nntp://alt.binaries".

An alternate root by definition includes alternate top level domains. The alternate root also includes the legacy root, now maintained by the US Government (ICANN root). There exists no known published root zone (e.g., public DNS root, alternate root operating outside of ICANN authority, etc.) that has ever included a wildcard RR nor does there exist any known proposal for the inclusion of such a RR. The addition of a wildcard RR to the public DNS root does not add any new TLDs and therefore can not be called an alternate root. Only the U.S. Government can delegate authority to ICANN to add such a wildcard resource record to the public DNS root. If such a decision was ever made, unregistered DNS friendly identifiers could then be resolved and forwarded to network resources configured to provide additional request type services such as resolution, registration, search, discovery, directory, and information services. In this way, such request portal type services for a fictitious domain name can function similar to that of "parked page" services similar to that of registered domain names. By so doing, new sources of revenue can be realized to help financially sustain Internet organizations such as ICANN, IANA, IETF, ISOC, and the like.

The selection of a root zone to point to is a voluntary act by DNS name server administrators and end-user client software. A nameserver of any DNS subdomain (e.g., ISP DNS server) can be configured to point to a root zone alias or Virtual Zero Level Domain to enable clients to immediately and transparently use the benefits of improved DNS resolution. The use of the root zone wildcard could reduce or eliminate the need for client systems to intercept a received identifier before reaching the DNS and/or further process the received identifier in response to a DNS error upon resolving the identifier. Because the wildcard can be used as a means to access other alternate roots, the single authoritative root can remain unified but yet have a synergistic relationship to alternate roots that participate in communicating with the primary virtual ZLD (PVZLD), or authoritative ZLD/absolute ZLD (AZLD). The wildcard RR or any resource record that functions similar to a wildcard used in a root zone or root zone alias can restore the intended purpose of the DNS by creating a unified global public infrastructure with respect to itself and, in addition, to other naming systems.

FIG. 13c illustrates an exemplary list of stub zones to supplement any root zone with numerical extensions in accordance with the present invention. A master zone is the master copy of the data in a zone. A slave zone is a replica of a master zone. The masters list specifies one or more IP addresses that the slave contacts to update its copy of the zone. A stub zone 1370 is like a slave zone, except that it replicates only the NS records of a master zone instead of the entire zone. The stub zone 1370 called "num-stubs.conf" can be added to a BIND configuration by appending to "named.conf" 1266 the following line:

include "num-stubs.conf";

The BIND configuration can be reloaded with the command "ndc reload". Included in the stub zone 1370 are numerical extensions that can be four or more digits in length. Adding a three digit numerical extension is not advisable because a DNS friendly identifier could potentially be incorrectly processed and mistake an IP address for a numerical domain name. By populating the stub zone with numerical extensions real numerical domain names can be resolved. For instance, a four digit extension stub 1375 can be used to process a telephone number such as "216.555.1212" or a social security number such as "123.45.1212", a 5-digit extension stub 1380 can be used to process a zip code domain name such as "info.44106" or a UPC code domain name such as "93371.44106". Furthermore, in the case of zip code TLDs, a ".44106" zone can function as an alias and point to the same nameservers that have the zone "cleveland.oh.us", for example. N-digit extensions can be applied as needed to represent any form of numerical TLD. In a preferred aspect, the stub zone 1370 is used as a convenience so that a root zone such as an ICANN root does not have to be modified. In another aspect of the present invention, numerical TLDs can be included to create an alternate root zone managed by participating ISPs in order to enhance domain name space with respect to numerical DNS friendly identifiers.

FIG. 13d illustrates an exemplary numerical domain zone in accordance with the present invention. The numerical domain zone file 1385 in this case is representative of a 7 digit telephone number domain zone such as "555.1212" that includes named resource records 1390 representative of area codes corresponding to the specific domain zone. These named resource records can point to a "zonecache" or can translate in accordance with RFC 2916 and result in accessing the "e164.arpa" domain. In addition, there is the inclusion of a wildcard RR 1395 for the purpose of redirecting domain names that would otherwise be considered unresolvable to a switchboard driven area code directory service in this case called "areacodeportal.com".

For example, when the above numerical domain zone file is queried to resolve "555.1212", it is determined that there is no 3LD and therefore the numerical domain name does not include an area code. The wildcard RR is detected and passes the query value of "555.1212" to a server labeled "areacodeportal.com". In effect, the wildcard RR treats the query as resolvable and redirects "555.1212" to a network resource corresponding to "areacodeportal.com" for further processing. Such a network resource can be configured to present all possible area codes for the numerical domain name "555.1212" enabling a user to select the intended area code. The wildcard RR can redirect incorrect area codes as well. For instance, "999.555.1212" is not in the "555.1212" zone file and can in turn redirect to the network resource corresponding to "areacodeportal.com" to select a correct area code.

A default area code or list of area codes may be included in configuration settings. This includes the ability to access one or more area codes from the operating system registry or from the current dialup settings of a client machine. A history folder can be consulted or a cookie can be placed on the client as a means to retrieve the most likely area code(s) in response to receiving an incomplete telephone number domain name identifier. Similar techniques can be applied to the autosearch to process NFDNs that are representative of telephone numbers in dot notation as well. Techniques for converting FDNs into the "e164.arpa" domain can include mnemonic conversion techniques. For instance, the DNS friendly identifier "1.800.AUTOMOBILE" (equivalent to 1-800-AUTOMOB or 1-800-288-6662) can pass through the DNS and either be redirected via a root zone wildcard or autosearch template to transform the FDN into a RFC 2916 compliant identifier such as "2.6.6.6.8.8.2.0.0.8.1.e164.arpa".

Figure 14A:
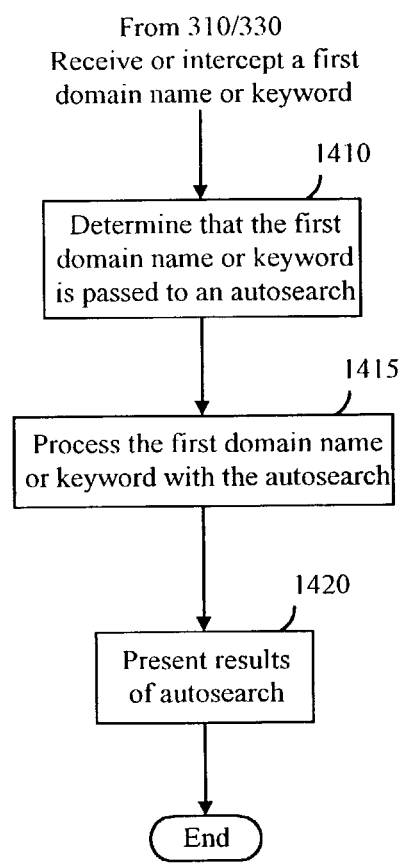
FIG. 14a is a flowchart illustrating the steps performed by a prior art system for processing an autosearch.

FIG. 14a is a flowchart illustrating the steps performed by a prior art system for processing an autosearch. When a keyword or first domain name is received or intercepted (step 310 or step 330) and it is determined in step 1410 to pass the first domain name or keyword to an autosearch, the first domain name or keyword can then be processed in step 1415 with an autosearch. The results of the autosearch can then be presented in step 1420.

Figure 14B:
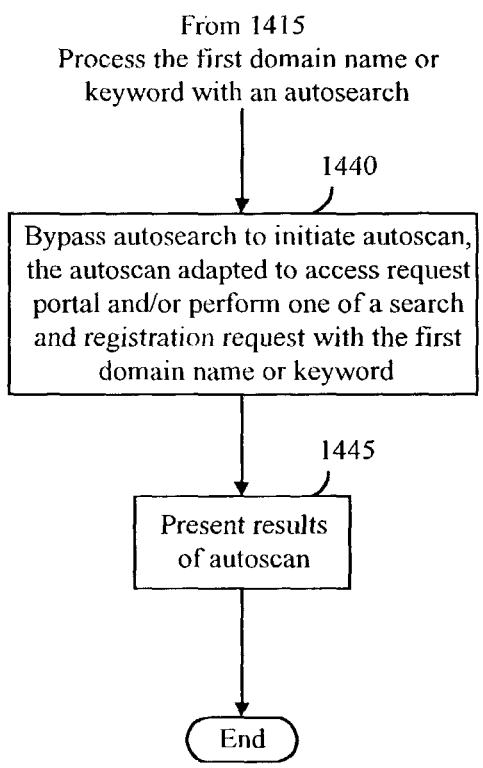
FIG. 14b is a flowchart illustrating the steps performed for processing an autoscan in accordance with the present invention.

FIG. 14b is a flowchart illustrating the steps performed for processing an autoscan in accordance with the present invention. When a keyword or first domain name is processed with an autosearch (step 1415), the autosearch can be bypassed in step 1440 to initiate an autoscan 198 configured to access request portal 195 and/or perform one of a search and registration request with the first domain name or keyword. The results of the autoscan 198 can then be presented in step 1445.

For instance, program code can be executed to add an entry to a client HOSTS file and operating system registry as follows:

127.0.0.1 auto.search.msn.com #bypass autosearch to localhost and force autoscan initiation

[HKEY_LOCAL_MACHINE\SOFTWARE\Microsoft\Internet Explorer\Main\UrlTemplate]

"1"="requestportal.com/cgi-bin/index.cgi?query=%s"
"2"="www.%s.com"
"3"="www.%s.net"
"4"="www.%s.org"

Such configurations enable automatic termination of a detected autosearch to initiate an autoscan 198, the autoscan adapted to access a request portal 195 and/or perform one of a search and registration request with the first domain name or keyword. In effect, the autoscan 198 can be configured to function as an autosearch, autoregistration, and/or autorequest enabling third party providers to compete with Microsoft for keyword searches and failed DNS resolutions.

Figure 14C:
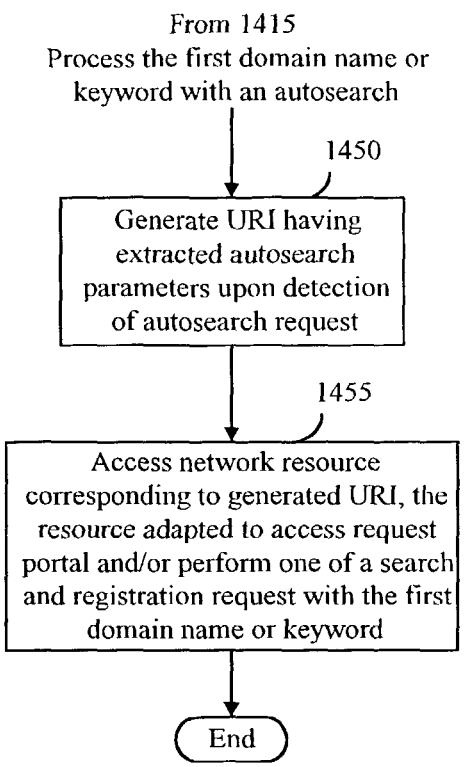
FIG. 14c is a flowchart illustrating the steps performed for overriding or canceling an autosearch in accordance with the present invention.

FIG. 14c is a flowchart illustrating the steps performed for overriding an autosearch in accordance with the present invention. When a keyword or first domain name is processed with an autosearch (step 1415), the autosearch can be detected and cancelled or overridden by generating in step 1450 a URI having extracted autosearch parameters upon detection of autosearch request. A network resource corresponding to generated URI can be accessed in step 1455 where the network resource is adapted to access request portal 195 and/or perform one of a search and registration request with the first domain name or keyword.

A Browser Helper Object (BHO) 164 is a dynamic link library (DLL) that allows developers to customize and control MSIE. Whenever an instance of the browser is launched, it reads the registry to locate installed BHO's and then creates them. Created BHO's then have access to all the events and properties of that browsing session. Applications which install BHOs are becoming more popular. For example Alexa uses a BHO to monitor page navigation and show related page links. Go!Zilla use BHO's to monitor and control file downloading.

BHO 164 can be configured to detect an autosearch request by monitoring navigation events and status bar events, (e.g., DISPID-BEFORENAVIGATE2, DISPID_STATUSTEXTCHANGE), and the like. For instance, when the domain component "auto.search.msn.com" is detected in a first URL or in the status bar text, the BHO 164 can construct a second URL by replacing the domain component with "requestportal.com". The second URL is used to override the autosearch and access a network resource corresponding to "requestportal.com" that is configured to extract autosearch parameters from the newly constructed URL. Additionally, the BHO 164 can record location field input or buffer the keyword or first domain name before a navigation event to assist in constructing the second URL.

In another aspect of the present invention, a BHO 164 can be configured to detect TLDAs in DNS friendly identifiers from the input buffer or from the detection of a DNS type event such as that of a network resource location request or domain name resolution request. A list 160 of ICANN compliant TLDs can be maintained client side or as part of a login file/script. Such a list can be periodically synchronized with the DNS to generate new updated TLD lists 160 from root zone updates. In fact, one of ordinary skill in the art can configure a TLD list 160 to be accessed client side via any OSI model layer such as application, network, transport layer, etc. For instance, Windows sockets (WinSock), is an Application Programming Interface (API) for developing Microsoft Windows compatible programs that can communicate with other machines via the TCP/IP protocol, or the like. A WinSock DLL provides the standard API, and each vendor's service provider layer is installed below the standard API. The API layer communicates to a service provider via a standardized Service Provider Interface (SPI), and can multiplex between multiple service providers simultaneously. Winsock2 includes a default name space provider. Another name space provider can be installed for the purpose of processing FDNs having TLDAs.

Figure 15A:
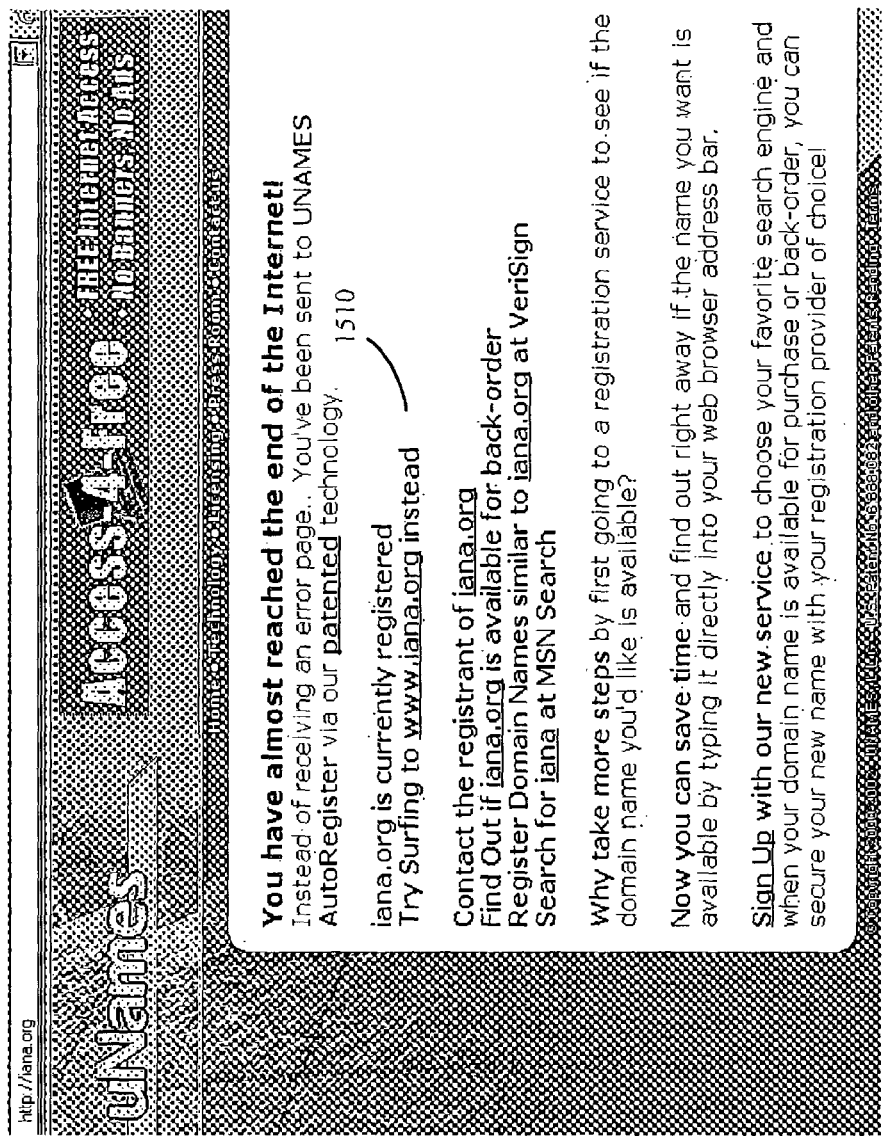
FIG. 15a is an illustration of a web page generated in response to a failed network resource location request in accordance with the present invention.

FIG. 15a is an illustration of a web page generated in response to a failed network resource location request in accordance with the present invention. The web page depicts the look and feel of a rudimentary request portal 195 that provides options 1510 to a requester in response to a failed network resource location request. Some options 1510 include an indicator that a network resource corresponding to a domain name is not accessible, whether the domain name is available for registration, providing additional links to perform related network resource requests when the domain name is registered, providing a means to contact the registrant of the domain name, providing a means to determine whether the domain name can be back-ordered, providing a means to search for the availability of similar domain names, providing a means for performing a search request on at least a portion of the domain name, and the like.

Figure 15B:
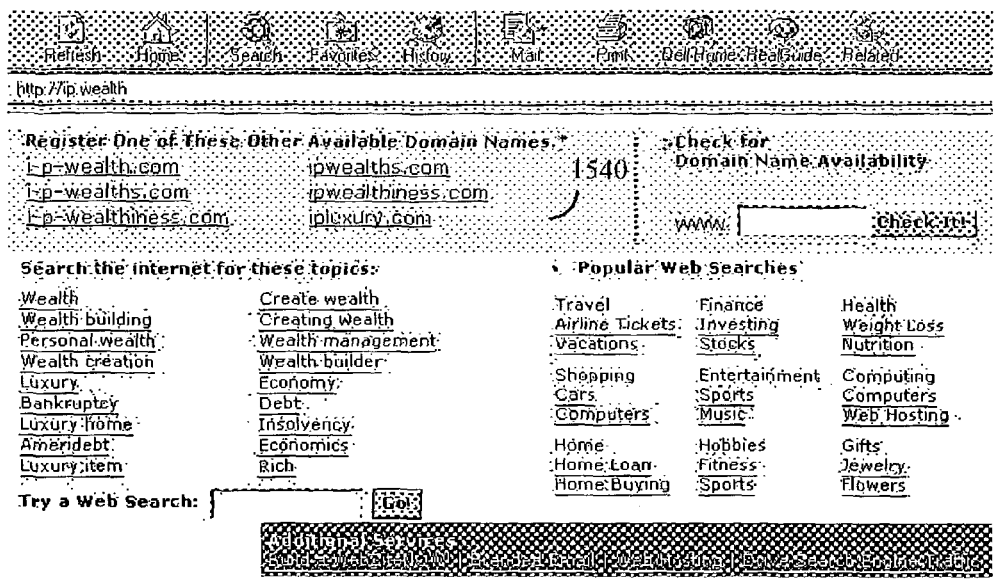
FIG. 15b is an illustration of a web page generated in response to a domain name having a top level domain alias in accordance with the present invention.

FIG. 15b is an illustration of a web page generated in response to a domain name having a top level domain alias in accordance with the present invention. A wildcard resource record can be retrieved to return an IP address in response to receiving a DNS friendly identifier having a TLDA, such as "ip.wealth". A network resource corresponding to the IP address can process the DNS friendly identifier as any non-DNS request such as search requests, name generation requests, directory requests, advertising requests, and the like to yield output 1540 as presented in the rendered web page. No entity technically owns the "ip.wealth" identifier but content can be managed through a request portal 195 accessing a plurality of vendors, information services, and namespaces. In this way, such request portal type services for a fictitious domain name can function similar to that of "parked page" services similar to that of registered domain names so that a FDN request portal 195 can serve as a "parked page" emulator.

One or more programs can be constructed to perform one or more aspects of the present invention. The program may be integrated as part of an API, operating system, or plug-in/add-on for a web browser 112. Such a program may be downloaded and installed for integration into the command line of a device or location field of a browser program 112. In addition, such a program product may be combined with other plug-in products (e.g., NeoPlanet, RealNames, Netword, NetZero, ICQ, AIM, I-DNS, WALID, Quick Click, Google, etc.) to offer additional functionality and to more quickly reach an existing customer base. Program installation may be activated in response to accessing a web site or any network resource corresponding to a URI.

Modifying the source code of the browser program 112 itself or OS (e.g., Windows, Linux, NT, UNIX, MAC, etc.) may be more desirable, in effect, enabling tens or hundreds of millions of users to take advantage of more creative ways to use indicia such as FDNs as a means to access a valid URI.

For any of the above implementations, HLD resolvability may be determined before, during, and/or after DNS resolution on the client side, server side, or at any point at any point on a network including at a peer-to-peer machines, proxy servers, firewalls, hubs, routers, resolvers (e.g., DNS resolvers, RealNames resolvers, Netword Resolvers, UDDI resolvers, etc.), and nameservers, etc. In addition, the step of HLD resolvability may further reside in hardware, software and/or firmware (e.g., network card, BIOS, adapter cards, etc.). HLD resolvability may be determined before processing a name resolution request or in response to determining that the domain name is unresolvable.

MSIE browser (or other programs that use the MSIE shell) may forward an identifier having an unresolvable domain name or FDN to the autosearch feature for further processing.

Instead of prompting the client browser 112 to display an error message, the identifier may instead be processed by the autosearch and/or routed to another naming service provider for further processing. For example, such input may be routed to a FDN registry or to a FDN translation service in operative association with a RealNames server and/or similar resolver and the like. Modifications may be made to the script/program/template running the autosearch that generates the "response.asp" web page on the server "auto.search.msn.com" to enable FDN processing and/or processing a search request having the FDN or unresolvable domain name.

An extra template may be created and used in the registry of the MSIE autosearch feature. When the "auto.search.msn.com" server detects that the request includes a TLDA, the extra template may be used as a means to access an authorization database, registry, name translation database, or "GO LIST", to determine how to generate a valid URI that corresponds to the received FDN having a TLDA. By using an extra template, the browser program does not have to be modified, thereby eliminating distribution costs for a browser version update.

Other templates 162 may be included and used for processing prefix/suffix delimiters, URI redirection from SLD or HLD (e.g., "acme.", ".net", or ".sports") to a corresponding vertical market directory service, using a TLDA as a customized search term (e.g., TLDA Query), using a template for each resolution method, and creating a user definable template in conjunction with specified component data at the time of registration or thereafter.

In one aspect of the present invention, name tracking databases, name translation databases, or registries may be centrally maintained and updated through redundant servers. The data structure of such information may be stored as metadata (e.g., XML) or in any other format to allow integration of such data with the data managed by other naming service providers. Through Application Programming Interface (API), naming service providers can communicate with such resolvers, registries, and/or databases. Furthermore, access can be both platform and language independent. For instance, the TLDA registry can be accessed through any gateway such as Mobile Access Gateway. All requests may be routed to a NAPTR RR, SRV RR, or round-robin DNS for the purposes of distributing bandwidth and load balancing across a server farm. The server farm may include dedicated servers for each database or parts of a single database that operate in parallel to assure high throughput. In other aspects the name translation databases or registries may be maintained and updates propagated in a distributed hierarchy similar to that of the DNS.

The name tracking database may be enhanced by combining the data from the name translation database and storing it at the Internet Service Provider (ISP) level to act as a distributed cache for minimizing bandwidth of server requests across the backbone of the Internet. The enhanced name tracking database may also be distributed as a client side cache for even quicker access, particularly when the network is unstable or unreliable causing retrieval delays, or when a network connection is lost.

This invention may be implemented in networks and distributed systems of varying scope and scale. The registry, registration records, name translation database, or name tracking database may be located at separate sites and separate computers in a large distributed system. However, the various servers and clients described may actually be processes running on various computers and interacting to form a distributed and/or peer-to-peer system. In smaller implementations, some or all of the various servers described may actually be processes running on a single computer. All such components of the fictitious domain identifier system are robust, secure, and scalable. Security methods including authorization techniques may be applied to all information records in the system including registries and DNS resource records.

Pre-navigation methods may also be applied to FDN detection techniques. Improvements may be made to the autosearch and/or browser, for example to try and apply such FDN techniques in yet earlier steps or in later steps. There may further be included any number of other steps that may be performed between the step of determining a domain name is fictitious and processing the FDN such as requesting a network resource or performing a registration request and/or search request. In effect, FDN detection may occur before any validity tests and after failed DNS resolution requests, for example.

The same teachings may be applied to those skilled in the art by providing a text box object as input that can be located anywhere and on any web page including a text box that is embedded or part of an on-line advertisement. The text box object may be used in a stand-alone application and stored on magnetic and/or optical media that is either non-volatile, writable, removable, or portable. The text box object may be incorporated as an applet or servlet and embedded in other applications. The text box may be integrated in the task bar or any part of the GUI's OS, or the OS bypassed and overlaid as a graphic on a display device based on modifications to a video card and/or it's associated firmware or software drivers. The command line text box may further be overlaid as an interactive graphical object in other embodiments such as Internet television, cable television, digital television, or interactive television through an Internet appliance or set top box.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:
1. A method for obtaining search results comprising:
one of receiving at least one keyword having an original form which is not a domain name structure resolvable by a domain name server or intercepting at least one key- word having an original form which is not a domain name structure resolvable by a domain name server;

generating a domain name, adapted to be resolved by the domain name server, having said original form of said at least one keyword as at least a portion of said domain name;

accessing a network resource corresponding to said domain name by resolving said domain name in the domain name server;

in response to accessing said network resource corresponding to said domain name, extracting, at said network resource, said at least one keyword from said domain name;

performing a search of content in a database based on said at least one keyword extracted at said network resource; and, obtaining at least one search result corresponding to said search.

2. A method, as set forth in claim 1, wherein said at least one keyword is received or intercepted from at least one of an internal automation, external automation, activation of a hyperlink, network resource redirection, or input.

3. A method, as set forth in claim 1, wherein said one of receiving said at least one keyword or intercepting said at least one keyword comprises receiving the at least one keyword as an input from a user interface element.

4. A method, as set forth in claim 3, wherein the receiving the at least one keyword comprises receiving the at least one keyword via at least one of a browser location field, text box, command line, speech to text interface, optical recognition interface, or magnetic recognition interface.

5. A method, as set forth in claim 1, wherein said domain name is generated by using at least one of a function, procedure, program, script, rewrite rule, resolver, configuration parameter, search list, host table, client, server, autosearch, or nameserver.

6. A method, as set forth in claim 1, wherein said domain name is generated by performing a string manipulation operation upon at least a portion of said domain name and the at least one keyword.

7. A method, as set forth in claim 6, wherein said performing said string manipulation operation comprises performing at least one of a prepending, appending, rotating, concatenating, truncating, or reversing at least a portion of said domain name with respect to said at least one keyword.

8. A method, as set forth in claim 1, further comprising determining whether said at least one keyword is one of a registered navigation keyword or a resolvable navigation keyword.

9. A method, as set forth in claim 8, further comprising contemporaneously obtaining search results corresponding to said at least one keyword and determining whether said at least one keyword is one of a registered navigation keyword or a resolvable navigation keyword.

10. A method, as set forth in claim 8, further comprising at least one of displaying registration information or determining whether said at least one keyword can be back-ordered as a navigation keyword, when it is determined that said at least one keyword is at least one of a registered navigation keyword or resolvable navigation keyword.

11. A method, as set forth in claim 8, further comprising generating a registration form when it is determined that said at least one keyword is not a registered navigation keyword.

12. A method, as set forth in claim 1, further comprising determining whether said at least one keyword is available for registration as one of a trademark, telephone number, or advertising placement.

13. A method, as set forth in claim 12, further comprising generating a registration form when it is determined that said at least one keyword is available for registration as one of a trademark, telephone number, or advertising placement.

14. A method, as set forth in claim 12, further comprising at least one of displaying registration information or determining whether said at least one keyword can be back ordered as one of a trademark, telephone number, or advertising placement, when it is determined that said at least one keyword is not available for registration as one of a trademark, telephone number, or advertising placement.

15. A method, as set forth in claim 1, further comprising contemporaneously obtaining search results corresponding to said at least one keyword, and determining whether said at least one keyword is available for registration as one of a trademark, telephone number, or advertising placement.

16. A method, as set forth in claim 1, further comprising generating from said at least one keyword, one or more keywords and one or more domain names when said at least one keyword is extracted.

17. A method, as set forth in claim 16, further comprising determining whether said one or more domain names is available for registration.

18. A method, as set forth in claim 16, further comprising determining whether said one or more keywords is available for registration as one of a navigation keyword, trademark, telephone number, or advertising placement.

19. A method, as set forth in claim 1, further comprising contemporaneously processing at least one of a navigation request, registration request, WHOIS request, back-order request, prefix request, suffix request, command request, resolution request, redirection request, search request, identifier registration request, commerce request, subscription request, dialing request, messaging request, conferencing request, vendor request, service request, login request, status request, authorization request, or reference request, with said at least one keyword when said at least one keyword is extracted.

20. A method, as set forth in claim 1, further comprising determining whether said at least one keyword is available for registration as a search engine ranking.

21. An apparatus adapted to obtain search results comprising:

a network resource;

at least one computing device including at least one processor, the at least one computing device adapted to:

at least one of receive at least one keyword having an original form which is not a domain name structure resolvable by a domain name server or intercept at least one keyword having an original form which is not a domain name structure resolvable by a domain name server;

generate a domain name, adapted to be resolved by the domain name server, having said original form of said at least one keyword as at least a portion of the domain name;

submit the domain name for resolution by the domain name server;

wherein, in response to resolution by the domain name server, the network resource is adapted to extract the at least one keyword from said domain name, and obtain at least one search result, the search result being based on performance of a search of content in a database based on the at least one keyword extracted at said network resource.

22. The apparatus as set forth in claim 21, wherein the at least one keyword is received or intercepted from at least one of an internal automation, external automation, activation of a hyperlink, network resource redirection, or input.

23. The apparatus as set forth in claim 22, wherein the at least one keyword comprises at least a portion of an input received from a user interface element.

24. The apparatus as set forth in claim 21, wherein the domain name is generated by using at least one of a function, procedure, program, script, rewrite rule, resolver, configuration parameter, search list, host table, client, server, autosearch, or nameserver.

25. The apparatus as set forth in claim 21, wherein the domain name is generated by performing a string manipulation operation upon at least a portion of the domain name and the keyword.

26. The apparatus as set forth in claim 21, wherein the at least one processor is adapted to execute instructions to cause the computing device to perform at least one of a prepending, appending, rotating, concatenating, truncating, or reversing at least a portion of the domain name with respect to the at least one keyword.

27. The apparatus as set forth in claim 21, wherein the at least one processor is further adapted to execute instructions to cause the computing device to contemporaneously obtain search results corresponding to the at least one keyword and determine whether the at least one keyword is one of a registered navigation keyword or a resolvable navigation keyword.

28. The apparatus as set forth in claim 21, wherein the at least one processor is further adapted to execute instructions to cause the computing device to present a display of registration information, determine whether the at least one keyword is one of a registered navigation keyword or a resolvable navigation keyword, and determine whether the at least one keyword can be back-ordered as a navigation keyword when it is determined that the at least one keyword is at least one of a registered navigation keyword or a resolvable navigation keyword.

29. The apparatus as set forth in claim 21, wherein the at least one processor is further adapted to execute instructions to cause the computing device to determine whether the at least one keyword is one of a registered navigation keyword or a resolvable navigation keyword and generate a registration form and when it is determined that the at least one keyword is not a registered navigation keyword.

30. The apparatus as set forth in claim 21, wherein the at least one processor is further adapted to execute instructions to cause the computing device to determine whether the at least one keyword is available for registration as one of a trademark, telephone number, or advertising placement.

31. The apparatus as set forth in claim 30, wherein the at least one processor is further adapted to execute instructions to cause the computing device to generate a registration form when it is determined that the at least one keyword is available for registration as one of a trademark, telephone number, or advertising placement.

32. The apparatus as set forth in claim 21, wherein the at least one processor is further adapted to execute instructions to cause the computing device to contemporaneously obtain search results corresponding to the at least one keyword, and determine whether the at least one keyword is available for registration as one of a trademark, telephone number, or advertising placement.

33. The apparatus as set forth in claim 21, wherein the at least one processor is further adapted to execute instructions to cause the computing device to generate from the at least one keyword, one or more keywords and one or more domain names when the at least one keyword is extracted.

34. The apparatus as set forth in claim 33, wherein the at least one processor is further adapted to execute instructions to cause the computing device to determine whether the one or more domain names is available for registration.

* * * * *